(12) United States Patent
Shimizu

(10) Patent No.: US 9,684,112 B2
(45) Date of Patent: Jun. 20, 2017

(54) LIGHTING DEVICE, DISPLAY DEVICE AND TELEVISION DEVICE

(71) Applicant: SHARP KABUSHIKI KAISHA, Osaka-shi, Osaka (JP)

(72) Inventor: Takaharu Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 44 days.

(21) Appl. No.: 14/901,571

(22) PCT Filed: Jun. 27, 2014

(86) PCT No.: PCT/JP2014/067206
§ 371 (c)(1),
(2) Date: Dec. 28, 2015

(87) PCT Pub. No.: WO2014/208733
PCT Pub. Date: Dec. 31, 2014

(65) Prior Publication Data
US 2016/0370530 A1 Dec. 22, 2016

(30) Foreign Application Priority Data

Jun. 28, 2013 (JP) ................................ 2013-136240

(51) Int. Cl.
*F21V 8/00* (2006.01)
*H04N 9/31* (2006.01)
*G02F 1/1333* (2006.01)

(52) U.S. Cl.
CPC ......... *G02B 6/0031* (2013.01); *G02B 6/0083* (2013.01); *G02B 6/0085* (2013.01);
(Continued)

(58) Field of Classification Search
CPC .. G02B 6/0031; G02B 6/0083; G02B 6/0085; G02B 6/0088; H04N 9/31; G02F 1/133308; G02F 2001/133314
See application file for complete search history.

(56) References Cited

U.S. PATENT DOCUMENTS 6,935,766 B2 * 8/2005 Ato ...................... G02B 6/0088
349/58
8,681,293 B2 * 3/2014 Obata .................. G02B 6/0088
349/62
(Continued)

FOREIGN PATENT DOCUMENTS

JP 2007-265882 A 10/2007
WO WO 2013/008741 A1 1/2013
(Continued)

*Primary Examiner* — Alan Cariaso
(74) *Attorney, Agent, or Firm* — Birch, Stewart, Kolasch & Birch, LLP

(57) ABSTRACT

A backlight device includes an LED, a light guide plate having one edge surface as a light entrance surface, one plate surface as a light exit surface and another plate surface as an opposite plate surface, further includes a chassis having a bottom plate portion that includes a light guide plate support portion supporting the light guide plate from a side of the opposite plate surface and a light guide plate non-support portion not supporting the light guide plate from the side of the opposite plate surface, and further includes a reflection sheet having an extended reflection portion that extends closer to the LED than the light entrance surface of the light guide plate and having a cutout portion that is formed by cutting out at least a part of a portion of the extended reflection portion overlapping with the light guide plate non-support portion.

15 Claims, 29 Drawing Sheets

(52) U.S. Cl.
CPC .............. *G02B 6/0088* (2013.01); *H04N 9/31* (2013.01); *G02F 1/133308* (2013.01); *G02F 2001/133314* (2013.01)

(56) References Cited

U.S. PATENT DOCUMENTS

| | | | |
|---|---|---|---|
| 9,046,635 B2* | 6/2015 | Bae | G02B 6/0088 |
| 9,151,465 B2* | 10/2015 | Fujiuchi | F21V 7/005 |
| 2007/0230217 A1 | 10/2007 | Sakaki | |
| 2014/0307175 A1 | 10/2014 | Oka | |
| 2014/0340586 A1* | 11/2014 | Terashima | G02B 6/0055 |
| | | | 348/790 |

FOREIGN PATENT DOCUMENTS

| | | |
|---|---|---|
| WO | WO 2013/039001 A1 | 3/2013 |
| WO | WO 2013/054780 A1 | 4/2013 |
| WO | WO 2013/077243 A1 | 5/2013 |

\* cited by examiner

LIGHTING DEVICE, DISPLAY DEVICE AND TELEVISION DEVICE

TECHNICAL FIELD

The present invention relates to a lighting device, a display device and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be reduced. Liquid crystal panels included in the liquid crystal display devices do not emit light, and thus backlight devices are required as separate lighting devices. The backlight devices are classified broadly into a direct type and an edge-light type according to mechanisms thereof. For realizing further reduction in thicknesses of the liquid crystal display devices, the edge-light type backlight devices including light guide plates are preferably used, and one described in PTL 1 below is known as one example thereof.

CITATION LIST

Patent Literature

PTL 1: Japanese Unexamined Patent Application Publication No. 2007-265882

Technical Problem

An edge-light type backlight unit described in PTL 1 above includes a light guide plate, cold cathode fluorescent lamps arranged on a side-surface side of the light guide plate, a reflection sheet arranged on a back-surface side of the light guide plate, and a reflector that supports the reflection sheet from a back surface thereof and covers the cold cathode fluorescent lamps to reflect light from the cold cathode fluorescent lamps onto the light guide plate. The reflector is provided with a convex portion, by which the reflection sheet is forced to come into contact with an edge of the light guide plate, and thus diffuse reflection of light on the edge of the light guide plate is suppressed.

However, there is a case where the convex portion as described above is difficult to be provided in the reflector due to a design, and if a hole portion or a concave portion is formed in the reflector because of the design to the contrary, the light guide plate and the reflection sheet are not supported partially. Then, a part of the reflection sheet, which overlaps with the hole portion or the concave portion, is separated from the light guide plate and the light from the cold cathode fluorescent lamps reflects off the separated part of the reflection sheet and directly enters the back surface of the light guide plate, and exits the light guide plate through a front surface thereof as it is, so that a bright region is locally generated and luminance unevenness may be caused.

SUMMARY OF INVENTION

The invention has been completed based on circumstances as described above, and aims to suppress luminance unevenness.

Solution to Problem

A lighting device of the invention includes: a light source; a light guide plate having a plate shape and including at least one edge surface as a light entrance surface through which light from the light source enters, one plate surface as a light exit surface through which the light exits the light guide plate, and another plate surface as an opposite plate surface being opposite to the light exit surface; a chassis having a bottom plate portion that includes a light guide plate support portion supporting the light guide plate from a side of the opposite plate surface and a light guide plate non-support portion not supporting the light guide plate from the side of the opposite plate surface; and a reflection member that is disposed between the opposite plate surface of the light guide plate and the bottom plate portion of the chassis and reflects the light travelling through the light guide plate toward the light exit surface, the reflection member having an extended reflection portion that extends closer to the light source than the light entrance surface of the light guide plate and having a cutout portion that is formed by cutting out at least a part of a portion of the extended reflection portion overlapping with the light guide plate non-support portion.

According to such a configuration, light emitted from the light source enters the light guide plate through the light entrance surface, and is then, for example, reflected toward the light exit surface by the reflection member that is disposed between the opposite plate surface opposite to the light exit surface and the bottom plate portion of the chassis, and thereby propagating in the light guide plate and then exits through the light exit surface. Since the reflection member has the extended reflection portion that extends so as to be closer to the light source than the light entrance surface of the light guide plate, by reflecting the light from the light source by the extended reflection portion, light entering efficiency for the light entrance surface is enhanced. On the other hand, since the bottom plate portion of the chassis has the light guide plate support portion that supports the light guide plate from the side of the opposite plate surface and the light guide plate non-support portion that does not support the light guide plate from the side of the opposite plate surface, if the portion overlapping with the light guide plate non-support portion is included in the extended reflection portion, the overlapping portion may be separated from the opposite plate surface and the separated portion reflects the light from the light source to cause the light to enter the opposite plate surface, so that the entering light is likely to directly exit from the light exit surface to cause a locally bight region, that is, luminance unevenness.

Since the cutout portion is formed in the reflection member by cutting out at least a part of the portion of the extended reflection portion overlapping with the light guide plate non-support portion, so that a portion of the extended reflection portion is less likely to be separated from the opposite plate surface of the light guide plate due to the light guide plate non-support portion, and light from the light source is less likely to reflect off the extended reflection portion and less likely to directly enter through the opposite plate surface. Thereby, the light that has entered through the opposite plate surface is less likely to directly exit the light guide plate through the light exit surface, so that luminance unevenness is hard to be caused in the light output through the light exit surface.

As aspects of the lighting device of the invention, the following preferable configurations are provided.

(1) The reflection member may include the cutout portion having a cutout edge that is flush with the light entrance surface or opposite to the light source with respect to the light entrance surface. According to such a configuration, compared to a configuration that the cutout edge of the cutout portion is closer to the light source than the light entrance surface, a portion of the extended reflection portion is less likely to be separated from the opposite plate surface of the light guide plate due to the light guide plate non-support portion, and light from the light source is less likely to reflect off the extended reflection portion and is less likely to directly enter through the opposite plate surface, thus making it possible to suppress luminance unevenness more suitably.

(2) The cutout edge of the cutout portion may be arranged opposite to the light source with respect to the light entrance surface. According to such a configuration, compared to a configuration that the cutout edge of the cutout portion is flush with the light entrance surface, the cutout edge is less likely to be closer to the light source than the light entrance surface even if positional errors may be caused in arrangement of the cutout edge of the cutout portion because of tolerance of a dimension, tolerance of attachment or the like, thus making it possible to suppress occurrence of luminance unevenness more suitably.

(3) The light guide plate non-support portion may have an edge that is opposite to the light source with respect to the light entrance surface, and the cutout edge of the cutout portion of the reflection member may be closer to the light entrance surface than the edge of the light guide plate non-support portion. According to such a configuration, reflection light reflecting off the reflection member is sufficiently secured and use efficiency of light is less likely to be lowered, compared to a configuration that the cutout edge of the cutout portion is flush with the edge of the light guide plate non-support portion and an amount of reflection light reflecting off the reflection member decreases so that use efficiency of light is lowered. Note that, when the cutout edge of the cutout portion is disposed so as to be closer to the light entrance surface than the edge of the light guide plate non-support portion, a portion of the extended reflection portion may be separated from the opposite plate surface of the light guide plate due to the light guide plate non-support portion. However, the cutout edge of the cutout portion is flush with the light entrance surface or opposite to the light source with respect to the light entrance surface and therefore, reflection light reflecting off the extended reflection portion extending closer to the light source than the light entrance surface is less likely to directly enter the light guide plate through the opposite plate surface, so that luminance unevenness is hard to occur surely.

(4) The cutout portion of the reflection member may have an opening size in a direction along the light entrance surface continuously decreasing as is farther away from the light source. According to such a configuration, an area of the reflection member, that is, an amount of reflection light reflecting off the reflection member in the direction along the light entrance surface continuously changes, so that compared to a configuration that a dimension of the cutout portion in the direction along the light entrance surface is constant or a configuration that the dimension decreases in a stepwise manner as being farther away from the light source, a dark region that may be caused in the light exit surface due to the cutout portion is less likely to be visually recognized, which is more suitable for suppressing occurrence of luminance unevenness.

(5) The cutout portion of the reflection member may have a formation range in the direction along the light entrance surface greater than a formation range of the light guide plate non-support portion in the direction along the light entrance surface. According to such a configuration, since the cutout portion extends to have a formation range overlapping with the light guide plate support portion in the direction along the light entrance surface, an amount of reflection light changes continuously between the portion of the extended reflection portion overlapping with the light guide plate non-support portion, and the portion of the extended reflection portion overlapping with the light guide plate support portion. Thereby, a dark region that may be caused in the light exit surface due to the cutout portion is less likely to be visually recognized, which is further suitable for suppressing occurrence of luminance unevenness. Even if positional errors may be caused in arrangement of the cutout portion because of tolerance of a dimension, tolerance of attachment, or the like, the cutout portion is likely to be disposed so as to appropriately overlap with the light guide plate non-support portion in the direction along the light entrance surface, so that an effect of suppressing luminance unevenness by the cutout portion is achieved more reliably.

(6) The cutout portion of the reflection member may have a formation range in the direction along the light entrance surface greater than a formation range of the cutout portion extending in the direction from the light source to the light entrance surface. According to such a configuration, even if positional errors may be caused in arrangement of the cutout portion in the direction along the light entrance surface because of tolerance of a dimension, tolerance of attachment, or the like, the cutout portion is likely to be disposed so as to appropriately overlap with the light guide plate non-support portion in the direction along the light entrance surface, so that an effect of suppressing luminance unevenness by the cutout portion is achieved more reliably. In this case, if the formation range of the cutout portion in the direction from the light source to the light entrance surface is greater than or same as the formation range of the cutout portion in the direction along the light entrance surface with dealing with the positional errors that may be caused as described above in the arrangement of the cutout portion, a formation range of the cutout portion in the direction from the light source to the light entrance surface tends to be excessively large and an amount of reflection light reflecting off the reflection member decreases, so that use efficiency of light is likely to be lowered. Compared to this, if the formation range of the cutout portion in the direction along the light entrance surface is set to be wider than the formation range at the cutout portion in the direction from the light source to the light entrance surface, an effect of suppressing luminance unevenness by the cutout portion as described above is achieved more reliably while sufficiently ensuring use efficiency of light.

(7) The light guide plate non-support portion may include an opening that is in the bottom plate portion. According to such a configuration, compared to a configuration that the light guide plate non-support portion has a recessed portion which is formed by recessing the bottom plate portion, a portion of the extended reflection portion may be likely to be separated from the opposite plate surface of the light guide plate due to the opening, which is the light guide plate non-support portion, and a distance of the separation tends to be greater. However, the reflection member including the cutout portion is less likely to have such a problem, thus making it possible to effectively suppress luminance unevenness.

(8) The lighting device may further include a light source board on which the light source is mounted and a power feed portion for feeding power to the light source on the light source board. The power feed portion may be exposed to outside through the opening of the bottom plate portion. According to such a configuration, when the opening is formed so that the opening causes the power feed portion to be exposed to outside, it is possible to cause the power feed portion to pass through the opening easily. In this manner, the opening which allows passing the power feed portion is disposed near the light source board and the light entrance surface of the light guide plate in the bottom plate portion, and thus is easy to be disposed necessarily so as to overlap also with the extended reflection portion of the reflection member. However, in the reflection member having the cutout portion, a portion of the extended reflection portion is less likely to be separated from the opposite plate surface of the light guide plate due to the opening, which is the light guide plate non-support portion, and light from the light source is less likely to reflect off the extended reflection portion and is less likely to directly enter through the opposite plate surface, thus making it possible to effectively suppress luminance unevenness.

(9) The light source board may have a light source mounting portion on which the light source is mounted, and a protrusion for power feeding protruding from the light source mounting portion in a direction from the light exit surface to the opposite plate surface, the protrusion for power feeding may have the power feed portion thereon. The power feed portion and the protrusion for power feeding may be exposed to outside through the opening of the bottom plate portion. According to such a configuration, compared to a configuration that the power feed portion is arranged in a part of the light source mounting portion and the light source mounting portion includes a portion having no light source, with a configuration including the protrusion for power feeding where the power feed portion is disposed so as to be projected from the light source mounting portion along the direction from the side of the light exit surface to the side of the opposite plate surface, the light source mounting portion may not include the portion having no light source thereon, so that a portion in which an amount of irradiated light from the light source decreases locally is less likely to be generated in the light entrance surface of the light guide plate. Thereby, even if a frame of the lighting device is increasingly narrowed and the light source and the light entrance surface have a closer positional relation, a dark region is less likely to be generated in light output from the light exit surface, thus making it possible to suppress occurrence of luminance unevenness associated with narrowing of the frame. In addition, since the protrusion for power feeding protruding from the light source mounting portion along the direction from the side of the light exit surface to the side of the opposite plate surface, and the power feed portion disposed thereon are exposed to outside through the opening that is formed in the bottom plate portion, so that sufficiently enhanced workability is also achieved when the power feed portion is passed through the opening.

(10) The opening of the bottom plate portion may have an opening edge that is opposite to the light source with respect to the light entrance surface. Thereby, even if a protrusion dimension by which the protrusion for power feeding protrudes from the light source mounting portion is small, a sufficiently large formation range of the opening is ensured so that the opening edge is disposed so as to be opposite to the light source with respect to the light entrance surface, and thus excellent workability is achieved for working of passing the power feed portion through the opening. When the protrusion dimension by which the protrusion for power feeding protrudes from the light source mounting portion is reduced, reduction in thickness of the lighting device is accomplished.

(11) The light guide plate non-support portion may include a recessed portion that is recessed in the bottom plate portion so as to be farther away from the light guide plate, and a deformation portion that is adjacent to the recessed portion in the bottom plate portion, the deformation portion may be away from the opposite plate surface of the light guide plate by a distance that is relatively greater than a distance between the opposite plate surface of the light guide plate support portion and the light guide plate support portion. If the recessed portion that is recessed so as to be farther away from the light guide plate is formed in the bottom plate portion, the deformation portion may be generated by warpage or bending in the bottom plate portion, and such a deformation portion is in a portion of the bottom plate portion adjacent to the recessed portion. Thus, for example, even if the recessed portion is formed not overlapping with the extended reflection portion of the reflection member, the deformation portion may be formed in a portion of the bottom plate portion overlapping with the extended reflection portion of the reflection member. The deformation portion is away from the opposite plate surface of the light guide plate with a distance relatively greater than a distance between the opposite plate surface and the light guide plate support portion. In the reflection member having the cutout portion, a portion of the extended reflection portion is less likely to be separated from the opposite plate surface of the light guide plate due to the deformation portion, which is the light guide plate non-support portion, and light from the light source is less likely to reflect off the extended reflection portion and is less likely to directly enter the opposite plate surface, thus making it possible to effectively suppress luminance unevenness.

(12) The lighting device may further include a board that is opposite to the light guide plate with respect to the bottom plate portion and is attached to the recessed portion. This makes it possible to attach the board, which is provided so as to be opposite to the light guide plate with respect to the bottom plate portion, by using the recessed portion. In other words, even if the deformation portion may be formed in the bottom plate portion according to the formation of the recessed portion in the bottom plate portion in order to attach the board, the reflection member including the cutout portion effectively suppresses luminance unevenness resulting from the deformation portion.

A display device of the invention includes the lighting device above, and a display panel which displays an image by using light from the lighting device. With such a display device, luminance unevenness of the lighting device is suppressed. Thus, the display device of the invention has excellent display quality associated with the image displayed on the display panel and is suitable for an increase in screen size.

A television device of the invention includes the display device above. With such a television device, luminance unevenness of the lighting device included in the display device is suppressed. Thus, the display device of the invention has excellent display quality associated with a television image displayed on the display panel and is suitable for an increase in screen size.

Advantageous Effects of Invention

According to the invention, luminance unevenness is able to be suppressed.

DESCRIPTION OF EMBODIMENTS

<Embodiment 1>

Figure 2:
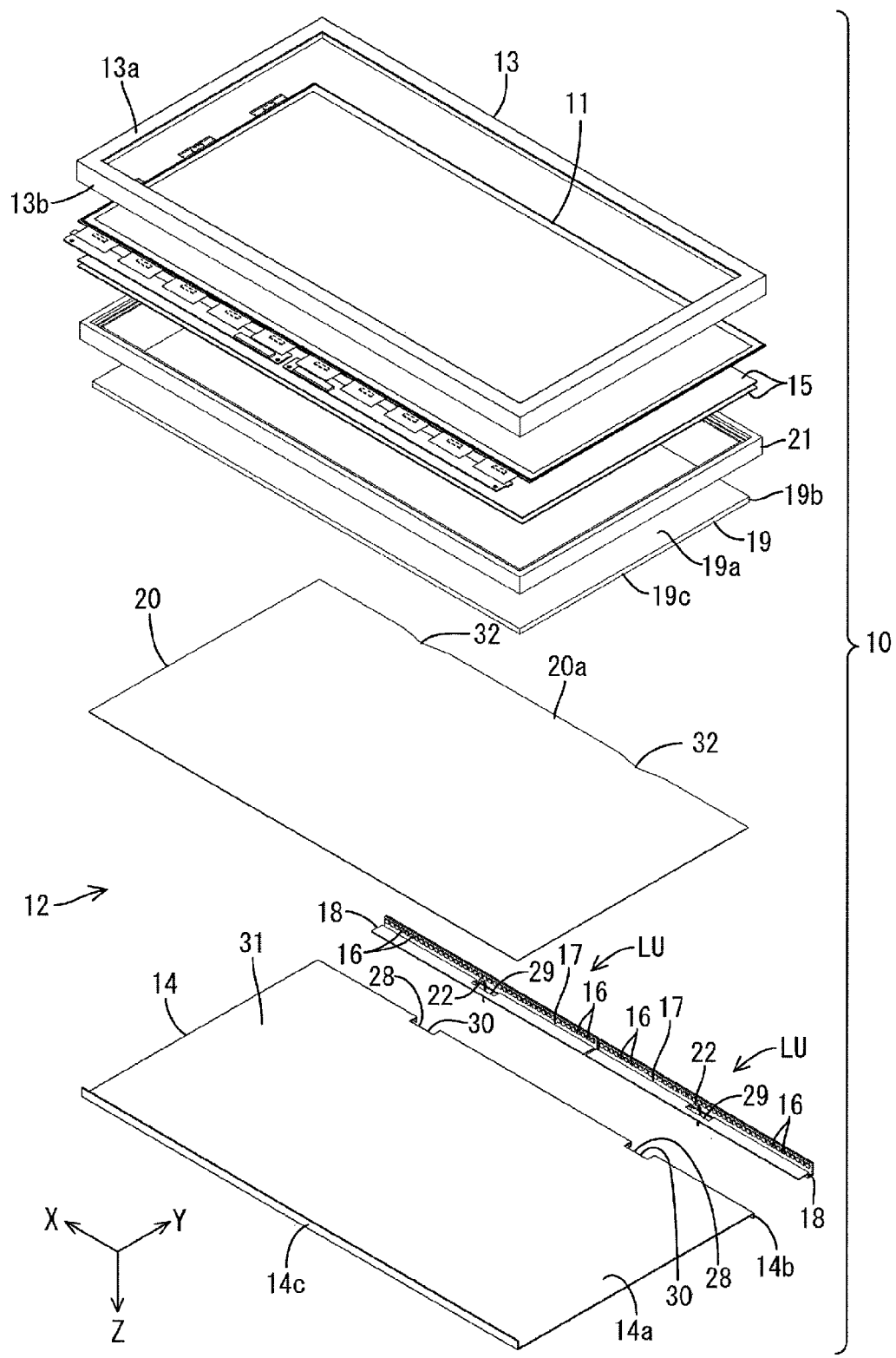
FIG. 2 is an exploded perspective view illustrating a schematic configuration of a liquid crystal display device.
Figure 3:
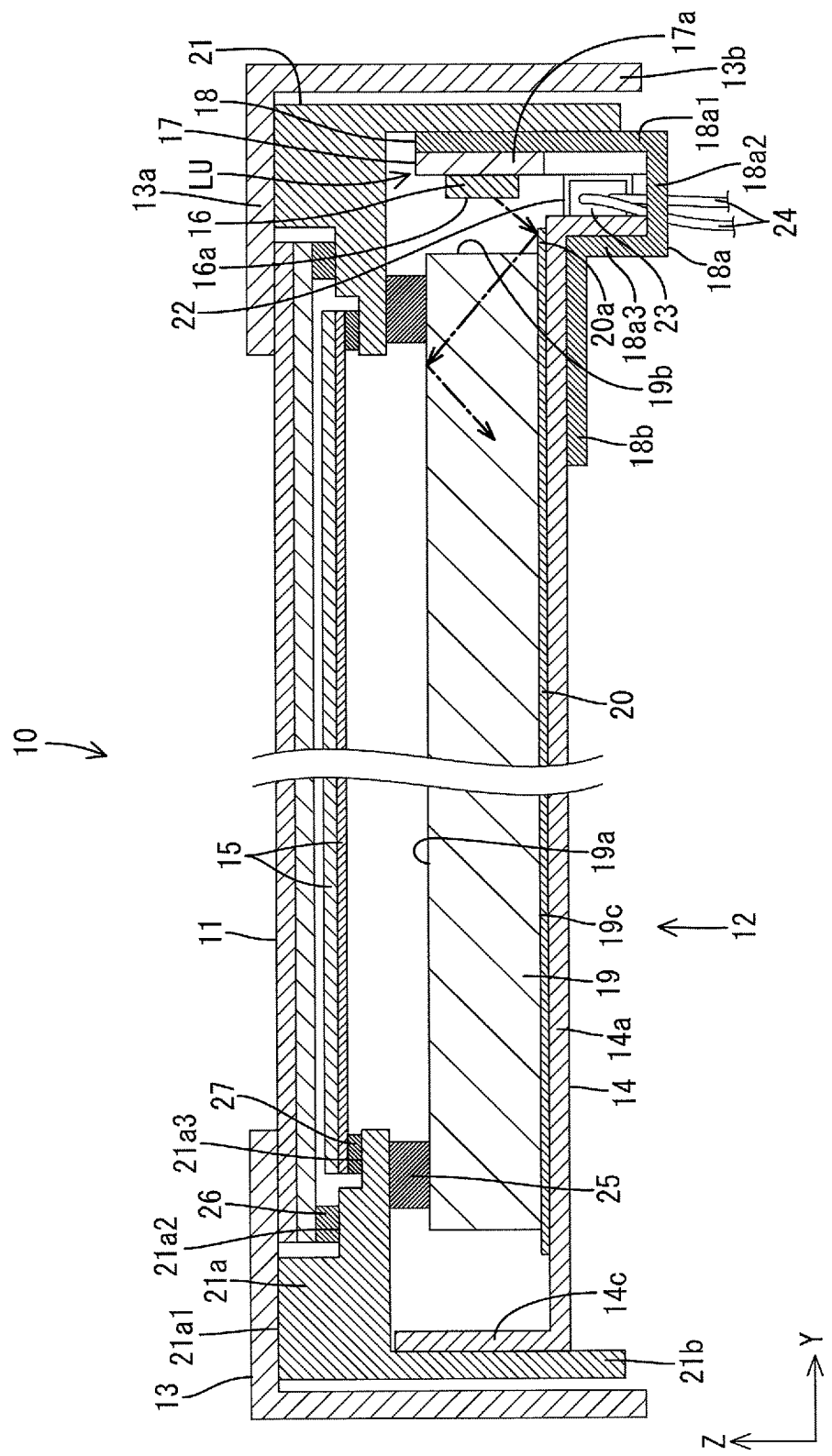
FIG. 3 is a cross-sectional view of the liquid crystal display device taken along a short-side direction thereof for illustrating a cross-sectional configuration.

Embodiment 1 of the invention will be described with reference to FIG. 1 to FIG. 9. In the present embodiment, a liquid crystal display device 10 will be exemplified. Note that, X-axes, Y-axes and Z-axes are provided in portions of the drawings, respectively, and the axes in each drawing correspond to the respective axes in other drawings. In FIG. 3, FIG. 7 and FIG. 8, the upper side and the lower side correspond to the front side and the rear side, respectively.

Figure 1:
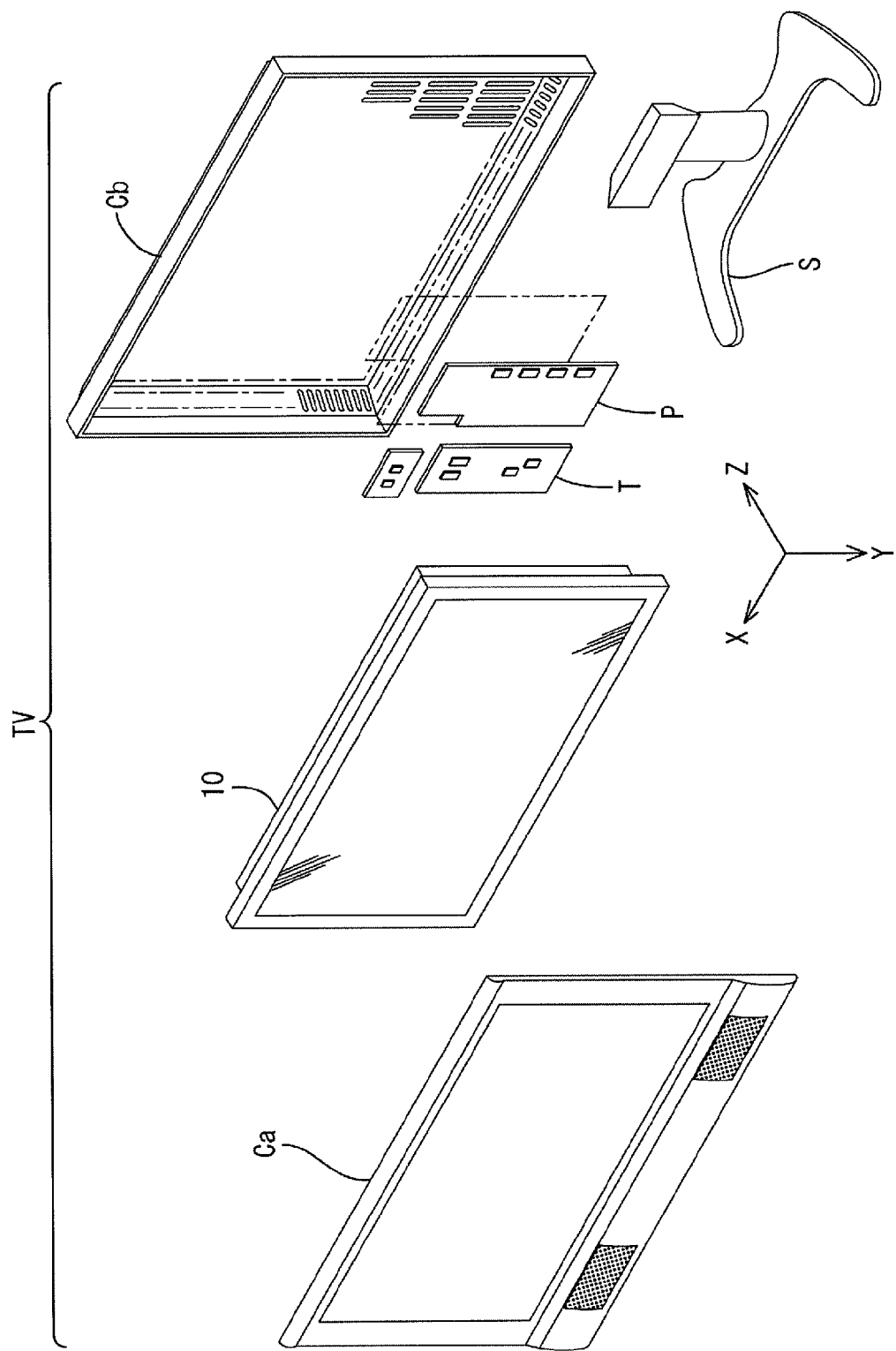
FIG. 1 is an exploded perspective view illustrating a schematic configuration of a television device according to Embodiment 1 of the invention.

As illustrated in FIG. 1, a television device TV according to the present embodiment includes the liquid crystal display device 10, front and rear cabinets Ca, Cb that hold the liquid crystal display device 10 therebetween, a power source P, a tuner T, and a stand S. An overall shape of the liquid crystal display device (display device) 10 is a landscape rectangular, and, as illustrated in FIG. 2, includes at least a liquid crystal panel 11 which is a display panel, a backlight device (lighting device) 12 which is a lighting device for supplying illumination light to the liquid crystal panel 11, and a first frame 13 that supports the liquid crystal panel 11 from the front side and holds the liquid crystal panel 11 between the first frame 13 and the backlight device 12. Among them, the liquid crystal panel 11 is attached to the liquid crystal display device 10 with a posture in which a display screen for displaying an image thereon faces the front side. The first frame 13 is made of metal (for example, made of aluminum), and is entirely formed in a frame shape extending along an outer peripheral end of the liquid crystal panel 11. The first frame 13 has a first frame main body (frame portion) 13a which extends along the outer peripheral end of the liquid crystal panel 11 and has a rectangular frame shape in a plan view, and a first frame surrounding portion (cylindrical portion) 13b that is connected to an outer peripheral end of the first frame main body 13a and surrounds the backlight device 12 from an outer peripheral side.

The liquid crystal panel 11 will be described first. As illustrated in FIG. 2, the liquid crystal panel 11 includes a pair of glass substrates having a landscape rectangular shape in a plan view and having high light transmission capability. The glass substrates are bonded together with a predetermined gap therebetween. The liquid crystal layer is sealed between the substrates. On one of the substrates (array substrates), switching components (e.g., TFTs) connected to source lines and gate lines that are perpendicular to each other, pixel electrodes connected to the switching components, an alignment film, and the like are provided. On the other substrate, a color filter having color sections such as R (red), G (green) and B (blue) color sections arranged in a predetermined pattern, counter electrodes, an alignment film, and the like are provided. The liquid crystal panel 11 is sectioned into a display area that is in a center area of a screen and allows display of an image (active area) and a non-display area that is in an outer peripheral end area of the screen and has a frame shape surrounding the periphery of the display area (non-active area). Note that, a pair of front and rear polarizing plates are attached to outer surfaces of the pair of glass substrates.

Next, the backlight device 12 will be described. As illustrated in FIG. 2 and FIG. 3, the backlight device 12 includes at least a chassis 14 having a bottom plate portion 14*a*, an LED unit (light source unit) LU including LEDs (Light Emitting Diodes) 16 that are light sources, a light guide plate 19 that is placed on the bottom plate portion 14*a* of the chassis 14 and guides light from the LED unit LU, a reflection sheet (reflection member) 20 that is arranged between the light guide plate 19 and the bottom plate portion 14*a*, a second frame 21 that supports the light guide plate 19 from the front side and sandwiches and holds the light guide plate 19 and the reflection sheet 20 between the chassis 14 and the second frame 21, and an optical sheet (optical member) 15 that is arranged between the liquid crystal panel 11 and the light guide plate 19. The LED unit LU includes the LEDs 16, an LED board (light source board) 17 on which the LEDs 16 are mounted, and a heat dissipation member 18 on which the LED board 17 is mounted. In the backlight device 12, a pair of LED units LU are arranged at one of both long-side edges thereof (on an upper side in FIG. 2, on a right side in FIG. 3), and the LEDs 16 that are provided on each of the LED units LU are positioned closer to the one long-side edge of the liquid crystal panel 11. In this manner, the backlight device 12 according to the present embodiment is a single edge light type (side light type) in which light enters the light guide plate 19 through only one surface. The pair of LED units LU are arranged so as to be adjacent to each other along a long-side direction of the light guide plate 19. Each component of the backlight device 12 will be specifically described below.

The chassis 14 is made of metal, for example, aluminum, and has higher thermal conductivity compared to a chassis made of synthetic resin. As illustrated in FIG. 2 and FIG. 3, the chassis 14 has the bottom plate portion 14*a* that is able to cover substantially overall areas of the light guide plate 19 and the reflection sheet 20 from the rear side. The bottom plate portion 14*a* has a substantially flat plate shape extending along a plate surface of the light guide plate 19 and is formed in a landscape rectangular shape similarly to the light guide plate 19 and the reflection sheet 20, and has a size in a plan view (a long-side dimension and a short-side dimension) larger than those of the light guide plate 19 and the reflection sheet 20. The bottom plate portion 14*a* has a posture in which a long-side direction, a short-side direction, and a thickness direction correspond to an X-axis direction, a Y-axis direction, and a Z-axis direction, respectively. Among a pair of long-side outer edges of the bottom plate portion 14*a*, from the outer edge on the LED unit LU side (the upper side in FIG. 2, the right side in FIG. 3), a first side plate portion 14*b* is provided so as to extend to the rear side along the Z-axis direction, and from the outer edge on the opposite side to the LED unit LU side (a lower side in FIG. 2, a left side in FIG. 3), a second side plate portion 14*c* is provided so as to upstand to the front side (opposite side to that of the first side plate portion 14*b*) along the Z-axis direction. Each of the first side plate portion 14*b* and the second side plate portion 14*c* is bent substantially at right angle from each long-side outer edge of the bottom plate portion 14*a*, and has a plate surface orthogonal to the plate surface of the bottom plate portion 14*a* and in parallel to the long-side direction (X-axis direction) of the bottom plate portion 14*a*. Further, since the first side plate portion 14*b* and the second side plate portion 14*c* are arranged so as to extend an almost full length (as to the first side plate portion 14*b*, excluding a chassis-side opening 28, which will described below) along the long-side direction in the bottom plate portion 14*a*, mechanical strength of the bottom plate portion 14*a* may be increased, in particular, deformation such as bending or warpage along a short-side direction is less likely to be caused in the bottom plate portion 14*a*.

As illustrated in FIG. 2 and FIG. 3, optical sheets 15 have a landscape rectangular shape in a plan view similarly to the liquid crystal panel 11, and have a size in a plan view (a short-side dimension and a long-side dimension) slightly smaller than that of the liquid crystal panel 11. The optical sheets 15 are arranged so as to be positioned between the liquid crystal panel 11 and the light guide plate 19 to thereby transmit light output from the light guide plate 19 and output the transmission light to the liquid crystal panel 11 while applying predetermined optical actions thereto. The optical sheets 15 have a sheet shape whose thickness is thinner than that of the light guide plate 19 and form a group of the optical sheets 15 by laminating a plurality of sheets (two sheets in the present embodiment) with almost no gap therebetween, and the group of the optical sheets 15 is positioned with a predetermined space from each of a rear-side plate surface of the liquid crystal panel 11 and a front-side plate surface of the light guide plate 19 (light exit surface 19*a*). Examples of a specific type of the optical sheets 15 include a diffuser sheet, a lens sheet, and a reflecting type polarizing sheet, and the optical sheets may be selected appropriately therefrom for usage.

Next, configurations of the LEDs 16, the LED boards 17, and the heat dissipation members 18, which form the LED units LU, will be described. As illustrated in FIG. 2 and FIG. 3, each of the LEDs 16 is configured so as to seal an LED chip with a resin material on a board portion fixed to the LED board 17. The LED chip mounted on the board portion has one main light emission wavelength, and specifically, the LED chip that emits light in a single color of blue is used. On the other hand, the resin material that seals the LED chip contains phosphors dispersed therein, and the phosphors emit light in a predetermined color when excited by blue light emitted from the LED chip. The phosphors may be selected as appropriate from yellow phosphors that emit yellow light, green phosphors that emit green light, and red phosphors that emit red light, to be used in combination, or one of them may be used alone. Each of the LEDs 16 is in a so-called top-surface-emitting type in which a surface opposite to a mounting surface on the LED board 17 serves as a main light-emitting surface 16*a*. The main light-emitting surface 16*a* of the LED 16 has a substantially rectangular shape which is landscape in a front view (long and narrow along the X-axis direction) (refer to FIG. 8), and has a short-side dimension which is the same as or slightly smaller than a dimension of plate thickness of the light guide plate 19.

One LED board 17 is provided on each of the pair of LED units LU as illustrated in FIG. 2 and FIG. 3. The LED board 17 has a long and narrow plate shape that entirely extends along a long-side direction of the chassis 14 (the X-axis direction, a longitudinal direction of a light entrance surface 19*b* in the light guide plate 19), and is attached to the heat dissipation member 18 and housed in the backlight device 12 with a posture in which a plate surface thereof is in parallel to the X-axis direction and the Z-axis direction, that is, a posture in which the plate surface is orthogonal to the plate surfaces of the liquid crystal panel 11 and the light guide plate 19 (optical sheets 15). The LED board 17 is attached so that a plate surface opposite to the mounting surface on which the LEDs 16 are mounted is in contact with the heat dissipation member 18 and is arranged on the right side in FIG. 3 with a predetermined arrangement distance from the long-side edge (light entrance surface 19*b*) of the light guide plate 19. Accordingly, the direction in which the LEDs 16 and the LED board 17 are arrayed in line with the light guide plate 19 almost corresponds to the Y-axis direction, and an optical axis in each of the LEDs 16, that is, an advancing direction of light that has the highest light emission intensity almost corresponds to the Y-axis direction (direction in parallel to the plate surface of the liquid crystal panel 11).

Specifically, as illustrated in FIG. 2 and FIG. 3, the LED board 17 has an LED mounting portion (light source mounting portion) 17*a* which extends along the X-axis direction and on which a plurality of LEDs 16 are mounted, and a protrusion for power feeding 17*b*. The protrusion for power feeding 17*b* protrudes toward the rear side from the LED mounting portion 17*a* along the Z-axis direction and includes a board-side connector (power feed portion) 22 used for feeding power to the LEDs 16. The LED mounting portion 17*a* has a posture in which a long-side direction (length direction) and a short-side direction (width direction) thereof correspond to the X-axis direction and the Z-axis direction, respectively, and further, a plate thickness direction orthogonal to the plate surface corresponds to the Y-axis direction, and while a length dimension of the LED mounting portion 17*a* is about a half of the long-side dimension of the light guide plate 19, a width dimension thereof is slightly larger than a dimension of the plate thickness of the light guide plate 19. In the LED mounting portion 17*a*, an inner side thereof, that is, a plate surface facing the light guide plate 19 side (surface opposite to the light guide plate 19) is a mounting surface on which the LEDs 16 are surface-mounted. A plurality of LEDs 16 are arranged in a row (linearly) along the length direction (X-axis direction) on the mounting surface of the LED mounting portion 17*a* at a predetermined arrangement interval. That is, it may be said that the plurality of LEDs 16 are arranged intermittently along the long-side direction at one long-side edge of the back light device 12. Accordingly, a direction in which the LEDs 16 are arranged matches the length directions (X-axis direction) of the LED board 17 and the light guide plate 19. Intervals between the adjacent LEDs 16 in the X-axis direction which is the direction in which the LEDs 16 are arranged, that is, array intervals (array pitches) of the LEDs 16 are almost equal. A wiring pattern (not illustrated) that is made of a metal film (copper foil or the like) and extends along the X-axis direction is connected to terminals of the respective LEDs 16 is formed on the mounting surface of the LED mounting portion 17*a*.

As illustrated in FIG. 7 and FIG. 8, the protrusion for power feeding 17*b* is provided so as to be in continuous to a center portion of the LED mounting portion 17*a* in a length direction and protrudes along a direction extending from the LED mounting portion 17*a* to a bottom wall portion 18*a*2 of the heat dissipation member 18 described below (a direction extending from the light exit surface 19*a* to an opposite plate surface 19*c* in the light guide plate 19). That is, the LED board 17 has a substantially T-shape in a front view. The protrusion for power feeding 17*b* has a landscape rectangular shape in a front view, and has a posture in which a long-side direction and a short-side direction (direction of protruding from the LED mounting portion 17*a*) correspond to the X-axis direction and the Z-axis direction, respectively, and further, a plate thickness direction orthogonal to the plate surface corresponds to the Y-axis direction, and a length dimension of the LED protrusion for power feeding 17*b* is sufficiently smaller than that of the LED mounting portion 17*a*. The protrusion for power feeding 17*b* has a plate surface facing an inner side thereof, that is, a plate surface on the same side as the mounting surface in the LED mounting portion 17*a*, and the plate surface is a mounting surface on which the board-side connector 22 is surface-mounted. On the mounting surface of the protrusion for power feeding 17*b*, the wiring pattern formed on the mounting surface of the LED mounting portion 17*a* is formed continuously and the board-side connector 22 is mounted being positioned at an end of the wiring pattern. The board-side connector 22 includes a board-side housing 22*a* that is made of synthetic resin and has a substantially cylindrical shape having one end (right side in FIG. 8) in the X-axis direction being opened, and a board-side terminal fitting (not illustrated) that is housed in the board-side housing 22*a* and connected to the end of the wiring pattern. A wiring-side connector (power feed portion) 23 that is provided at an end of a wiring member 24 connected to an LED driving circuit board, which is not illustrated, is able to be connected to the board-side connector 22 by fitting with each other, and a fitting direction thereof corresponds to the X-axis direction. Specifically, the wiring-side connector 23, when being connected, is fitted with the board-side connector 22 from the right side to the left side in FIG. 8 along the X-axis direction, and, when being disconnected, the wiring-side connector 23 is removed from the board-side connector 22, to the contrary, from the left side to the right side in FIG. 8 along the X-axis direction. When the wiring-side connector 23 is connected to the board-side connector 22 by fitting with each other in this manner, power from the LED driving circuit board is able to be supplied to each of the LEDs 16. The wiring-side connector 23 that is connected to the board-side connector 22 by fitting with each other includes a wiring-side housing 23*a* that has a substantially block shape with the X-axis direction as a length direction and is made of synthetic resin, and a wiring-side terminal fitting (not illustrated) that is housed in the wiring-side housing 23*a* and connected to an end of the wiring member 24. Note that, a base member of the LED board 17 is made of metal, for example, such as aluminum, has the wiring pattern described above formed on the surface of the base member through an insulating layer. Note that, an insulating material such as synthetic resin or ceramic is also able to be used as the material used for the base member of the LED board 17.

The wiring pattern of the LED board 17 will be described in detail. That is, a group of the LEDs 16 mounted on the LED mounting portion 17*a* of the LED board 17 according to the present embodiment is divided into right and left two groups illustrated in FIG. 8 in a parallel direction thereof (X-axis direction) and is connected to two lines of wiring patterns which run according to each of the groups. This makes is possible to reduce a voltage value required for driving the group of the LEDs 16 included in each group, compared to a case where the number of lines is set as one. To describe specific running routes of the wiring patterns, each of the two lines of wiring patterns sets an end connected to the board-side connector 22 as a start point, and from the start point, runs so as to be separated to one side and the other side of the length direction of the LED mounting portion 17*a* from a center portion of the LED mounting portion 17*a* in the length direction, which is continuous to the protrusion for power feeding 17*b*, so that the LEDs 16 that are included in each of the groups are connected in parallel. The protrusion for power feeding 17*b* is configured to be continuous to the center portion of the LED mounting portion 17a with respect to the length direction, and the two lines of wiring patterns run so as to be branched into the two sides from the center portion of the LED mounting portion 17a with respect to the length direction (X-axis direction). Accordingly, each of the wiring patterns is prevented from being arrayed along a width direction (Z-axis direction) of the LED mounting portion 17a, thus making it possible to reduce a width dimension of the LED mounting portion 17a. This makes it possible to reduce thickness of the backlight device 12 and the liquid crystal display device 10.

Figure 4:
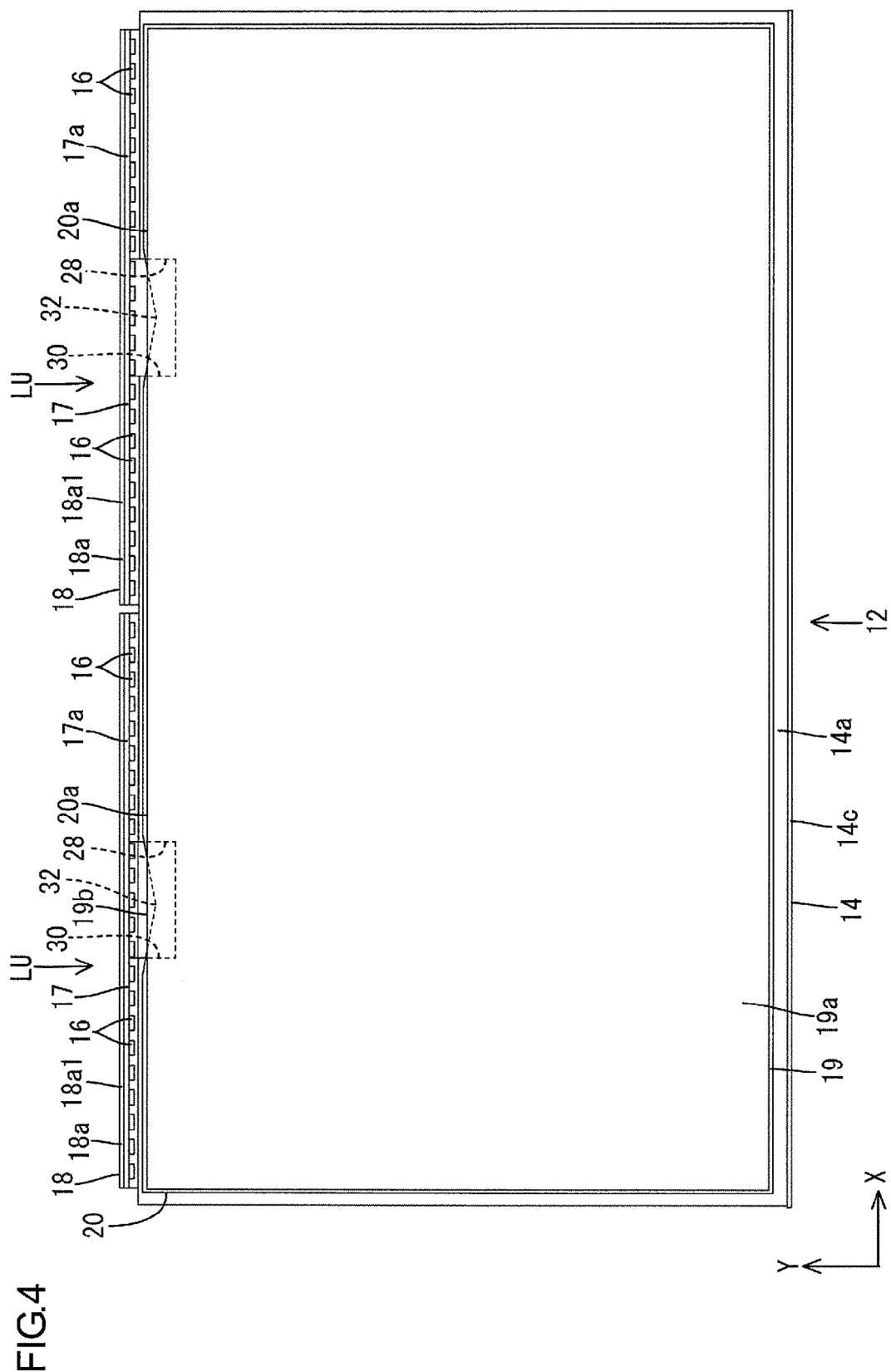
FIG. 4 is a plan view of a backlight device included in the liquid crystal display device.

The heat dissipation members 18 are made of metal having high thermal conductivity, for example, such as aluminum, and are provided by each one in the pair of LED units LU as illustrated in FIG. 3 and FIG. 4. The heat dissipation member 18 entirely extends along the long-side direction of the light guide plate 19 and has a length dimension that is almost same as the length dimension of the LED board 17 and is about a half of the long-side dimension of the light guide plate 19. The heat dissipation member 18 is attached to one long-side end of the chassis 14 and is arranged so as to be exposed to an outside of the backlight device 12, and is thereby allowed to promote heat dissipation of heat from the LEDs 16 by transferring heat transferred from the LEDs 16 via the LED board 17 to the bottom plate portion 14a of the chassis 14 or to the outside air which exists outside the backlight device 12.

As illustrated in FIG. 3, the heat dissipation member 18 includes a board housing portion 18a in which the LED board 17 is housed, and a chassis-side heat dissipation portion 18b which extends so as to be closer to the bottom plate portion 14a of the chassis 14 than the board housing portion 18a and makes contact with the bottom plate portion 14a. Among them, the board housing portion 18a includes a board attachment portion 18a1 to which the LED board 17 is attached, the bottom wall portion 18a2 that protrudes to the chassis 14 side from a rear-side end of the board attachment portion 18a1, and a side wall portion 18a3 that upstands from the end protruding from the board attachment portion 18a1 in the bottom wall portion 18a2 to the front side and faces the board attachment portion 18a1 with a predetermined interval therebetween. The LED board 17 is housed in a space formed between the board attachment portion 18a1 and the side wall portion 18a3 which form the board housing portion 18a, and is attached to the board attachment portion 18a1. The board attachment portion 18a1 has a plate surface having a plate shape in parallel to the plate surface of the LED board 17, and a length direction, a width direction, and a plate thickness direction thereof correspond to the X-axis direction, the Z-axis direction, and the Y-axis direction, respectively. The bottom wall portion 18a2 is bent substantially at right angle from the board attachment portion 18a1 and has a plate surface formed in a plate shape in parallel to the plate surface of the bottom plate portion 14a of the chassis 14. The side wall portion 18a3 is bent substantially at right angle from the bottom wall portion 18a2 and has a plate surface formed in a plate shape in parallel to each plate surface of the board attachment portion 18a1 and the LED board 17. A width dimension of the side wall portion 18a3 (stand-up dimension from the bottom wall portion 18a2) is smaller than a width dimension of the board attachment portion 18a1. The first side plate portion 14b of the chassis 14 is housed in a space formed between the side wall portion 18a3 and the LED board 17, and a plate surface of the first side plate portion 14b, which is opposite to the LED board 17, is arranged so as to be in contact with or proximate to the side wall portion 18a3.

As illustrated in FIG. 3, the chassis-side heat dissipation portion 18b has a plate surface formed in a plate shape in parallel to plate surfaces of the bottom plate portion 14a of the chassis 14 and the bottom wall portion 18a2, and a length direction, a width direction, and a plate thickness direction thereof correspond to the X-axis direction, the Y-axis direction, and the Z-axis direction, respectively. A width dimension of the chassis-side heat dissipation portion 18b (protruding dimension from the side wall portion 18a) is larger than each width dimension of the bottom wall portion 18a2 and the side wall portion 18a3. Further, the chassis-side heat dissipation portion 18b covers one long-side end of the bottom plate portion 14a of the chassis 14 from the rear side and has a plate surface on the front side thereof made in surface-contact with the rear-side plate surface of the bottom plate portion 14a over a substantially overall area, and is therefore able to efficiently transfer heat, which is transferred from the LEDs 16 through the LED board 17 and the board housing portion 18a, to the bottom plate portion 14a, thus making it possible to promote heat dissipation of the LEDs 16. In addition, since the overall area of the chassis-side heat dissipation portion 18b is exposed to an outside on the rear side of the backlight device 12 and a large part of the board housing portion 18a (part excluding a part of the board attachment portion 18a1) is exposed to the outside on the rear side of the backlight device 12, they are air-cooled with the outside air, thus making it possible to further promote heat dissipation of the LEDs 16.

The light guide plate 19 is made of a substantially transparent (high light transmissivity) synthetic resin material (e.g. acrylic resin or polycarbonate such as PMMA) which has a refractive index sufficiently higher than that of the air. As illustrated in FIG. 2 and FIG. 3, the light guide plate 19 has a landscape rectangular shape in a plan view similarly to the liquid crystal panel 11 and the optical sheet 15, and a long-side direction and a short-side direction in the plate surface thereof correspond to the X-axis direction and the Y-axis direction, respectively, and a plate thickness direction that is perpendicular to the plate surface corresponds to the Z-axis direction. The light guide plate 19 is disposed on the rear side of the optical sheet 15 with a predetermined interval so as to face with each other. The light guide plate 19 is positioned behind the liquid crystal panel 11 and the optical sheet 15 in the chassis 14, and one long-side end surface among outer peripheral end surfaces thereof faces the LEDs 16 of the LED unit LU. Accordingly, the direction in which the LEDs 16 (LED board 17) and the light guide plate 19 are arranged corresponds to the Y-axis direction, while a direction in which the optical sheet 15 (liquid crystal panel 11) and the light guide plate 19 are arranged corresponds to the Z-axis direction, and both of the arrangement directions are perpendicular to each other. The light guide plate 19 has a function of guiding light, which is emitted from the LEDs 16 along the Y-axis direction, from the long-side end surface and outputting the light from the plate surface by setting it up to be directed toward the optical sheet 15 side (front side, light exit side) while propagating the light inside thereof.

As illustrated in FIG. 3, one plate surface facing the front side (a surface facing the optical sheet 15) among a pair of front and rear plate surfaces of the light guide plate 19 is the light exit surface 19a through which the inside light exits toward the optical sheet 15 and the liquid crystal panel 11. Among a pair of long-side end surfaces having elongated shapes along the X-axis direction (the direction in which the LEDs 16 are arranged, the long-side direction of the LED board 17) of outer peripheral end surfaces adjacent to the plate surface of the light guide plate 19, one end surface (on the upper side in FIG. 2, on the right side in FIG. 3) faces the LEDs 16 (LED board 17) with a predetermined space and serves as the light entrance surface 19b that the light emitted from the LEDs 16 enters. With such a gap between the light entrance surface 19b and the LEDs 16, it is possible to prevent a situation that the light entrance surface 19b interferes the LEDs 16 when the light guide plate 19 causes thermal expansion by heat from the LEDs 16 or the like. Distances between the light entrance surface 19b and the respective facing LEDs 16 are substantially the same. It may be also said that the light entrance surface 19b forms an "end surface facing LEDs (end surface facing light sources)" because of facing the LEDs 16. On the other hand, among outer peripheral surfaces adjacent to the plate surface of the light guide plate 19, each of other three end surfaces excluding the light entrance surface 19b described above (a long-side end surface opposite to the light entrance surface 19b, and a pair of short-side both end surfaces) is an end surface not facing LEDs (end surface not facing light sources), which does not face the LEDs 16. The light entrance surface 19b is a surface in parallel to the X-axis direction (the direction in which the LEDs 16 are arranged) and the Z-axis direction, that is, the plate surface of the LED board 17, and is a surface which is almost perpendicular to the light exit surface 19a. A direction in which the LEDs 16 and the light entrance surface 19b are arranged matches the Y-axis direction and is in parallel to the light exit surface 19a.

As illustrated in FIG. 3, the reflection sheet 20 is disposed so as to cover the rear side of the light guide plate 19, that is, the opposite plate surface 19c opposite to the light exit surface 19a (a surface facing the bottom plate portion 14a of the chassis 14), and is allowed to reflect light, that exits toward the outside of the rear side through the opposite plate surface 19c, and set up the light toward the front side. In other words, the reflection sheet 20 is disposed so as to be sandwiched between the bottom plate portion 14a of the chassis 14 and the light guide plate 19. The reflection sheet 20 has a slightly larger size in a plan view than that of the light guide plate 19, and is able to cover the opposite plate surface 19c of the light guide plate 19 over an almost overall area (in detail, a large part of a portion overlapping with a light guide plate non-support portion 30 described below, excluding a part of the portion). The reflection sheet 20 has a slightly larger size (a long-side dimension and a short-side dimension) in a plan view than that of the light guide plate 19. In particular, an end of the reflection sheet 20 on the light entrance surface 19b side of the light guide plate 19 (one long-side end) is an extended reflection portion 20a which extends outward from the light entrance surface 19b, that is, toward the LEDs 16 side. The extended reflection portion 20a is provided so as to extend over an almost full length of the reflection sheet 20 in a long-side direction (X-axis direction) thereof and, in other words, is arranged across LED arranged areas in which the LEDs 16 are arranged and LED non-arranged areas in which no LED 16 is arranged, in the direction in which the LEDs 16 are arranged. By reflecting light which exists in a space formed between the LED board 17 and the light entrance surface 19b toward the front side, the extended reflection portion 20a achieves high light entering efficiency for the light entrance surface 19b. The light which is reflected by the extended reflection portion 20a and enters the light entrance surface 19b is reflected totally by the light exit surface 19a and propagated through the light guide plate 19 toward a direction away from the LEDs 16 (refer to a light path represented by a long dashed short dashed line in FIG. 3), because even if being directed to the light exit surface 19a directly, an incidence angle on the light exit surface 19a exceeds a critical angle. A light reflection pattern (not illustrated) formed of a light reflection portion for reflecting light in the light guide plate 19 toward the light exit surface 19a to thereby exit the light from the light exit surface 19a is formed in the opposite plate surface 19c of the light guide plate 19. The light reflection portion forming the light reflection pattern includes a large number of dots which are formed by printing a light reflective material (for example, ink having a white color, which contains metallic oxide such as titanium oxide) on the opposite plate surface 19c of the light guide plate 19, and the light reflection pattern is formed with such a distribution that a distribution density of the dots (an area ratio per a unit area in the opposite plate surface 19c) increases as being closer from the end of the light guide plate 19 on the light entrance surface 19b side to the end on the opposite side in the Y-axis direction.

The second frame 21 is made of synthetic resin and is entirely formed, as illustrated in FIG. 2 and FIG. 3, in a frame shape extending along the outer peripheral end of the liquid crystal panel 11. The second frame 21 has a second frame main body (frame portion) 21a which extends along the outer peripheral end of the light guide plate 19 and has a rectangular frame shape in a plan view, and a second frame surrounding portion (cylindrical portion) 21b which runs with an outer peripheral end of the second frame main body 21a and surrounds the chassis 14 and the heat dissipation member 18 attached thereto from an outer peripheral side. The second frame main body 21a is disposed facing the front side of the outer peripheral end of the light guide plate 19, and is able to support an almost whole circumference of the outer peripheral end of the light guide plate 19 from the front side. On the rear side of the second frame main body 21a, that is, a surface facing the light guide plate 19, a cushion material for the light guide plate 25 is provided so as to be positioned between the rear side of the second frame main body 21a and the outer peripheral end of the light guide plate 19, thus making it possible to achieve cushioning for the light guide plate 19. One long side portion of the second frame main body 21a, which faces the LED unit LU, is disposed so as to cover a space formed between the LED unit LU and the light guide plate 19 from the front side over a substantially overall area and has the cushion material for the light guide plate 25 so as to be positioned between the second frame main body 21a and the one long side portion of the light guide plate 19, in which the light entrance surface 19b is provided, and therefore able to block light which is emitted from the LEDs 16 and directed toward the front side and prevent the light leakage caused by the light directly entering the optical sheet 15 and the liquid crystal panel 11 without passing through the light guide plate 19.

As illustrated in FIG. 3, the second frame main body 21a has a substantially three-step shape in a cross-sectional shape, in which a first step portion 21a1 on the top supports the first frame main body 13a of the first frame 13 from the rear side, a second step portion 21a2 at a middle height supports the outer peripheral end of the liquid crystal panel 11 from the rear side, and a third step portion 21a3 on the bottom supports the outer peripheral end of the optical sheet 15 from the rear side. Among them, on a front side of the second step portion 21a2, that is, a surface on the side facing the liquid crystal panel 11, a cushion material for the liquid crystal panel 26 is provided so as to be positioned between the front side of the second step portion 21a2 and the outer peripheral end of the liquid crystal panel 11, thus making it possible to achieve cushioning for the liquid crystal panel 11. On a front side of the third step portion 21a3, that is, a surface on the side facing the optical sheet 15, a cushion material for the optical sheet 27 is provided so as to be positioned between the front side of the third step portion 21a3 and the outer peripheral end of the optical sheet 15, thus making it possible to achieve cushioning for the optical sheet 15.

In the backlight device 12 configured as described above, as illustrated in FIG. 5, FIG. 7 and FIG. 8, in order to insert, from outside, the wiring-side connector 23 which is connected to the board-side connector 22 of the LED board 17 by fitting with each other, a chassis-side opening 28 and a heat dissipation member-side opening 29 are respectively formed in the chassis 14 and the heat dissipation member 18 so as to communicate with each other and be opened facing the rear side. The chassis-side opening 28 and the heat dissipation member-side opening 29 are able to cause the board-side connector 22 and the wiring-side connector 23 which are connected by fitting with each other in the backlight device 12 to be exposed to the outside of the rear side. The chassis-side opening 28 and the heat dissipation member-side opening 29 are disposed at positions overlapping with the board-side connector 22 and the wiring-side connector 23 in a plan view. On the other hand, one set of the board-side connector 22 and the wiring-side connector 23 is provided in each LED unit LU so that two sets of them are provided in total. Accordingly, each one set of the chassis-side opening 28 and the heat dissipation member-side opening 29 is arranged at a substantially middle position between a center position and each of positions of both ends in the chassis 14 in the X-axis direction. Moreover, the chassis-side opening 28 and the heat dissipation member-side opening 29 are disposed at an end of the chassis 14 in the Y-axis direction, which is on the LED unit LU side.

Figure 5:
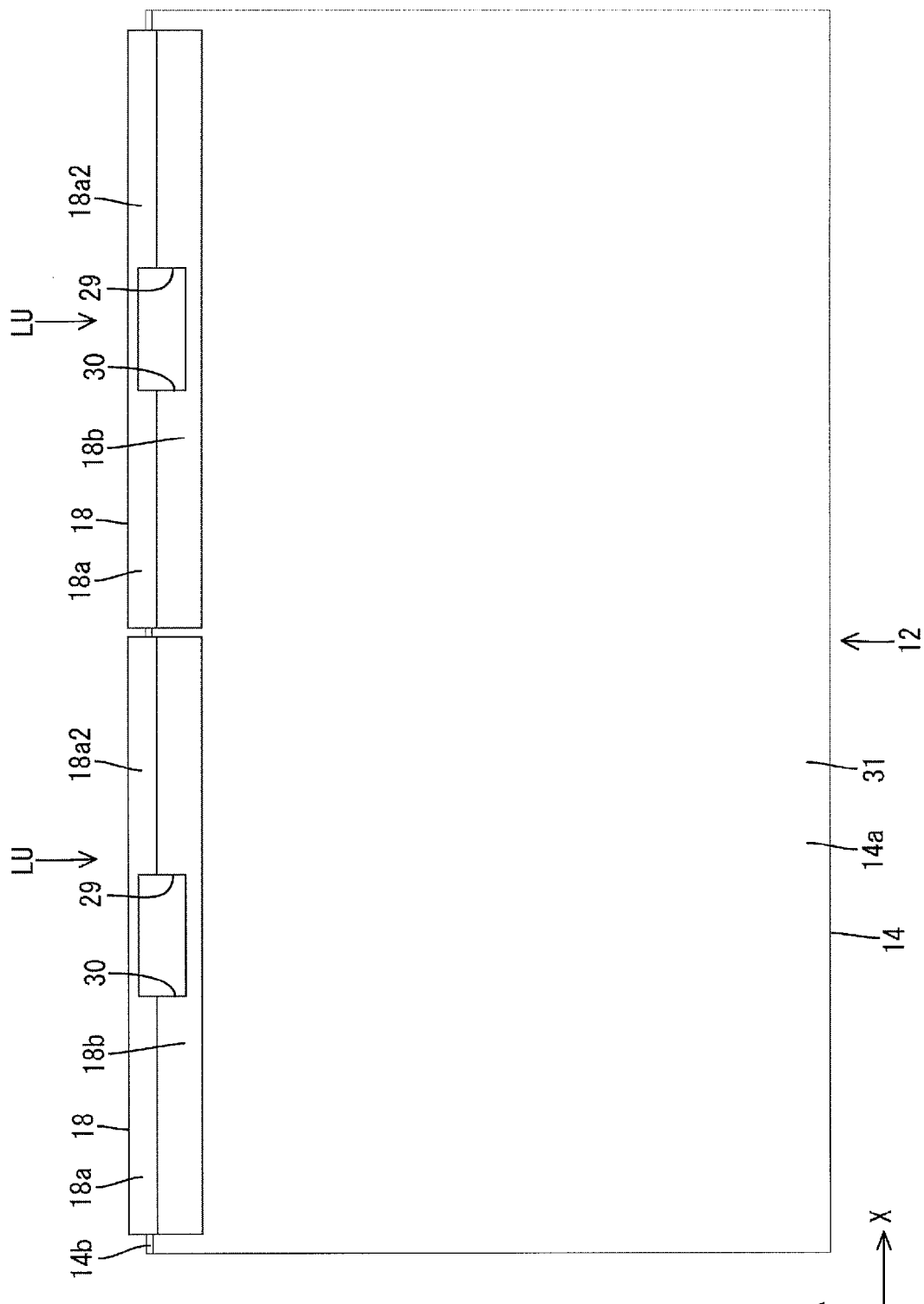
FIG. 5 is a bottom view of the backlight device included in the liquid crystal display device.

Among them, the chassis-side opening 28 is formed by cutting out a part of portions of the bottom plate portion 14a and the first side plate portion 14b of the chassis 14, which overlap with the heat dissipation member 18 and each of the connectors 22 and 23 in a plan view (when viewed from a normal direction with respect to the plate surface of the bottom plate portion 14a) and has a rectangular shape in a plan view, as illustrated in FIG. 5, FIG. 7 and FIG. 8. Specifically, as illustrated in FIG. 7, the chassis-side opening 28 is formed in a range across the long-side portion of the bottom plate portion 14a in the Y-axis direction, which is on the LED unit LU side, and the first side plate portion 14b, to thereby open to the front and rear sides along the Z-axis direction and also to the LED unit LU side along the Y-axis direction. The chassis-side opening 28 is disposed so that an opening edge in the Y-axis direction is recessed so as to be farther away from the LEDs 16 with respect to the light entrance surface 19b of the light guide plate 19. As illustrated in FIG. 8, the chassis-side opening 28 is formed in a wider range than that of the protrusion for power feeding 17b of the LED board 17 in the X-axis direction, and, specifically, formed so that an overall area in the X-axis direction in a front view of the protrusion for power feeding 17b and the board-side connector 22 (when viewed from a normal direction with respect to the plate surface of the LED board 17) overlaps with the protrusion for power feeding 17b and the board-side connector 22 and the protrusion for power feeding 17b and the board-side connector 22 are positioned being closer to the left in FIG. 8 (closer to an end opposite to a direction in which the board-side connector 22 opens). In other words, the chassis-side opening 28 is formed so that the opening edge on the right side in FIG. 8 in the X-axis direction is disposed at a position between the protrusion for power feeding 17b and the board-side connector 22 with a fixed interval (interval to an extent that the wiring-side connector 23 described below is allowed to be arranged). It may be said that a portion of the bottom plate portion 14a of the chassis 14, in which the chassis-side opening 28 is formed, forms the light guide plate non-support portion 30 which is not able to support the light guide plate 19 and the reflection sheet 20 from the rear side. In other words, an opening non-forming portion in which the chassis-side opening 28 is not formed (substantially overall area excluding the chassis-side opening 28) in the bottom plate portion 14a of the chassis 14 forms a light guide plate support portion 31 which is able to support the light guide plate 19 and the reflection sheet 20 from the rear side.

The heat dissipation member-side opening 29 is a through hole and has a rectangular shape in a plan view, as illustrated in FIG. 5, FIG. 7 and FIG. 8. A part of portions of the bottom wall portion 18a2, the side wall portion 18a3 and the chassis-side heat dissipation portion 18b of the heat dissipation member 18 overlapping with the chassis 14 and each of the connectors 22 and 23 in a plan view is inserted in the heat dissipation member-side opening 29. Specifically, as illustrated in FIG. 7, the heat dissipation member-side opening 29 is formed in a range extending from the bottom wall portion 18a2 of the heat dissipation member 18 to the chassis-side heat dissipation portion 18b in the Y-axis direction, and an outside opening edge thereof is substantially flush with the mounting surface of the LED board 17, while an inside opening edge thereof is disposed so as to be recessed to be farther away from the LEDs 16 with respect to the light entrance surface 19b of the light guide plate 19 and is flush with an inside opening edge of the chassis-side opening 28. The heat dissipation member-side opening 29 is formed in a wider range than that of the protrusion for power feeding 17b of the LED board 17 in the X-axis direction, and has an opening edge which is substantially flush with the inside opening edge of the chassis-side opening 28. Accordingly, the heat dissipation member-side opening 29 is formed so that an overall area in the X-axis direction in a front view of the protrusion for power feeding 17b and the board-side connector 22 overlaps with the protrusion for power feeding 17b and the board-side connector 22 and the protrusion for power feeding 17b and the board-side connector 22 are positioned being closer to the left in FIG. 8. In other words, the chassis-side opening 28 is formed so that the opening edge on the right side in FIG. 8 in the X-axis direction is disposed at a position between the protrusion for power feeding 17b and the board-side connector 22 with a fixed interval. The heat dissipation member-side opening 29 is formed in the hole shape as described above, so that an opening edge thereof has an endless ring shape.

By setting a formation range of the chassis-side opening 28 and the heat dissipation member-side opening 29 in a plan view (a formation range in the X-axis direction and the Y-axis direction) as described above, it is possible to ensure an arrangement space in which the wiring-side connector 23 before being fitted to the board-side connector 22 is arranged in the X-axis direction (space for fitting work) as illustrated in FIG. 8, and to allow a finger of an operator to enter the chassis-side opening 28 and the heat dissipation member-side opening 29 when inserting the wiring-side connector 23 into the chassis-side opening 28 and the heat dissipation member-side opening 29 in the Y-axis direction as illustrated in FIG. 7. In this case, if a protrusion for power feeding in an LED board is formed so as to protrude to the outside on the rear side of the heat dissipation member 18, the formation range of the chassis-side opening 28 and the heat dissipation member-side opening 29 is able to be reduced. However, a problem is thereby caused that thickness (dimension in the Z-axis direction) of the backlight device and the liquid crystal display device increases by an amount of protrusion of the protrusion for power feeding to the outside on the rear side of the heat dissipation member 18. Thus, for decreasing thickness of the backlight device 12 and the liquid crystal display device 10, it is useful to expand the formation range of the chassis-side opening 28 and the heat dissipation member-side opening 29 in a plan view compared to the arrangement range of the board-side connector 22 and the wiring-side connector 23 which are being fitted to each other.

Figure 8:
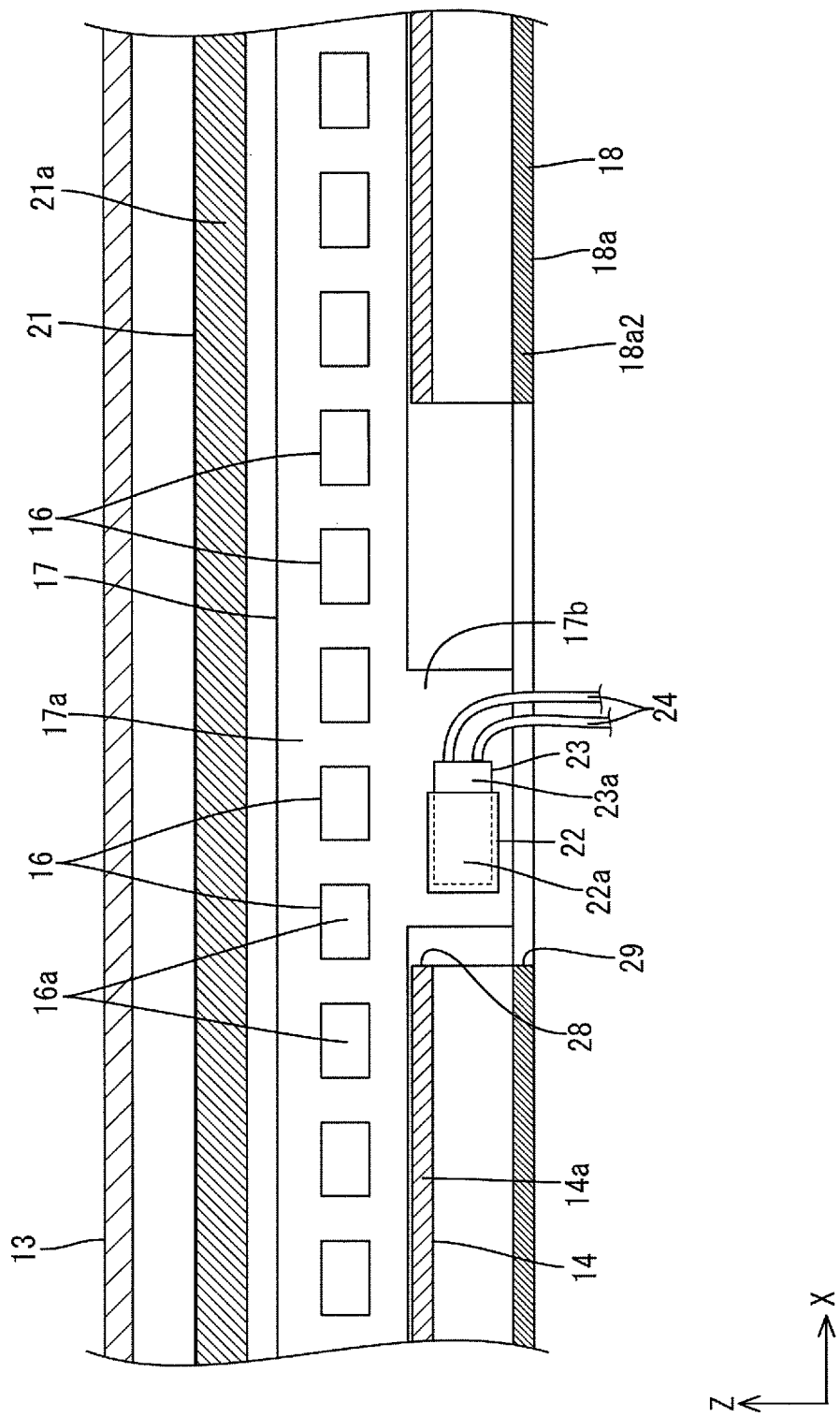
FIG. 8 is a cross-sectional view taken along a line viii-viii of FIG. 7.
Figure 9:
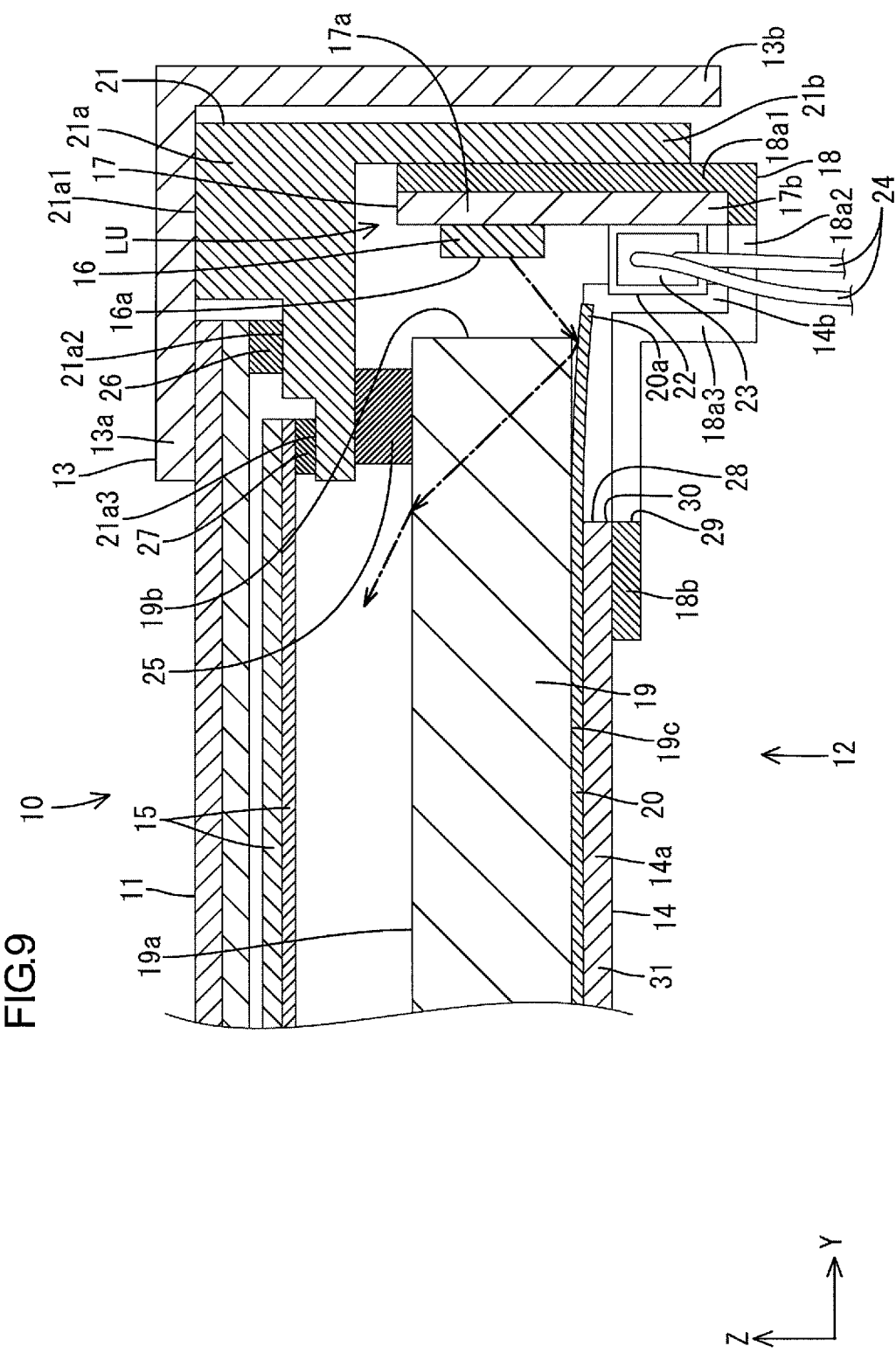
FIG. 9 is a cross-sectional view of a liquid crystal display device, according to a comparative example, which includes a reflection sheet in which a cutout portion is not formed.

Meanwhile, the chassis-side opening 28 as described above is formed in the bottom plate portion 14a of the chassis 14, and the portion of the bottom plate portion 14a having the chassis-side opening 28 is the light guide plate non-support portion 30 that is not able to support the light guide plate 19. Therefore, a portion of the reflection sheet 20 that is disposed between the light guide plate 19 and the bottom plate portion 14a and overlaps with the light guide plate non-support portion 30 may be deformed so as to be away from the opposite plate surface 19c of the light guide plate 19. In particular, in order to cause the board-side connector 22 and the wiring-side connector 23 on the LED board 17 to be exposed to the outside and allow work for fitting the wiring-side connector 23, the chassis-side opening 28, which is the light guide plate non-support portion 30, is formed in a range extending from the mounting surface of the LEDs 16 on the LED board 17 to a position opposite to the LEDs 16 with respect to the light entrance surface 19b in the Y-axis direction, and as a result thereof, disposed so as to overlap with a part of the extended reflection portion 20a in a plan view, in addition to a part of a main body part of the reflection sheet 20 (a part excluding the extended reflection portion 20a). Therefore, as illustrated in a comparative example of FIG. 9, if a portion of the reflection sheet 20 overlapping with the chassis-side opening 28, which is the light guide plate non-support portion 30 (including the extended reflection portion 20a), is deformed so as to be away from the opposite plate surface 19c of the light guide plate 19, light from the LEDs 16 is reflected particularly by the extended reflection portion 20a of the separated portion. Accordingly, the reflection light enters the light guide plate 19 from the rear side thereof (through a gap between the light guide plate 19 and the separated portion of the reflection sheet 20) and easily enters the light guide plate 19 through the opposite plate surface 19c (refer to a light path represented by a long dashed short dashed line in FIG. 9). If the light directly incident on the opposite plate surface 19c from the rear side of the light guide plate 19 without passing through the light entrance surface 19b in this manner travels within the light guide plate 19 toward the light exit surface 19a, an incidence angle on the light exit surface 19a does not exceed a critical angle. Therefore, the light directly exits the light guide plate 19 through the light exit surface 19a (refer to the light path represented by a long dashed short dashed line in FIG. 9), and a bright region is may be locally generated on the light exit surface 19a and may be visually recognized as luminance unevenness by a user (observer) of the backlight device 12 and the liquid crystal display device 10. Note that, FIG. 9 is a cross-sectional view of the liquid crystal display device 10 according to the comparative example in which the reflection sheet 20 in which the "cutout portion 32" as a characteristic structure described below according to the present embodiment is not formed is included, and the same reference signs as those of other figures (FIG. 1 to FIG. 8) according to the present embodiment are described in FIG. 9 for convenience of description.

Figure 6:
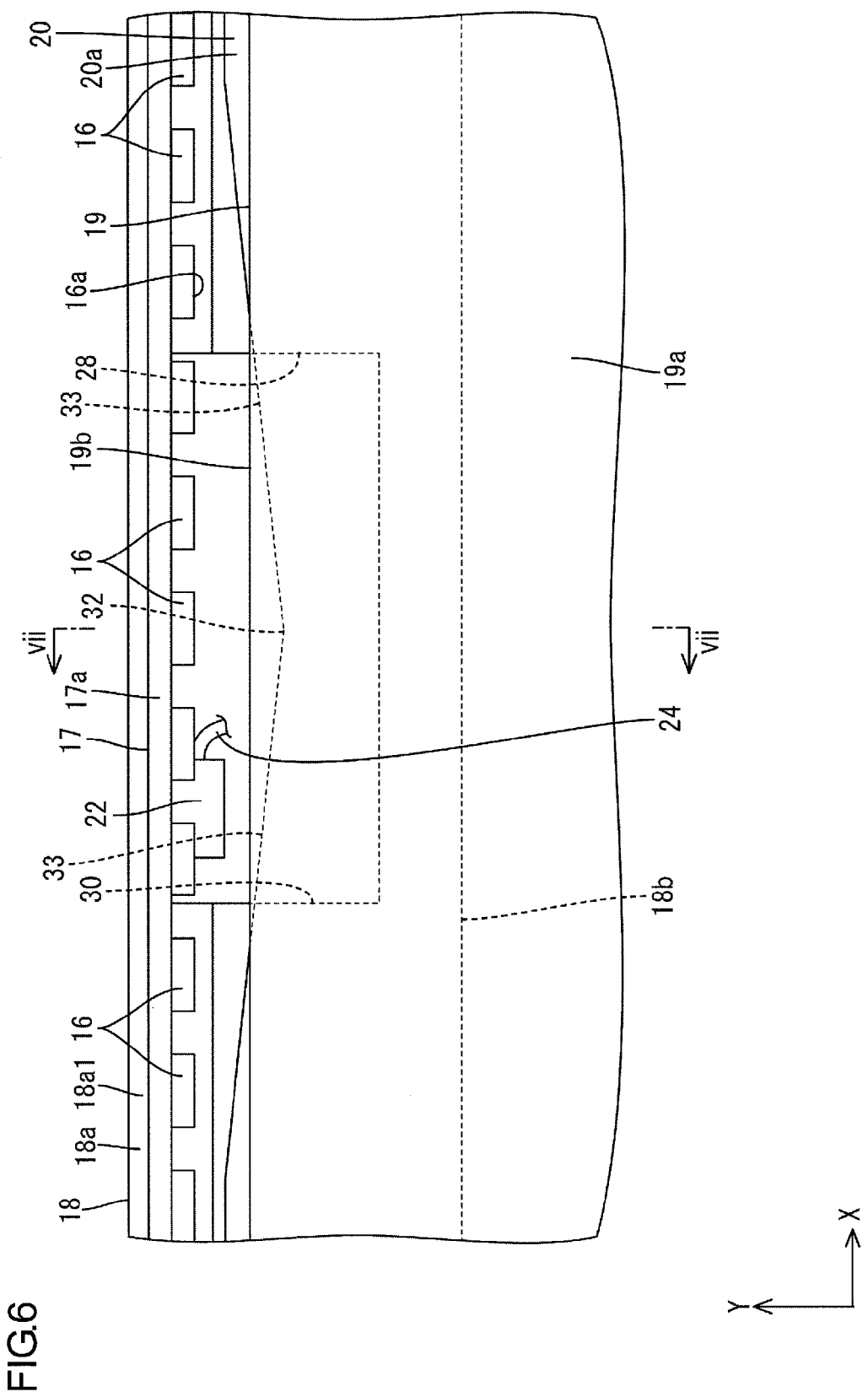
FIG. 6 is an enlarged plan view of a main part of FIG. 4.
Figure 7:
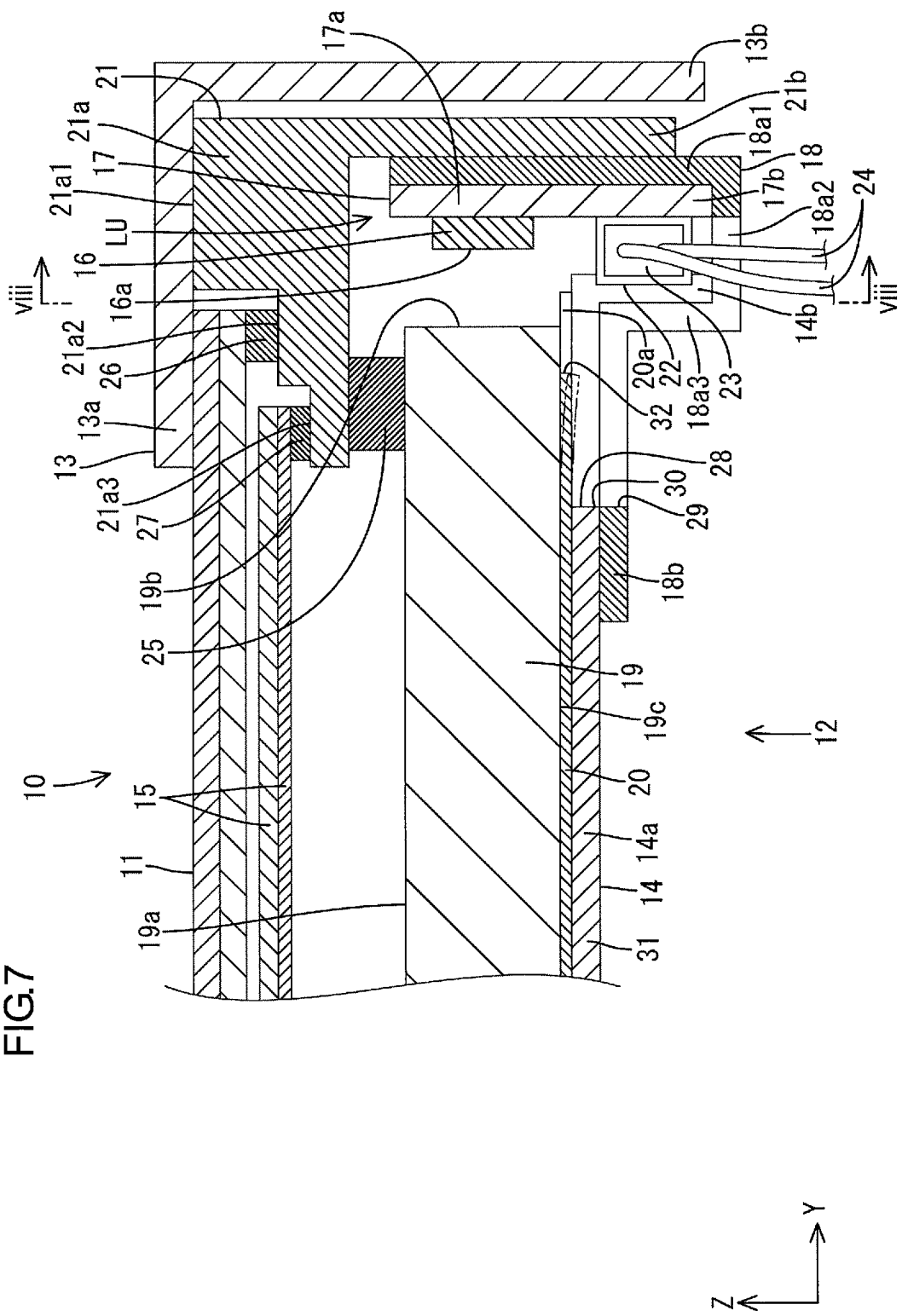
FIG. 7 is a cross-sectional view taken along a line vii-vii of FIG. 6.

Thus, in the present embodiment, the cutout portion 32 is formed by cutting out at least a part of a portion of the extended reflection portion 20a overlapping with the chassis-side opening 28, which is the light guide plate non-support portion 30, in a plan view (when viewed from a normal direction with respect to the light exit surface 19a), as illustrated in FIG. 6 and FIG. 7. By forming such a cutout portion 32 in the reflection sheet 20, a portion of the extended reflection portion 20a is less likely to be separated from the opposite plate surface 19c of the light guide plate 19 due to the chassis-side opening 28, which is the light guide plate non-support portion 30, and it is hardly occurred that light from the LEDs 16 is reflected by the extended reflection portion 20a and directly enters the light guide plate 19 through the opposite plate surface 19c. Thereby, the light entering the light guide plate 19 through the opposite plate surface 19c is less likely to directly exit from the light guide plate 19 through the light exit surface 19a directly. Therefore, a bright region is less likely to be generated locally on the light exit surface 19a and luminance unevenness is less likely to be caused in the light from the light exit surface 19a.

Specifically, the reflection sheet 20 is formed, as illustrated in FIG. 6, so that an opening size of the cutout portion 32 in the X-axis direction changes according to a position in the Y-axis direction and continuously decreases as being farther away from the LEDs 16 and, to the contrary, continuously increases as being closer to the LEDs 16. In other words, the cutout portion 32 is formed so that a distance from a cutout edge thereof to the LEDs 16 in the Y-axis direction continuously increases as being closer to a center of the cutout portion 32 in the X-axis direction and, to the contrary, continuously decreases as being closer to both end sides of the cutout portion 32 in the X-axis direction. That is, an overall shape of the cutout portion 32 is triangular in a plan view and has a pair of cutout edges having an inclined shape. Each of the cutout edges is inclined with respect to both of the X-axis direction and the Y-axis direction and the pair cutout edges is a pair of inclined portions 33. The pair of inclined portions 33 has a symmetrical shape and has a substantially V-shape, so that a plan shape of the cutout portion 32 is an isosceles triangle shape. In the reflection sheet 20 having the cutout portion 32, an amount of reflection light locally decreases in the cutout portion 32, so that an amount of light output through the light exit surface 19a of the light guide plate 19 may locally decrease and cause a dark region locally, and a great difference of luminance may be caused between the bright region and the dark region and visually recognized as luminance unevenness. As described before, in the reflection sheet 20 including the cutout portion 32 having the inclined portions 33 as the cutout edges, an area of the reflection sheet 20, that is, an amount of reflection light reflecting off the reflection sheet 20 continuously changes in the X-axis direction. Therefore, compared to a configuration that a dimension of the cutout portion in the X-axis direction is constant or decreases in a stepwise manner as being farther away from the LEDs 16, a dark region that may be caused in the light exit surface 19a of the light guide plate 19 by forming of the cutout portion 32 is less likely to be visually recognized. This is more suitable for suppressing occurrence of luminance unevenness. Note that, in each of the inclined portions 33 which are cutout edges of the cutout portion 32, an intermediate portion intersects the light entrance surface 19b of the light guide plate 19 in a plan view, and the intersect part is disposed outside the chassis-side opening 28 (light guide plate non-support portion 30) in the X-axis direction and arranged without overlapping.

Both ends of the cutout portion 32 in the X-axis direction, as illustrated in FIG. 6, or one ends of the respective inclined portions 33 in the X-axis direction are continuous to the outer edge of the extended reflection portion 20a in the Y-axis direction at an obtuse angle, while another ends of the respective inclined portions 33 in the X-axis direction are continuous to each other at an obtuse angle in a center portion of the cutout portion 32 in the X-axis direction. As illustrated in FIG. 6 and FIG. 7, the center portion of the cutout portion 32 in the X-axis direction (the other ends of both inclined portions 33 in the X-axis direction) has the cutout edge that is farthest from the LEDs 16 and is recessed so as to be farther away from the LEDs 16 with respect to the light entrance surface 19b of the light guide plate 19 in the Y-axis direction. That is, the cutout portion 32 is formed in an area in the extended reflection portion 20a and in a main body part of the reflection sheet 20 in the Y-axis direction. With such a configuration, compared to a configuration that the cutout edge of the cutout portion is closer to the LEDs 16 than the light entrance surface 19b, a portion of the extended reflection portion 20a is less likely to be separated from the opposite plate surface 19c of the light guide plate 19 due to the chassis-side opening 28 that is the light guide plate non-support portion 30, and light from the LEDs 16 is less likely to reflect off the extended reflection portion 20a and directly enters the light guide plate 19 through the opposite plate surface 19c. Accordingly, luminance unevenness is suppressed more suitably. Further, compared to a configuration that the cutout edge of the cutout portion is flush with the light entrance surface 19b, the inclined portions 33, which are the cutout edges, are less likely to be closer to the LEDs 16 than the light entrance surface 19b, even if the inclined portions 33, which are the cutout edges of the cutout portion 32, are arranged with positional errors because of tolerance of a dimension, tolerance of attachment or the like. Accordingly, occurrence of luminance unevenness is suppressed more suitably. In addition, since the cutout portion 32 is formed so that the other ends of the respective inclined portions 33 in the X-axis direction are disposed closer to the LEDs 16 than the edge of the chassis-side opening 28, which is the light guide plate non-support portion 30, in the Y-axis direction, reflection light reflecting off the reflection sheet 20 is sufficiently secured and use efficiency of light is less likely to be lowered, compared to a configuration that the cutout edge of the cutout portion is flush with the edge of the chassis-side opening 28, which is the light guide plate non-support portion 30, and an amount of reflection light reflecting off the reflection sheet 20 decreases so that use efficiency of light is lowered. Note that, when the cutout edge of the cutout portion 32 is disposed closer to the light entrance surface 19b than the edge of the chassis-side opening 28, which is the light guide plate non-support portion 30, a portion of the extended reflection portion 20a may be separated from the opposite plate surface 19c of the light guide plate 19 due to the chassis-side opening 28, which is the light guide plate non-support portion 30. However, the cutout edge of the cutout portion 32 is flush with the light entrance surface 19b or opposite to the LEDs 16 side with respect to the light entrance surface 19b. Accordingly, reflection light reflecting off the extended reflection portion 20a that extends so as to be closer to the LEDs 16 than the light entrance surface 19b is less likely to directly enter the light guide plate 19 through the opposite plate surface 19c, so that luminance unevenness is hard to be generated surely.

Moreover, the reflection sheet 20 is formed so as to have a formation range of the cutout portion 32 in the X-axis direction (direction along the light entrance surface 19b) greater than a formation range of the chassis-side opening 28, which is the light guide plate non-support portion 30, in the X-axis direction, and the cutout portion 32 overlaps with the light guide plate support portion 31 in the X-axis direction. Therefore, an amount of reflection light changes continuously between the portion of the extended reflection portion 20a overlapping with the chassis-side opening 28, which is the light guide plate non-support portion 30, and the portion of the extended reflection portion 20a overlapping with the light guide plate support portion 31. Thereby, a dark region that may be generated in the light exit surface 19a of the light guide plate 19 due to the forming of the cutout portion 32 is hard to be visually recognized, and it is further suitable for suppressing occurrence of luminance unevenness. Even if the cutout portion 32 is formed with positional errors, for example, because of an influence of tolerance of a dimension, tolerance of attachment, or the like, the cutout portion 32 is likely to be disposed so as to appropriately overlap with the chassis-side opening 28, which is the light guide plate non-support portion 30, in the X-axis direction, so that an effect of suppressing luminance unevenness by the cutout portion 32 is achieved more reliably. Note that, the cutout portion 32 is formed so that the cutout edge is recessed so as to be farther away from the LEDs 16 with respect to the light entrance surface 19b at a part adjacent to an overlapping portion with the chassis-side opening 28, which is the light guide plate non-support portion 30, among an overlapping portion with the light guide support portion 31 in the extended reflection portion 20a, and the cutout edge is closer to the LEDs 16 than the light entrance surface 19b at the remaining part. Further, the reflection sheet 20 is formed so as to have a formation range of the cutout portion 32 in the X-axis direction (largest dimension) greater than a formation range of the cutout portion 32 in the Y-axis direction (direction from the LEDs 16 to the light entrance surface 19b) (largest dimension). Therefore, even if the cutout portion 32 is disposed with positional errors in the X-axis direction, for example, because of an influence of tolerance of a dimension, tolerance of attachment, or the like, the cutout portion 32 is likely to be disposed so as to appropriately overlap with the chassis-side opening 28, which is the light guide plate non-support portion 30, in the X-axis direction, thus an effect of suppressing luminance unevenness by the cutout portion 32 is achieved more reliably. If the formation range of the cutout portion in the Y-axis direction is greater than or same as the formation range of the cutout portion in the X-axis direction with dealing with the positional errors of the cutout portion that may be caused as described above, a formation range of the cutout portion in the Y-axis direction from the LEDs 16 tends to be excessively large. Accordingly, an amount of reflection light reflecting off the reflection sheet 20 may be decreased and use efficiency of light may be lowered. On the other hand, if the formation range of the cutout portion 32 in the X-axis direction is greater than the formation range of the cutout portion 32 in the Y-axis direction, an effect of suppressing luminance unevenness by the cutout portion 32 is achieved more reliably as described above while use efficiency of light is sufficiently ensured.

The liquid crystal display device 10 of the present embodiment has a structure as described above, and operations thereof will be described subsequently. For attachment of the liquid crystal display device 10, the LED unit LU is attached by attaching the LED board 17, on which the LEDs 16 and the board-side connector 22 is mounted in advance, to the heat dissipation member 16. The reflection sheet 20 and the light guide plate 19 are housed in the chassis 14 and each LED unit LU is attached to a long-side end of the chassis 14, in which the first side plate portion 14b is provided. Thereafter, by attaching the second frame 21 to which each of the cushion materials 25 to 27 is attached to the chassis 14 in advance, the cushion material for the light guide plate 25 is disposed so as to be positioned between the second frame main body 21a and the outer peripheral end of the light guide pate 19 and the light guide plate 19 is supported from the front side by the second frame 21 through the cushion material for the light guide plate 25. Then, after the optical sheet 15 is placed on the third step portion 21a3 of the second frame main body 21a through the cushion material for the optical sheet 27, the liquid crystal panel 11 is placed on the second step portion 21a2 through the cushion material for the liquid crystal panel 26 and the first frame 13 is further placed on the first step portion 21a1. When the first frame 13 is attached to the second frame 21, attachment of main components of the liquid crystal display device 10 is completed.

In the liquid crystal display device 10 to which attachment is performed as described above, work for connecting the wiring member 24 in order to feed power to the LED units LU of the backlight device 12 is carried out. An operator who carries out the work for connection, while holding the wiring-side connector 23 provided at an end of the wiring member 24 so as to sandwich with his/her finger, inserts the wiring-side connector 23 into the backlight device 12 through the chassis-side opening 28 and the heat dissipation member-side opening 29 that are respectively formed in the chassis 14 and the heat dissipation member 18, which form the backlight device 12, so as to open toward the outside of the rear side. At this time, in the chassis-side opening 28 and the heat dissipation member-side opening 29, as illustrated in FIG. 7, the opening edges on the outside in the Y-axis direction are substantially flush with the mounting surface of the LED board 17 and the opening edges on the inner side are recessed so as to be farther away from the LEDs 16 side with respect to the light entrance surface 19b of the light guide plate 19, and as illustrated in FIG. 8, the opening edge on the right side in the X-axis direction has an interval to an extent that the wiring-side connector 23 is allowed to be arranged between the protrusion for power feeding 17b and the board-side connector 22, so that work for fitting the wiring-side connector 23 to the board-side connector 22 from the right side to the left side in FIG. 8 is able to be carried out while inserting the finger of the operator gripping the wiring-side connector 23 into the chassis-side opening 28 and the heat dissipation member-side opening 29, thus workability becomes excellent.

When power of the liquid crystal display device 10 which is manufactured as described above is turned on, a signal associated with an image is supplied from a panel driving circuit board for driving the liquid crystal panel 11 to the liquid crystal panel 11, and power is supplied from the LED driving circuit board to each of the LEDs 16 on the LED board 17 through the wiring member 24, the wiring-side connector 23 and the board-side connector 22, so that each of the LEDs 16 is turned on. As illustrated in FIG. 3, light emitted from each of the LEDs 16 is guided by the light guide plate 19 and transmitted through the optical sheet 15, and thereby irradiated to the liquid crystal panel 11 after being converted into flat planar light, so that a predetermined image is displayed in a display area of the liquid crystal panel 11.

To describe operations associated with the backlight device 12 in detail, when each of the LEDs 16 is turned on, as illustrated in FIG. 3, light emitted from each of the LEDs 16 enters the light guide plate 19 through the light entrance surface 19b, and then, in a process of totally reflecting off an interface between the light guide plate 19 and an outside air layer or propagating in the light guide plate 19 with reflecting off the reflection sheet 20, the light exit performance through the light exit surface 19a is improved by a light reflection pattern. In this embodiment, the reflection sheet 20 has the extended reflection portion 20a which extends so as to be closer to the LEDs 16 side than the light entrance surface 19b and light that exists in a space between the LEDs 16 and the light entrance surface 19b reflects off the extended reflection portion 20a. Therefore, the reflected light is able to enter through the light entrance surface 19b efficiently, thus making it possible to achieve high light entering efficiency for the light entrance surface 19b. Thus, improvement in luminance and reduction in power consumption are accomplished.

On the other hand, as illustrated in FIG. 7, the chassis-side opening 28 is formed in the bottom plate portion 14a of the chassis 14 in order to feed power to the LED board 17 and the formation part is the light guide plate non-support portion 30 which does not support the light guide plate 19. Thus, a portion of the reflection sheet 20 overlapping with the chassis-side opening 28, which is the light guide plate non-support portion 30, is not supported from the rear side and is therefore easily deformed so as to be separated from the opposite plate surface 19c of the light guide plate 19. In particular, if the extended reflection portion 20a is included in the overlapping portion of the reflection sheet 20 overlapping with the chassis-side opening 28, the light reflected by the extended reflection portion 20a that has been deformed so as to be separated from the opposite plate surface 19c is directed to the rear side of the light guide plate 19 (a gap between the light guide plate 19 and the separated portion of the reflection sheet 20) and directly enters through the opposite plate surface 19c and then directly exits through the light exit surface 19a, so that local bright region, that is, luminance unevenness may be caused (refer to FIG. 9). In the present embodiment, since the cutout portion 32 is formed in the reflection sheet 20 by cutting out at least a part of a portion of the extended reflection portion 20a overlapping with the chassis-side opening 28, which is the light guide plate non-support portion 30, a portion of the extended reflection portion 20a is less likely to be separated from the opposite plate surface 19c of the light guide plate 19 due to the chassis-side opening 28, and light from the LEDs 16 is less likely to reflect off the extended reflection portion 20a and less likely to directly enter through the opposite plate surface 19c. Thereby, a bright region is hard to be locally generated on the light exit surface 19a, so that luminance unevenness is less likely to be visually recognized by a user (observer) of the liquid crystal display device 10. Note that, as illustrated with a long dashed double-short dashed line of FIG. 7, even if the portion of the reflection sheet 20 overlapping with the chassis-side opening 28, which is the light guide plate non-support portion 30, is deformed so as to be separated from the opposite plate surface 19c of the light guide plate 19, the deformed portion does not include the extended reflection portion 20a, so that the light from the LEDs 16 is hardly irradiated directly to the deformed portion without passing through the light guide plate 19. Accordingly, the light from the LEDs 16 is less likely to reflect off the deformed portion and less likely to directly enter through the opposite plate surface 19c of the light guide plate 19, and even if the light enters, an amount thereof is quite small, so that a local bright region is hardly caused.

Furthermore, since the cutout edge of the cutout portion 32 is disposed so as to be recessed to be farther away from the LEDs 16 with respect to the light entrance surface 19b of the light guide plate 19 as illustrated in FIG. 7, a portion of the extended reflection portion 20a is further less likely to be separated from the opposite plate surface 19c of the light guide plate 19 due to the chassis-side opening 28, which is more suitable for suppression of luminance unevenness, and in addition thereto, the cutout edge of the cutout portion 32 is less likely to be disposed closer to the LEDs 16 than the light entrance surface 19b because of an influence of tolerance of a dimension of the reflection sheet 20, tolerance of attachment of the reflection sheet 20 to the chassis 14, or the like, which is further suitable for suppression of luminance unevenness. Further, since a dimension (an opening size) of the cutout portion 32 in the X-axis direction continuously decreases as being farther away from the LEDs 16 as illustrated in FIG. 6, a dark region which may be caused in the light exit surface 19a due to formation of the cutout portion 32 is less likely to be visually recognized by the user of the liquid crystal display device 10, thus making it possible to further suitably suppress luminance unevenness. Then, since the formation range of the cutout portion 32 in the X-axis direction is greater than the formation range of the chassis-side opening 28, which is the light guide plate non-support portion 30, an amount of reflection light changes continuously between the portion of the extended reflection portion 20a overlapping with the chassis-side opening 28 and the portion of the extended reflection portion 20a overlapping with the light guide plate support portion 31, thus a dark region that may be caused in the light exit surface 19a due to formation of the cutout portion 32 is less likely to be visually recognized by the user of the liquid crystal display device 10, thus making it possible to suppress luminance unevenness much further suitably. Moreover, since the formation range of the cutout portion 32 in the X-axis direction is greater than the formation range of the cutout portion 32 in the Y-axis direction, even if positional errors of the cutout portion 32 in the X-axis direction may be caused because of an influence of tolerance of a dimension of the reflection sheet 20, tolerance of attachment of the reflection sheet 20 to the chassis 14, or the like, the cutout portion 32 is likely to overlap with the chassis-side opening 28, which is the light guide plate non-support portion 30, in the X-axis direction, thus an effect of suppressing luminance unevenness by the cutout portion 32 is achieved more reliably.

As described above, the backlight device (lighting device) 12 of the present embodiment includes: the LED (light source) 16; the light guide plate 19 having a plate shape and having at least one edge surface as the light entrance surface 19b through which light from the LED 16 enters, one plate surface as the light exit surface 19a through which light exits the light guide plate, and another plate surface as the opposite plate surface 19c being opposite to the light exit surface 19a; the chassis 14 having the bottom plate portion 14a that includes the light guide plate support portion 31 for supporting the light guide plate 19 from a side of the opposite plate surface 19c and the light guide plate non-support portion 30 for not supporting the light guide plate 19 from the side of the opposite plate surface 19c; and the reflection sheet (reflection member) 20 that is disposed between the opposite plate surface 19c of the light guide plate 19 and the bottom plate portion 14a of the chassis 14 and reflects light travelling through the light guide plate 19 toward the light exit surface 19a, the reflection sheet 20 having the extended reflection portion 20a which extends closer to the LED 16 than the light entrance surface 19b of the light guide plate 19 and having the cutout portion 32 that is formed by cutting out at least a part of a portion of the extended reflection portion 20a overlapping with the light guide plate non-support portion 30.

Thereby, light emitted from the LEDs 16 enters the light guide plate 19 through the light entrance surface 19b, and is then, for example, reflected toward the light exit surface 19a by the reflection sheet 20 that is disposed between the opposite plate surface 19c opposite to the light exit surface 19a and the bottom plate portion 14a of the chassis 14, and thereby propagating in the light guide plate 19 and then exits through the light exit surface 19a. Since the reflection sheet 20 has the extended reflection portion 20a that extends so as to be closer to the LEDs 16 than the light entrance surface 19b of the light guide plate 19, by reflecting the light from the LEDs 16 by the extended reflection portion 20a, light entering efficiency for the light entrance surface 19b is enhanced. On the other hand, since the bottom plate portion 14a of the chassis 14 has the light guide plate support portion 31 that supports the light guide plate 19 from the side of the opposite plate surface 19c and the light guide plate non-support portion 30 that does not support the light guide plate 19 from the side of the opposite plate surface 19c, if the portion overlapping with the light guide plate non-support portion 30 is included in the extended reflection portion 20a, the overlapping portion may be separated from the opposite plate surface 19c and the separated portion reflects the light from the LEDs 16 to cause the light to enter the opposite plate surface 19c directly, so that the entering light is likely to directly exit from the light exit surface 19a to cause a locally bight region, that is, luminance unevenness.

In this embodiment, since the cutout portion 32 is formed in the reflection sheet 20 by cutting out at least a part of the portion of the extended reflection portion 20a overlapping with the light guide plate non-support portion 30, so that a portion of the extended reflection portion 20a is less likely to be separated from the opposite plate surface 19c of the light guide plate 19 due to the light guide plate non-support portion 30, and light from the LEDs 16 is less likely to reflect off the extended reflection portion 20a and less likely to directly enter through the opposite plate surface 19c. Thereby, the light which has entered through the opposite plate surface 19c is less likely to directly exit through the light exit surface 19a, so that luminance unevenness is hard to be caused in the light output through the light exit surface 19a.

The reflection sheet 20 is formed so that the cutout edge of the cutout portion 32 is disposed so as to be opposite to the LEDs 16 with respect to the light entrance surface 19b. According to such a configuration, compared to a configuration that the cutout edge of the cutout portion is closer to the LEDs 16 than the light entrance surface 19b, a portion of the extended reflection portion 20a is less likely to be separated from the opposite plate surface 19c of the light guide plate 19 due to the light guide plate non-support portion 30, and light from the LEDs 16 is less likely to reflect off the extended reflection portion 20a and less likely to directly enter through the opposite plate surface 19c, thus making it possible to suppress luminance unevenness more suitably. Further, compared to a configuration that the cutout edge of the cutout portion is flush with the light entrance surface 19b, the cutout edge is less likely to be closer to the LEDs 16 than the light entrance surface 19b even if positional errors may be caused in arrangement of the cutout edge of the cutout portion 32 because of tolerance of a dimension, tolerance of attachment or the like, thus making it possible to suppress occurrence of luminance unevenness more suitably.

The light guide plate non-support portion 30 is formed so that an edge thereof is disposed on an opposite side to the LEDs 16 with respect to the light entrance surface 19b, and the reflection sheet 20 is formed so that the cutout edge of the cutout portion 32 is disposed so as to be closer to the light entrance surface 19a than the edge of the light guide plate non-support portion 30. Thereby, the reflection light reflecting off the reflection sheet 20 is sufficiently secured and use efficiency of light is less likely to be lowered, compared to a configuration that the cutout edge of the cutout portion is flush with the edge of the light guide plate non-support portion 30 and an amount of reflection light reflecting off the reflection sheet 20 decreases so that use efficiency of light is lowered. Note that, when the cutout edge of the cutout portion 32 is disposed so as to be closer to the light entrance surface 19b than the edge of the light guide plate non-support portion 30, the portion of the extended reflection portion 20a may be separated from the opposite plate surface 19c of the light guide plate 19 due to the light guide plate non-support portion 30. However, the cutout edge of the cutout portion 32 is flush with the light entrance surface 19b or opposite to the LEDs 16 with respect to the light entrance surface 19b and therefore, the reflection light reflecting off the extended reflection portion 20a extending closer to the LEDs 16 than the light entrance surface 19b is less likely to directly enter the light guide plate 19 through the opposite plate surface 19c, so that luminance unevenness becomes sufficiently hard to be caused.

The reflection sheet 20 is formed so that a dimension (an opening size) of the cutout portion 32 in the direction along the light entrance surface 19b continuously decreases as being farther away from the LEDs 16. Thereby, an area of the reflection sheet 20, that is, an amount of reflection light reflecting off the reflection sheet 20 in the direction along the light entrance surface 19b continuously changes, so that compared to a configuration that a dimension of the cutout portion in the direction along the light entrance surface 19b is constant or a configuration that the dimension decreases in a stepwise manner as being farther away from the LEDs 16, a dark region that may be caused in the light exit surface 19a due to the cutout portion 32 is less likely to be visually recognized, which is more suitable for suppressing occurrence of luminance unevenness.

The reflection sheet 20 is formed so that a formation range of the cutout portion 32 in the direction along the light entrance surface 19b becomes greater than the formation range of the light guide plate non-support portion 30 in the direction. Thereby, since the cutout portion 32 extends to have a formation range overlapping with the light guide plate support portion 31 in the direction along the light entrance surface 19b, an amount of reflection light changes continuously between the portion of the extended reflection portion 20a overlapping with the light guide plate non-support portion 30 and the portion of the extended reflection portion 20a overlapping with the light guide plate support portion 31. Thereby, a dark region that may be caused in the light exit surface 19a due to the cutout portion 32 is less likely to be visually recognized, which is further suitable for suppressing occurrence of luminance unevenness. Even if positional errors may be caused in arrangement of the cutout portion 32 because of tolerance of a dimension, tolerance of attachment, or the like, the cutout portion 32 is likely to be disposed so as to appropriately overlap with the light guide plate non-support portion 30 in the direction along the light entrance surface 19b, so that an effect of suppressing luminance unevenness by the cutout portion 32 is achieved more reliably.

Moreover, the reflection sheet 20 is formed so as to have a formation range of the cutout portion 32 in the direction along the light entrance surface 19b greater than a formation range of the cutout portion 32 in the direction from the LEDs 16 to the light entrance surface 19b. Thereby, even if positional errors may be caused in arrangement of the cutout portion 32 in the direction along the light entrance surface 19b because of tolerance of a dimension, tolerance of attachment, or the like, the cutout portion 32 is likely to be disposed so as to appropriately overlap with the light guide plate non-support portion 30 in the direction along the light entrance surface 19b, so that an effect of suppressing luminance unevenness by the cutout portion 32 is achieved more reliably. In this case, if the formation range of the cutout portion in the direction from the LEDs 16 to the light entrance surface 19b is greater than or same as the formation range of the cutout portion in the direction along the light entrance surface 19b with dealing with the positional errors that may be caused as described above in the arrangement of the cutout portion, the formation range of the cutout portion in the direction from the LEDs 16 to the light entrance surface 19b tends to be excessively large and an amount of reflection light reflecting off the reflection sheet 20 decreases, so that use efficiency of light is likely to be lowered. Compared to this, if the formation range of the cutout portion 32 in the direction along the light entrance surface 19b is greater than the formation range of the cutout portion 32 in the direction from the LEDs 16 to the light entrance surface 19b, an effect of suppressing luminance unevenness by the cutout portion 32 as described above is achieved more reliably while sufficiently ensuring use efficiency of light.

The light guide plate non-support portion 30 includes the chassis-side opening (opening) 28 which opens toward the bottom plate portion 14a. Thereby, compared to a configuration that the light guide plate non-support portion has a concave portion that is formed by recessing the bottom plate portion 14a, a portion of the extended reflection portion 20a may be likely to be separated from the opposite plate surface 19c of the light guide plate 19 due to the chassis-side opening 28, which is the light guide plate non-support portion 30, and a distance of the separation tends to be greater. However, the reflection sheet 20 including the cutout portion 32 is less likely to have such a problem, thus making it possible to effectively suppress luminance unevenness.

The LED board (light source board) 17 on which the LED 16 is mounted, and the board-side connector 22 and the wiring-side connector 23 (power feed portion) for feeding power to the LED 16 on the LED board 17 are included, in which the bottom plate portion 14a is formed so that the chassis-side opening 28 causes the board-side connector 22 and the wiring-side connector 23 to be exposed to outside. Thereby, when the chassis-side opening 28 is formed so as to cause the board-side connector 22 and the wiring-side connector 23 to be exposed to outside in the bottom plate portion 14a, it is possible to pass the wiring-side connector 23 through the chassis-side opening 28 easily. In this manner, the chassis-side opening 28 which allows passing the wiring-side connector 23 therethrough is disposed near the LED board 17 and the light entrance surface 19b of the light guide plate 19 in the bottom plate portion 14a, and thus is easy to be disposed necessarily so as to overlap also with the extended reflection portion 20a of the reflection sheet 20. However, in the reflection sheet 20 having the cutout portion 32, a portion of the extended reflection portion 20a is less likely to be separated from the opposite plate surface 19c of the light guide plate 19 due to the chassis-side opening 28, which is the light guide plate non-support portion 30, and light from the LEDs 16 is less likely to reflect off the extended reflection portion 20a and is less likely to directly enter through the opposite plate surface 19c, thus making it possible to effectively suppress luminance unevenness.

The LED board 17 has the LED mounting portion (light source mounting portion) 17a on which the LEDs 16 are mounted, and the protrusion for power feeding 17b which protrudes from the LED mounting portion 17a along a direction from a side of the light exit surface 19a to a side of the opposite plate surface 19c and in which the board-side connector 22 and the wiring-side connector 23 are disposed, in which the bottom plate portion 14a is formed so that the board-side connector 22, the wiring-side connector 23, and the protrusion for power feeding 17b are exposed to outside through the chassis-side opening 28. Thereby, compared to a configuration that the board-side connector and the wiring-side connector are arranged in a part of the LED mounting portion 17a and the LED mounting portion 17a includes a portion having no LED 16, with a configuration including the protrusion for power feeding 17b where the board-side connector 22 and the wiring-side connector 23 are disposed so as to be projected from the LED mounting portion 17a along the direction from the side of the light exit surface 19a to the side of the opposite plate surface 19c, the LED mounting portion 17a may not include the portion having no LED 16 thereon, so that a portion in which an amount of irradiated light from the LEDs 16 decreases locally is less likely to be generated in the light entrance surface 19b of the light guide plate 19. Thereby, even if a frame of the backlight device 12 is increasingly narrowed and the LEDs 16 and the light entrance surface 19b have a closer positional relation, a dark region is less likely to be generated in light output from the light exit surface 19a, thus making it possible to suppress generation of luminance unevenness associated with narrowing of the frame. In addition, since the protrusion for power feeding 17b protruding from the LED mounting portion 17a along the direction from the side of the light exit surface 19a to the side of the opposite plate surface 19c, and the board-side connector 22 and the wiring-side connector 23 disposed thereon are exposed to outside through the chassis-side opening 28 that is formed in the bottom plate portion 14a, so that sufficiently enhanced workability when the wiring-side connector 23 is passed through the chassis-side opening 28 is also achieved.

The bottom plate portion 14a is formed so that an opening edge of the chassis-side opening 28 is disposed so as to be opposite to the LEDs 16 with respect to the light entrance surface 19b. Thereby, even if a protrusion dimension by which the protrusion for power feeding 17b protrudes from the LED mounting portion 17a is small, a sufficiently large formation range of the chassis-side opening 28 is ensured so that the opening edge is disposed so as to be opposite to the LEDs 16 with respect to the light entrance surface 19b, so that excellent workability is achieved for working of passing the wiring-side connector 23 through the chassis-side opening 28. When the protrusion dimension by which the protrusion for power feeding 17b protrudes from the LED mounting portion 17a is reduced, reduction in thickness of the backlight device 12 is accomplished.

The liquid crystal display device (display device) 10 according to the present embodiment includes the backlight device 12, and the liquid crystal panel (display panel) 11 which displays an image by using light from the backlight device 12. With such a liquid crystal display device 10, luminance unevenness of the backlight device 12 is suppressed. Thus, the display device of the invention has excellent display quality associated with the image displayed on the liquid crystal panel 11 and is suitable for an increase in screen size.

A television device TV according to the present embodiment includes the liquid crystal display device 10 described above. With such a television device TV, luminance unevenness of the backlight device 12 included in the liquid crystal display device 10 is suppressed. Thus, the display device of the invention has excellent display quality associated with a television image displayed on the liquid crystal panel 11 and is suitable for an increase in screen size.

<Embodiment 2>

Embodiment 2 of the invention will be described with FIG. 10 or FIG. 11. Embodiment 2 indicates a cutout portion 132 whose formation range in the Y-axis direction is changed. Note that, overlapping description for structures, actions, and effects similar to those of Embodiment 1 described above will be omitted.

Figure 10:
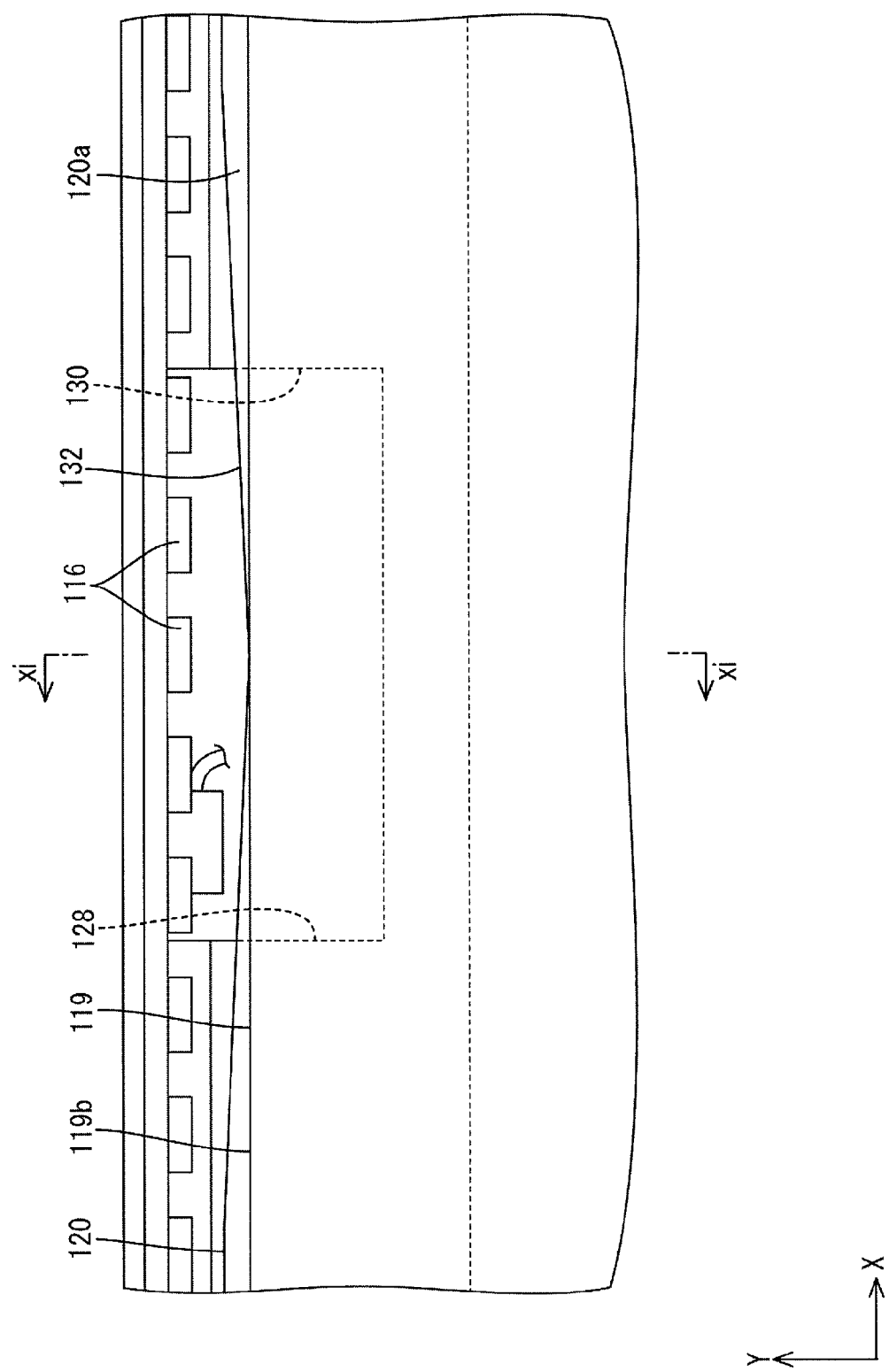
FIG. 10 is an enlarged plan view of a main part of a backlight device according to Embodiment 2 of the invention.
Figure 11:
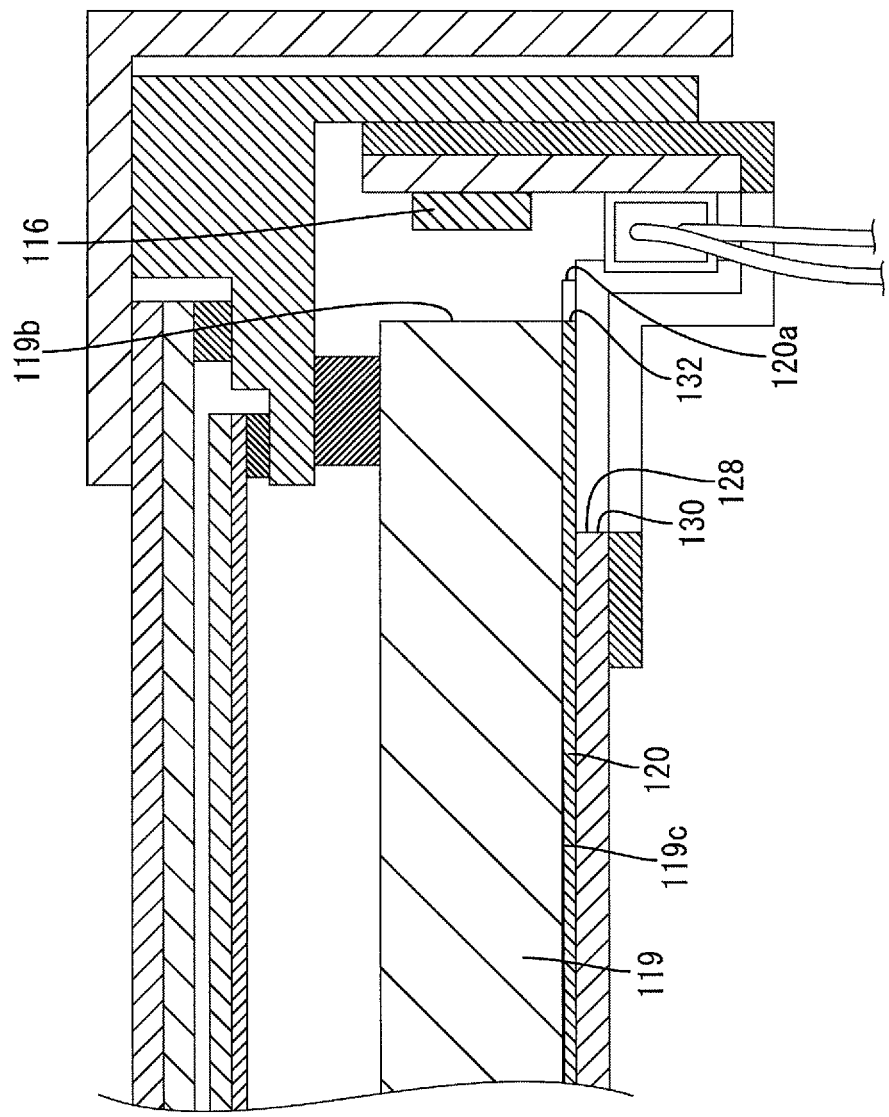
FIG. 11 is a cross-sectional view taken along a line xi-xi of FIG. 10.

As illustrated in FIG. 10 and FIG. 11, a reflection sheet 120 according to the present embodiment is formed so that the cutout portion 132 has a center portion in the X-axis direction having a cutout edge with a greatest distance from the LEDs 116 and the cutout edge of the center portion is flush with a light entrance surface 119b of a light guide plate 119 in the Y-axis direction. That is, the cutout portion 132 is selectively disposed only in an extended reflection portion 120a in the Y-axis direction and is not formed in a main body portion (portion excluding the extended reflection portion 120a) of the reflection sheet 120. Even with such a configuration, compared to a configuration that the cutout edge of the cutout portion is formed so as to protrude to be closer to the LEDs 116 than the light entrance surface 119b, a portion of the extended reflection portion 120a is less likely to be separated from an opposite plate surface 119c of the light guide plate 119 due to a chassis-side opening 128, which is a light guide plate non-support portion 130, and light from the LEDs 116 is less likely to reflect off the extended reflection portion 120a and less likely to directly enter through the opposite plate surface 119c, thus making it possible to suppress luminance unevenness more suitably.

According to the present embodiment described above, the reflection sheet 120 is formed so that the cutout edge of the cutout portion 132 is disposed so as to be flush with the light entrance surface 119b. Thereby, compared to a configuration that the cutout edge of the cutout portion is formed so as to protrude to be closer to the LEDs 116 than the light entrance surface 119b, a portion of the extended reflection portion 120a is less likely to be separated from the opposite plate surface 119c of the light guide plate 119 due to the light guide plate non-support portion 130, and light from the LEDs 116 is less likely to reflect off the extended reflection portion 120a and less likely to directly enter through the opposite plate surface 119cr, thus making it possible to suppress luminance unevenness more suitably.

<Embodiment 3>

Embodiment 3 of the invention will be described with FIG. 12. Embodiment 3 indicates a cutout portion 232 whose plan shape is changed from that of Embodiment 1 described above. Note that, overlapping description for structures, actions, and effects similar to those of Embodiment 1 described above will be omitted.

Figure 12:
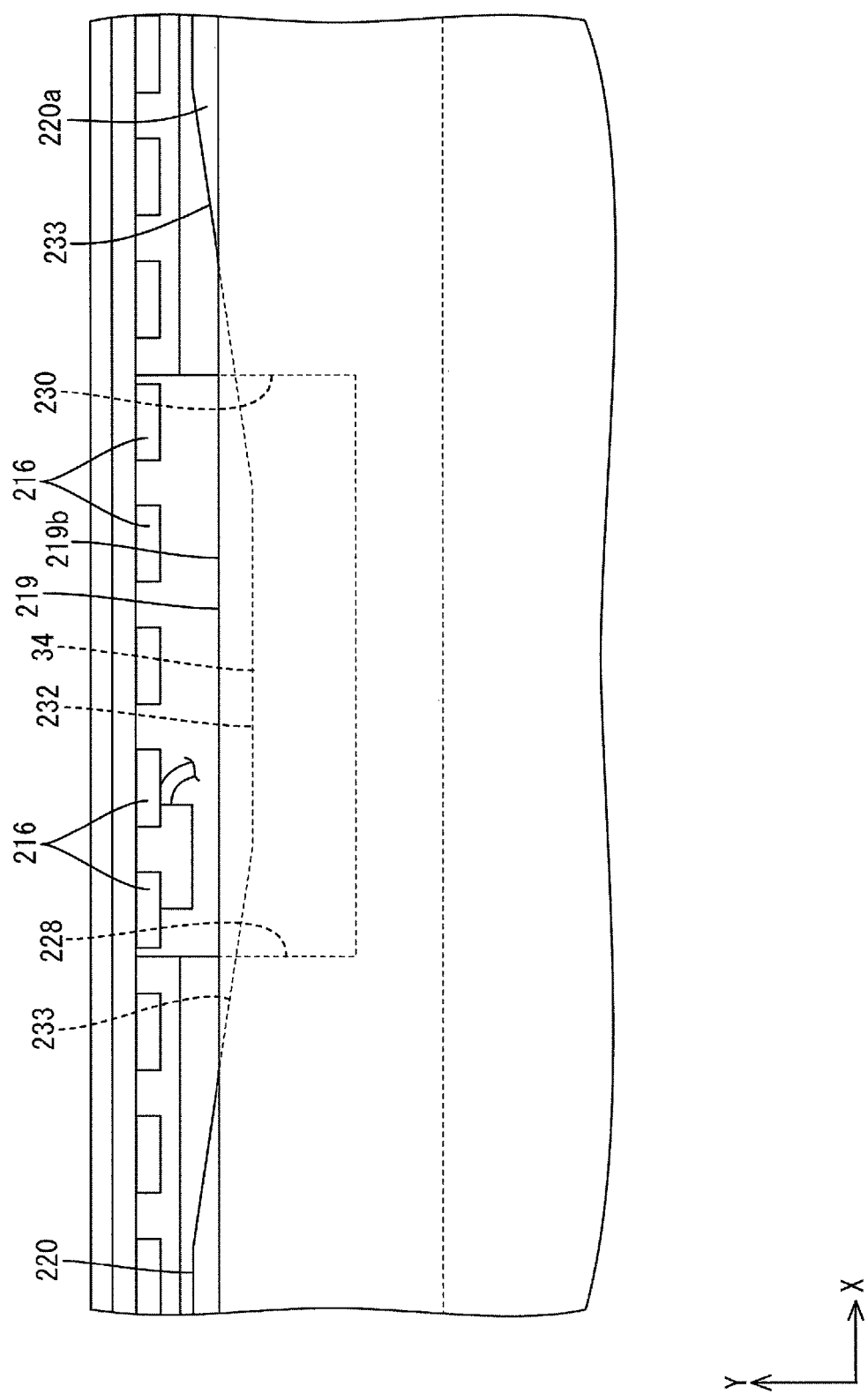
FIG. 12 is an enlarged plan view of a main part of a backlight device according to Embodiment 3 of the invention.

As illustrated in FIG. 12, a reflection sheet 220 according to the present embodiment is formed so that a plan shape of the cutout portion 232 is substantially trapezoid shape (specifically, even-leg trapezoid). Accordingly, a cutout edge of the cutout portion 232 includes a pair of inclined portions 233, and a straight portion 34 that connects center-side ends of the pair of inclined portions 233 of the cutout portion 232 and is almost straight along the X-axis direction. The cutout portion 232 is formed so that a distance from the cutout edge to LEDs 216 in the Y-axis direction continuously increases as being closer to the straight portion 34 in the X-axis direction and, to the contrary, continuously decreases as being farther away from the straight portion 34 in the X-axis direction in a formation rage of each of the inclined portion 233. On the other hand, the cutout portion 232 has a formation range of the straight portion 34 in which a distance from the cutout edge to the LEDs 216 in the Y-axis direction is constant over an entire area. The distance is longer than a distance from a light entrance surface 219b to the LEDs 216 in the Y-axis direction. With such a configuration, since an area of the cutout portion 232 formed in an extended reflection portion 220a is relatively larger than what is described in Embodiment 1 above, a portion of the extended reflection portion 220a is further less likely to be separated from an opposite plate surface of a light guide plate 219 due to a chassis-side opening 228, which is a light guide plate non-support portion 230, thus making it possible to suppress luminance unevenness more suitably.

<Embodiment 4>

Embodiment 4 of the invention will be described with FIG. 13. Embodiment 4 indicates a cutout portion 332 whose plan shape is changed from that of Embodiment 1 described above. Note that, overlapping description for structures, actions, and effects similar to those of Embodiment 1 described above will be omitted.

Figure 13:
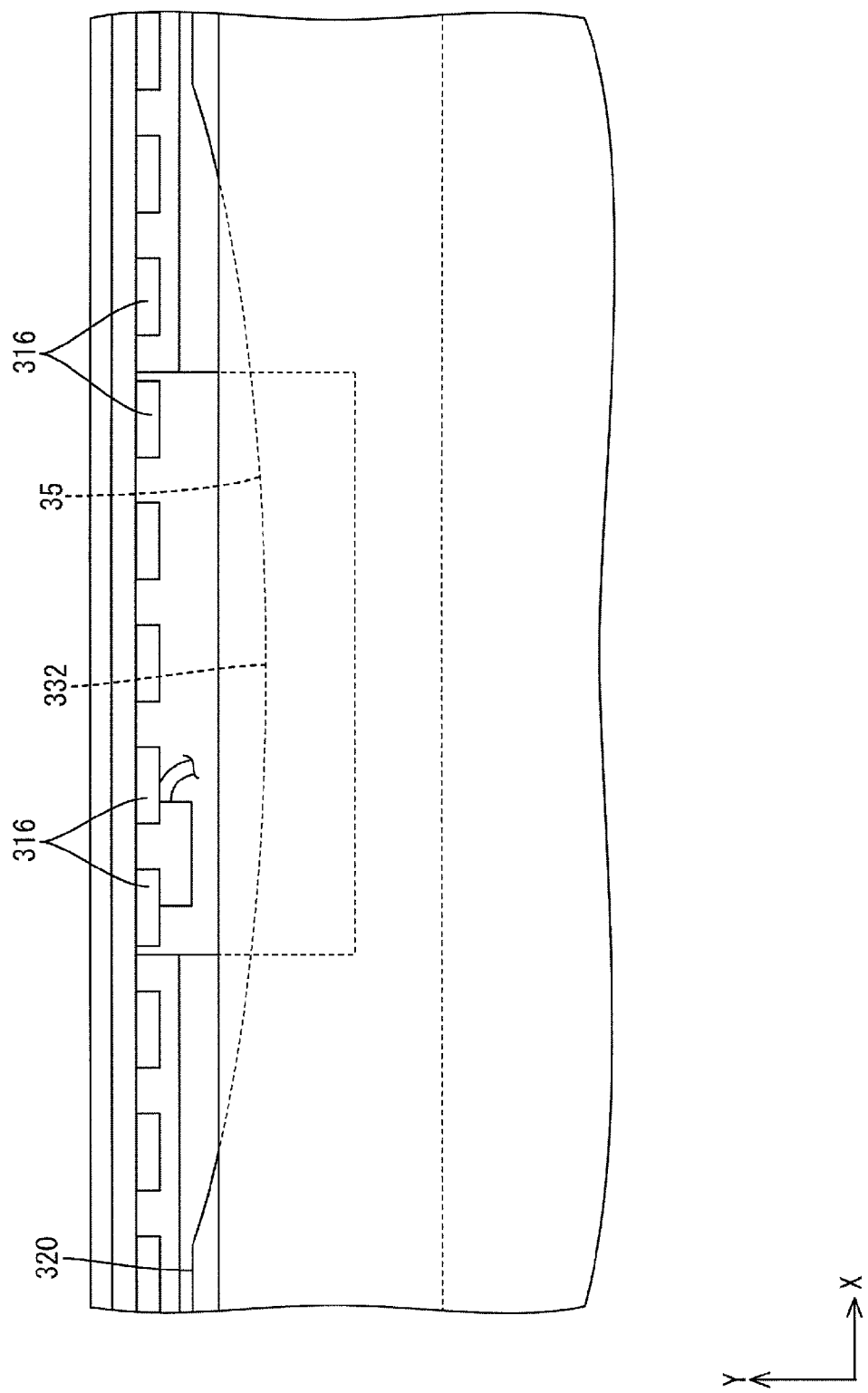
FIG. 13 is an enlarged plan view of a main part of a backlight device according to Embodiment 4 of the invention.

As, illustrated in FIG. 13, a reflection sheet 320 according to the present embodiment is formed so that a plan shape of the cutout portion 332 is a substantially bow shape and a cutout edge thereof is a circular arc portion 35. The cutout portion 332 is formed so that the circular arc portion 35, which is the cutout edge, is recessed so as to be farther away from LEDs 316 and any tangent lines thereof have an inclined shape to the X-axis direction and the Y-axis direction (in which, a contact line to a center portion of the circular arc portion 35 in the X-axis direction is excluded). That is, the cutout portion 332 is formed so that a center of a circle including the circular arc portion 35 which forms the cutout edge is positioned so as to be closer to the LEDs 316 with respect to the cutout edge in the Y-axis direction. In such a configuration as well, similarly to Embodiment 1 described above, the cutout portion 332 is formed so that a dimension in the X-axis direction continuously decreases as being farther away from the LEDs 316, thus making it possible to achieve effect of suppressing luminance unevenness similar to Embodiment 1.

<Embodiment 5>

Embodiment 5 of the invention will be described with FIG. 14. Embodiment 5 indicates a cutout portion 432 whose plan shape is further changed from that of Embodiment 4 described above. Note that, overlapping description for structures, actions, and effects similar to those of Embodiment 4 described above will be omitted.

Figure 14:
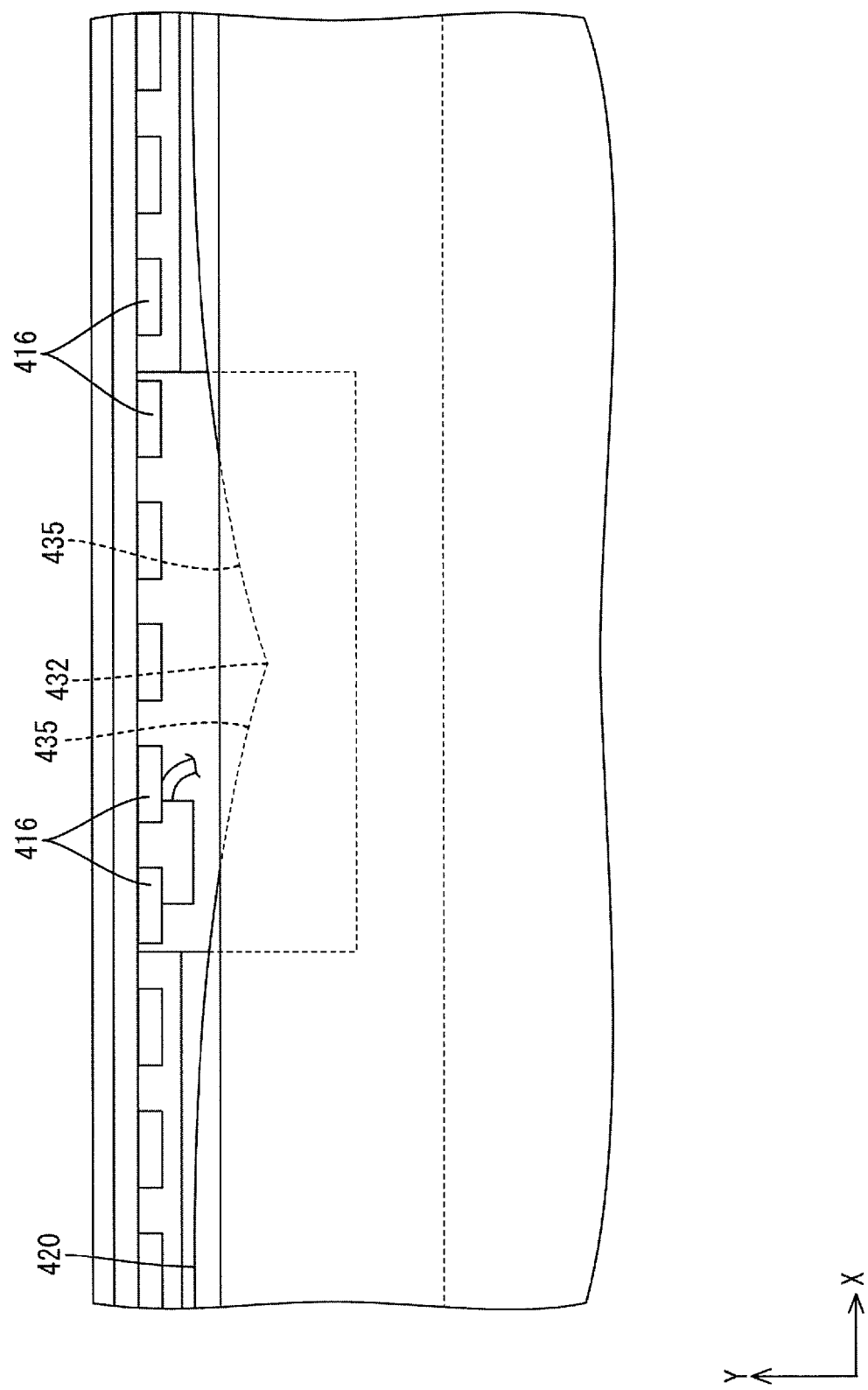
FIG. 14 is an enlarged plan view of a main part of a backlight device according to Embodiment 5 of the invention.

As illustrated in FIG. 14, a reflection sheet 420 according to the present embodiment is formed so that a plan shape in the cutout portion 432 is a substantially V-shape and a cutout edge thereof includes a pair of circular arc portions 435. The cutout edge 432 is formed so that the pair of circular arc portions 435, which is the cutout edge, each projects to LEDs 416 side, and any tangent lines thereof have an inclined shape to the X-axis direction and the Y-axis direction. That is, the cutout portion 432 is formed so that a center of a circle including each circular arc portion 435 which forms the cutout edge is positioned so as to be opposite to the LEDs 416 with respect to the cutout edge in the Y-axis direction.

<Embodiment 6>

Embodiment 6 of the invention will be described with FIG. 15. Embodiment 6 indicates a cutout portion 532 whose plan shape is changed from that of Embodiment 1 described above. Note that, overlapping description for structures, actions, and effects similar to those of Embodiment 1 described above will be omitted.

Figure 15:
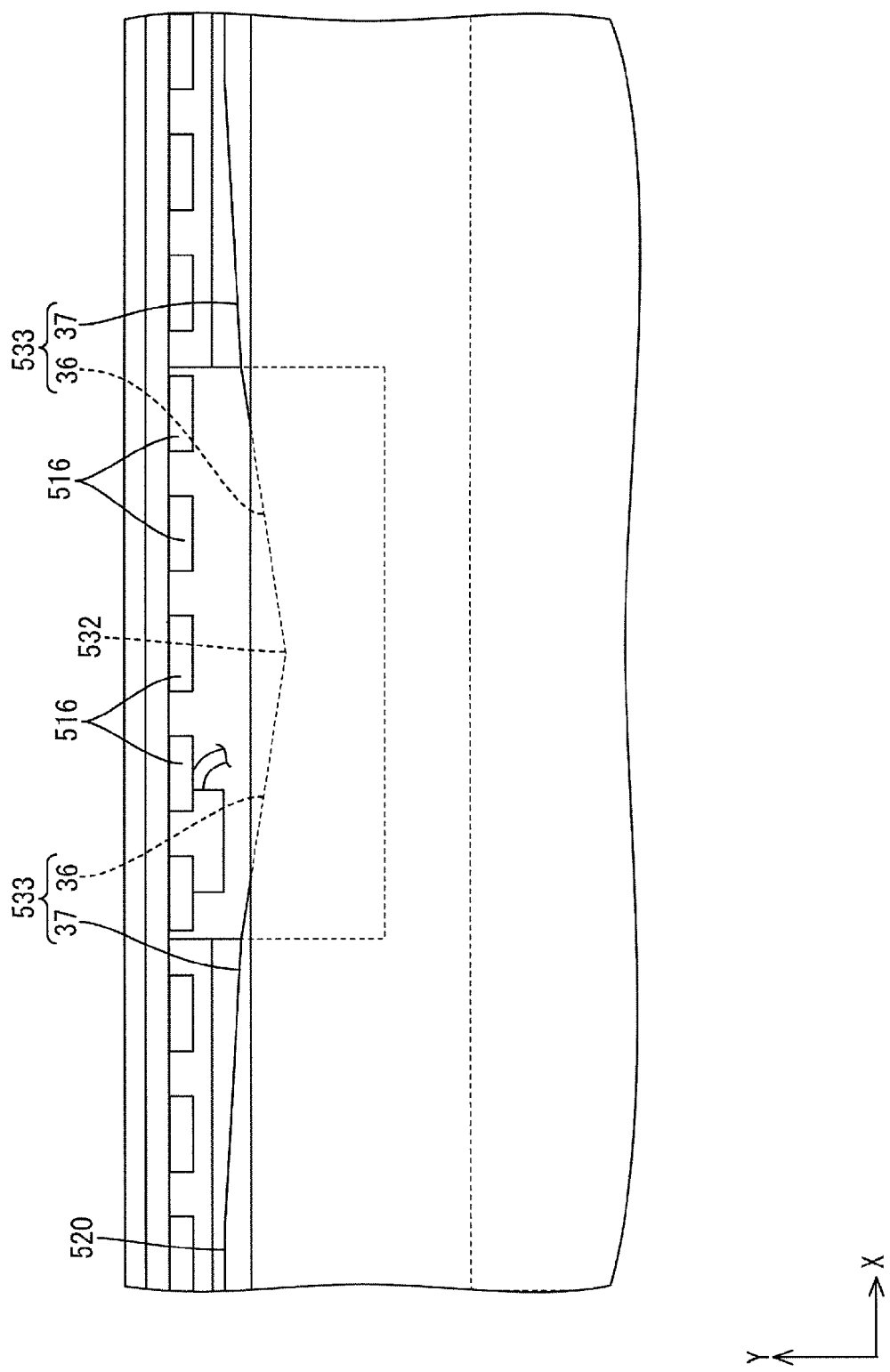
FIG. 15 is an enlarged plan view of a main part of a backlight device according to Embodiment 6 of the invention.

As illustrated in FIG. 15, a reflection sheet 520 according to the present embodiment is formed so as to have a configuration in which inclined portions 533 that form a cutout edge of the cutout portion 532 are bent in the middle so that inclination angles to the X-axis direction and the Y-axis direction change in the middle. Each of the inclined portions 533 includes a first inclined portion 36 that is disposed in the center side of the cutout portion 532 in the X-axis direction and a second inclined portion 37 that is disposed in the end side of the cutout portion 532 in the X-axis direction, and is configured so that the inclination angles to the X-axis direction and the Y-axis direction change in two steps. The first inclined portion 36 is formed so that an inclination angle formed with respect to the Y-axis direction is smaller than an inclination angle formed with respect to the Y-axis direction of the second inclined portion 37 and an inclination angle formed with respect to the X-axis direction is larger than an inclination angle formed with respect to the X-axis direction of the second inclined portion 37. In such a configuration as well, similarly to Embodiment 1 described above, the cutout portion 532 is formed so that a dimension in the X-axis direction continuously decreases as being farther away from LEDs 516, thus making it possible to achieve effect of suppressing luminance unevenness similar to Embodiment 1.

<Embodiment 7>

Embodiment 7 of the invention will be described with FIG. 16 or FIG. 17. Embodiment 7 indicates a cutout portion 632 whose formation range in the Y-axis direction is further changed from that of Embodiment 2 described above. Note that, overlapping description for structures, actions, and effects similar to those of Embodiment 2 described above will be omitted.

Figure 16:
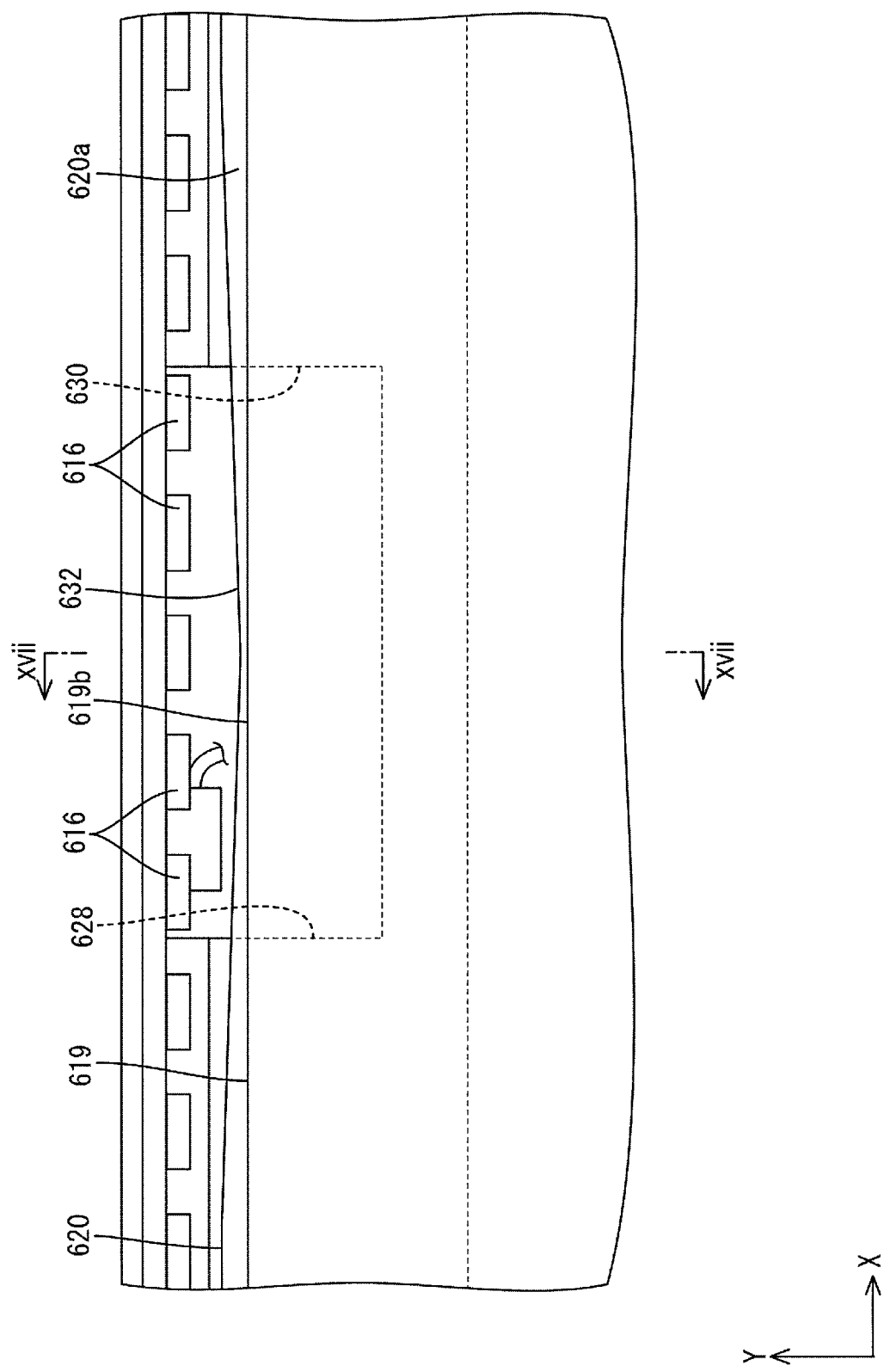
FIG. 16 is an enlarged plan view of a main part of a backlight device according to Embodiment 7 of the invention.
Figure 17:
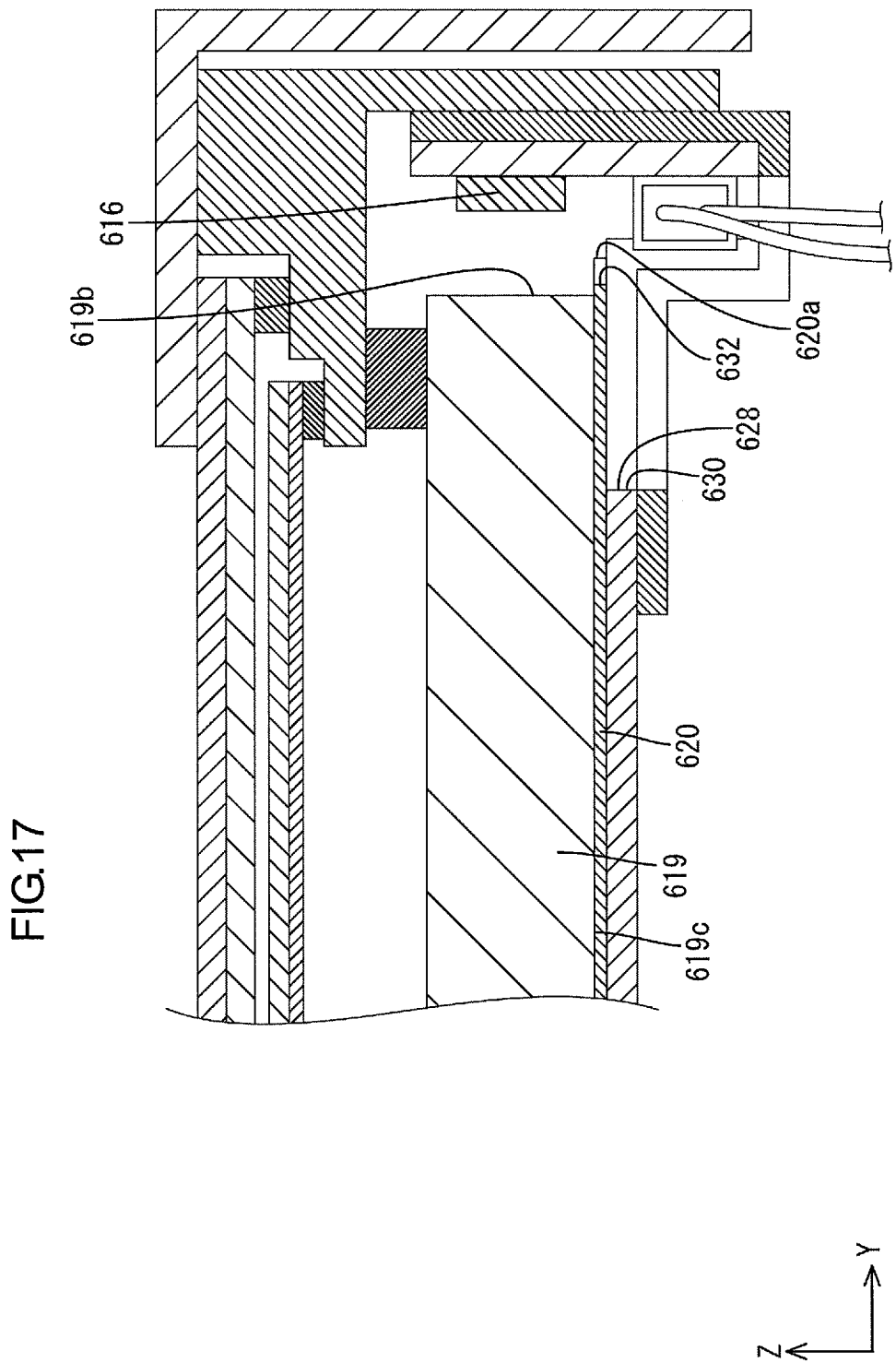
FIG. 17 is a cross-sectional view taken along a line xvii-xvii of FIG. 16.

As illustrated in FIG. 16 and FIG. 17, a reflection sheet 620 according to the present embodiment is formed so that a cutout edge of a center portion of the cutout portion 632 in the X-axis direction has a longest distance from LEDs 616 and the cutout edge is arranged closer to the LEDs 616 than a light entrance surface 619b of a light guide plate 619 in the Y-axis direction. Even with such a configuration, since a portion of an extended reflection portion 620a, which is the closest to the LEDs 616, is cut out by forming the cutout portion 632, compared to a configuration without having a cutout portion, a portion of the extended reflection portion 620a is less likely to be separated from an opposite plate surface 619c of the light guide plate 619 due to a chassis-side opening 628, which is a light guide plate non-support portion 630, and light from the LEDs 616 is less likely to reflect off the extended reflection portion 620a and less likely to directly enter through the opposite plate surface 619c, thus making it possible to suppress luminance unevenness more suitably.

<Embodiment 8>

Embodiment 8 of the invention will be described with FIG. 18 or FIG. 19. Embodiment 8 indicates a bottom plate portion 714a of a chassis 714 in which a reinforcement rib 38 is formed compared to Embodiment 1 described above. Note that, overlapping description for structures, actions, and effects similar to those of Embodiment 1 described above will be omitted.

Figure 18:
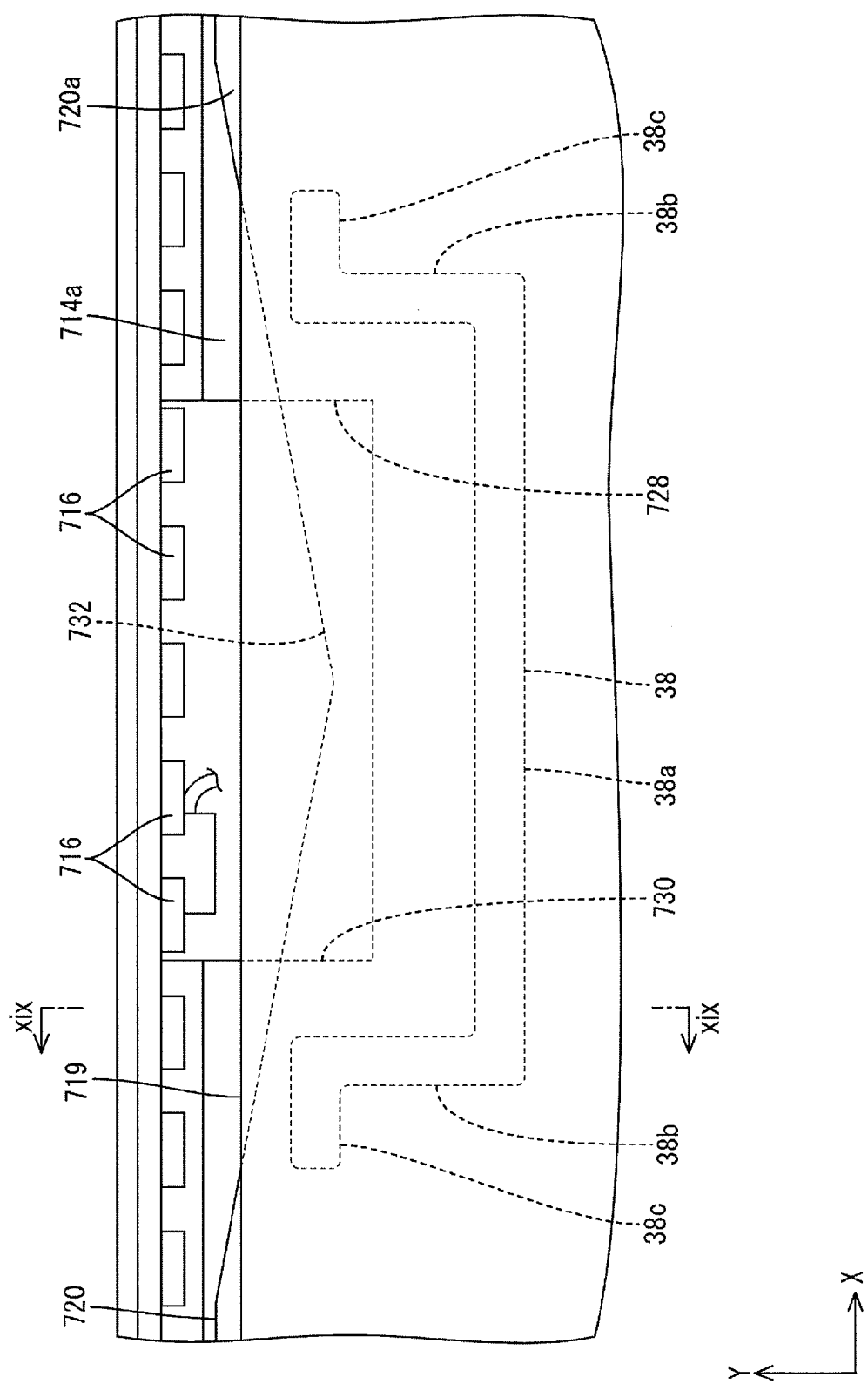
FIG. 18 is an enlarged plan view of a main part of a backlight device according to Embodiment 8 of the invention.
Figure 19:
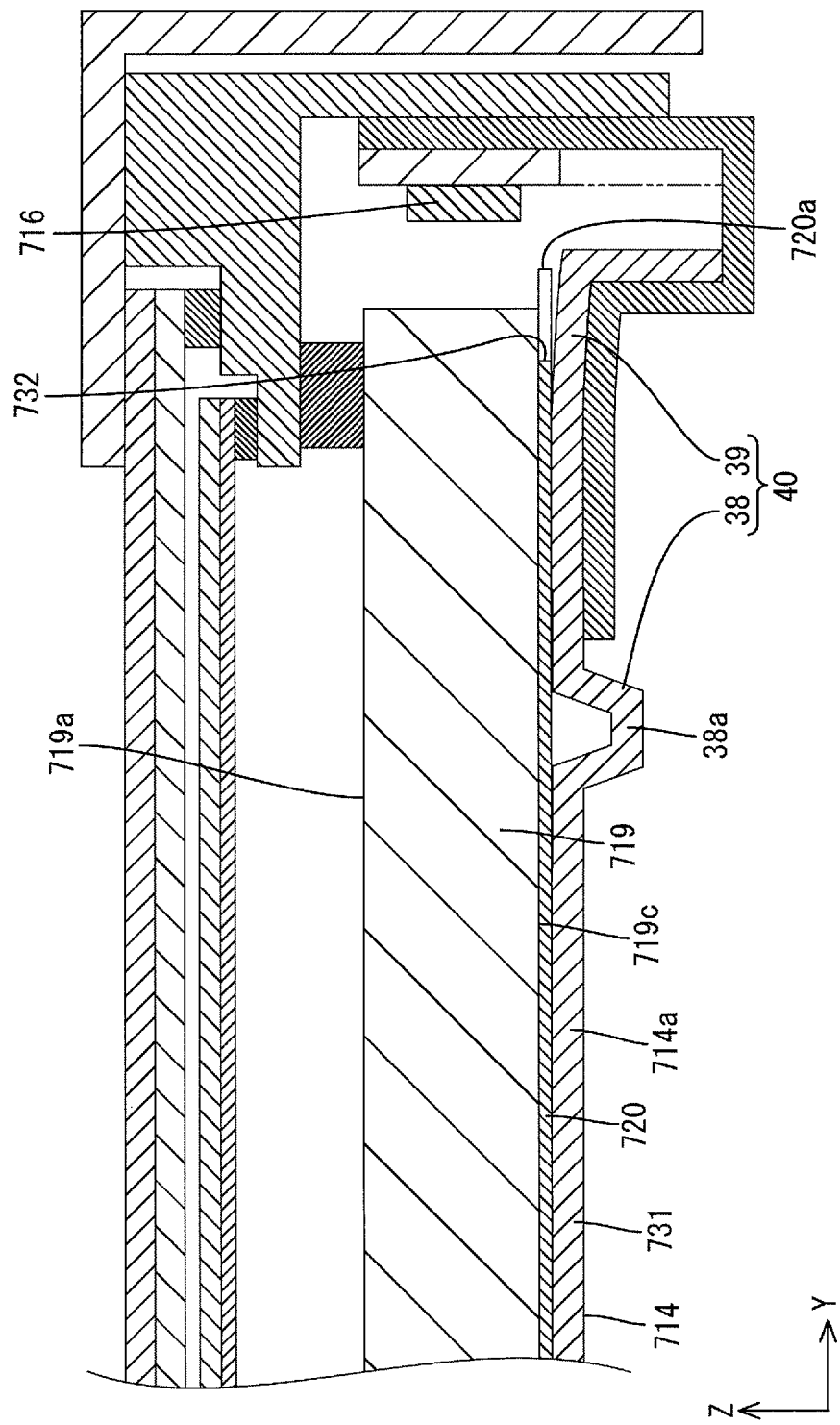
FIG. 19 is a cross-sectional view taken along a line xix-xix of FIG. 18.

As illustrated in FIG. 18 and FIG. 19, the bottom plate portion 714a forming the chassis 714 according to the present embodiment is provided with the reinforcement rib (recessed portion) 38 that is partially recessed to the rear side. The reinforcement rib 38 is formed integrally with the bottom plate portion 714a by performing drawing, and has a cross-sectional shape in a substantially trapezoid shape in which a bottom portion is disposed behind the bottom plate portion 714a. The reinforcement rib 38 is formed so as to be disposed in the bottom plate portion 714a at a position of being adjacent to a chassis-side opening 728 and so that a formation range in the X-axis direction is larger than a formation range in the X-axis direction of the chassis-side opening 728. Specifically, the reinforcement rib 38 includes a first reinforcement portion 38a, a pair of second reinforcement portions 38b, and a pair of third reinforcement portions 38c. The first reinforcement portion 38a is formed so as to surround the chassis-side opening 728 in a plan view and extends along the X-axis direction and has a length dimension greater than a dimension of the chassis-side opening 728 in the X-axis direction. The pair of second reinforcement portions 38b extends toward LEDs 716 from respective ends of the first reinforcement portion 38a in a length direction. The pair of third reinforcement portions 38c extends so as to be mutually away from an extended end of each of the second reinforcement portions 38b along the X-axis direction. Among them, the first reinforcement portion 38a is arranged to overlap with an entire area of the chassis-side opening 728 in the X-axis direction, while the second reinforcement portions 38b and the third reinforcement portions 38c are arranged to partially overlap with the chassis-side opening 728 in the Y-axis direction. When such a reinforcement rib 38 is formed in the bottom plate portion 714a, reduction in strength, which is caused in the bottom plate portion 714a as the chassis-side opening 728 is formed, is able to be compensated for.

However, if the reinforcement rib 38 as described above is formed in the bottom plate portion 714a, according to processing thereof, a deformation portion 39 caused by warpage or bending may be formed in a portion of the bottom plate portion 714a adjacent to the reinforcement rib 38, and the deformation portion 39 may be likely to be formed particularly at a position closer to an outer edge of the bottom plate portion 714a with respect to the reinforcement rib 38. If the deformation portion 39 is formed at the position closer to the outer edge of the bottom plate portion 714a with respect to the reinforcement rib 38, the deformation portion 39 is likely to be arranged so as to overlap with an extended reflection portion 720a of the reflection sheet 720 in a plan view. The deformation portion 39 has a distance from an opposite plate surface 719c of a light guide plate 719 relatively greater than a distance between the opposite plate surface 719c of the light guide plate 719 and a light guide plate support portion 731, so that the reinforcement rib 38 and the deformation portion 39 constitute a second light guide plate non-support portion 40 that does not support the light guide plate 719. On the other hand, in the present embodiment, a cutout portion 732 of the reflection sheet 720 is formed in a range of the extended reflection portion 720a overlapping not only with the chassis-side opening 728, which is a light guide plate non-support portion 730, but also with the deformation portion 39 included in the second light guide plate non-support portion 40 in a plan view. Thereby, a portion of the extended reflection portion 720a is less likely to be separated from the opposite plate surface 719c of the light guide plate 719 due to the deformation portion 39, which forms the second light guide plate non-support portion 40, and light from the LEDs 716 is less likely to reflect off the extended reflection portion 720a and less likely to directly enter through the opposite plate surface 719c. Thereby, a bright region becomes hard to be locally generated in the light exit surface 719a, thus luminance unevenness is hard to be caused.

According to the present embodiment, as described above, the light guide plate non-support portion 730 includes the reinforcement rib (recessed portion) 38 that is formed by recessing the bottom plate portion 714a so as to be farther away from the light guide plate 719, and the deformation portion 39 adjacent to the reinforcement rib 38 in the bottom plate portion 714a and having a distance from the opposite plate surface 719c of the light guide plate 719 relatively greater than a distance between the opposite plate surface 719c of the light guide plate 719 and the light guide plate support portion 731. If the reinforcement rib 38 that is recessed so as to be farther away from the light guide plate 719 is formed in the bottom plate portion 714a, the deformation portion 39 may be generated by warpage or bending in the bottom plate portion 714a and such a deformation portion 39 is in a portion of the bottom plate portion 714a adjacent to the reinforcement rib 38. Thus, for example, even if the reinforcement rib 38 is formed not overlapping with the extended reflection portion 720a of the reflection sheet 720, the deformation portion 39 may be formed in a portion of the bottom plate portion 714a overlapping with the extended reflection portion 720a of the reflection sheet 720. The deformation portion 39 is away from the opposite plate surface 719c of the light guide plate 719 with a distance relatively greater than a distance between the opposite plate surface 719c of the light guide plate 719 and the light guide plate support portion 731. In the reflection sheet 720 having the cutout portion 732, a portion of the extended reflection portion 720a is less likely to be separated from the opposite plate surface 719c of the light guide plate 719 due to the deformation portion 39, which is the light guide plate non-support portion 730, and light from the LEDs 716 is less likely to reflect off the extended reflection portion 720a and is less likely to directly enter through the opposite plate surface 719c, thus making it possible to effectively suppress luminance unevenness.

<Embodiment 9>

Embodiment 9 of the invention will be described with FIG. 20 or FIG. 21. Embodiment 9 indicates a bottom plate portion 814a of a chassis 814 in which a board attachment portion 41 is provided compared to Embodiment 1 described above. Note that, overlapping description for structures, actions, and effects similar to those of Embodiment 1 described above will be omitted.

Figure 20:
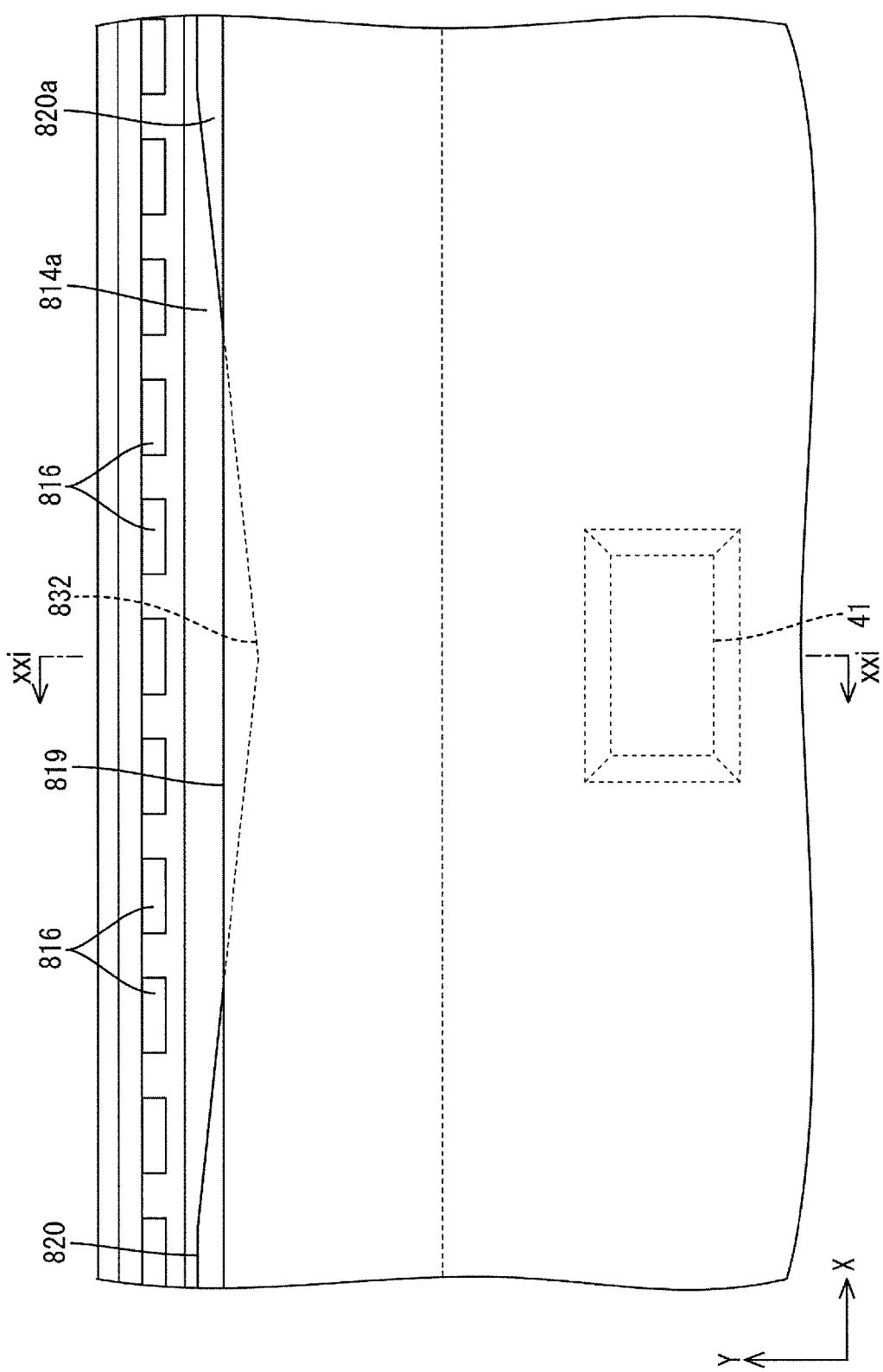
FIG. 20 is an enlarged plan view of a main part of a backlight device according to Embodiment 9 of the invention.
Figure 21:
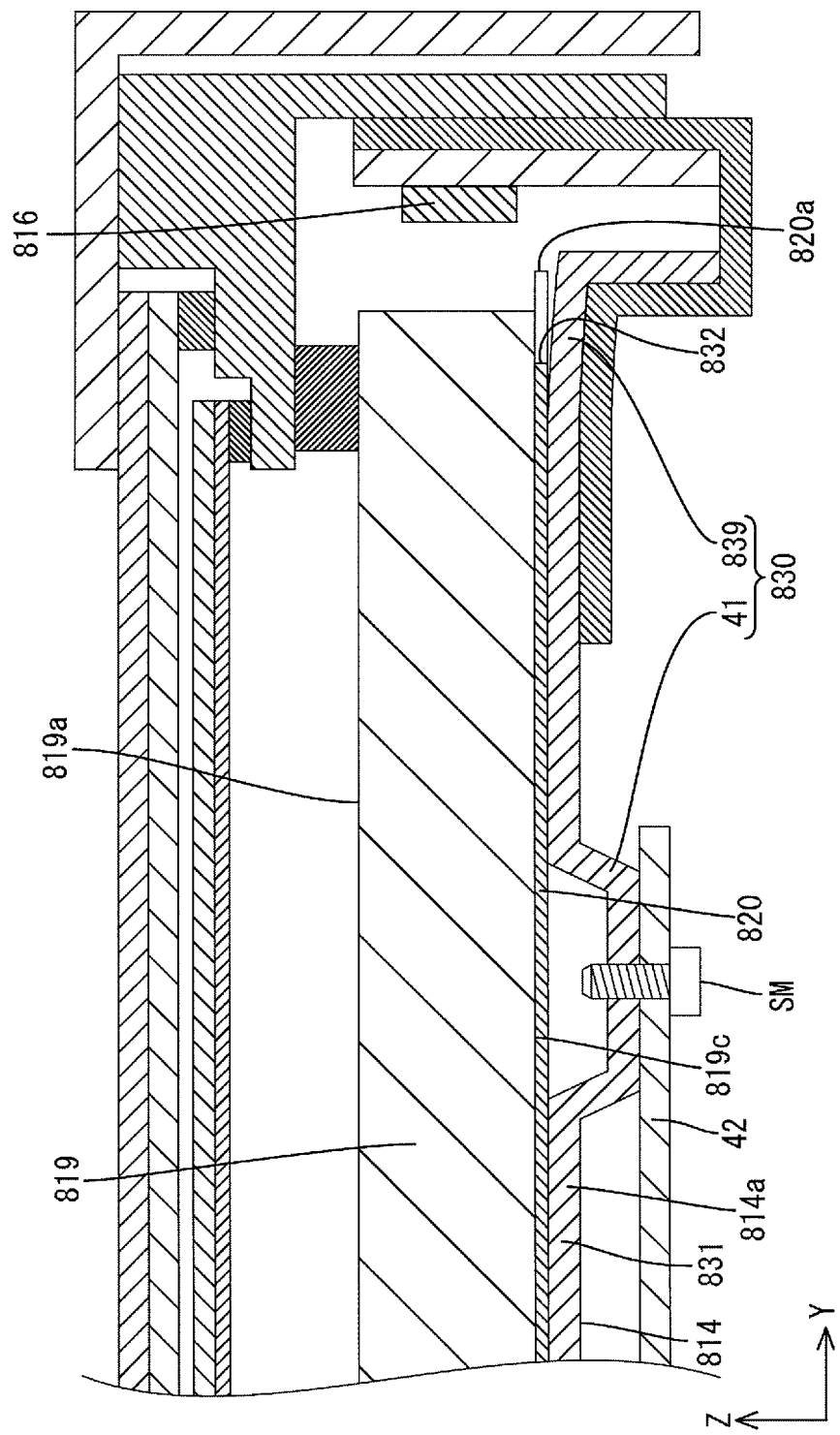
FIG. 21 is a cross-sectional view taken along a line xxi-xxi of FIG. 20.

As illustrated in FIG. 20 and FIG. 21, the bottom plate portion 814a forming the chassis 814 according to the present embodiment is provided with the board attachment portion (recessed portion) 41 so as to be partially recessed to the rear side. The board attachment portion 41 is formed integrally with the bottom plate portion 814a by performing drawing, and has a cross-sectional shape such that the bottom portion is disposed behind the bottom plate portion 814a and the bottom portion has a substantially trapezoid shape larger than that of the reinforcement rib 38 described in Embodiment 8 described above. A board 42 disposed behind the bottom plate portion 814a is attached to the board attachment portion 41 by a screw member SM. The board 42 includes a panel driving circuit board for driving a liquid crystal panel 811, an LED driving circuit board for supplying power to LEDs 816, and the like. Note that, in the present embodiment, provided is a configuration in which the chassis-side opening 28 described in Embodiment 1 above is not formed in the chassis 814.

When the board attachment portion 41 as described above is formed in the bottom plate portion 814a, according to processing thereof, a deformation portion 839 may be formed in a portion of the bottom plate portion 814a adjacent to the board attachment portion 41 by warpage or bending, and the deformation portion 839 is likely to be formed particularly at a position closer to an outer edge of the bottom plate portion 814a with respect to the board attachment portion 41. If the deformation portion 839 is formed at the position closer to the outer end of the bottom plate portion 814a with respect to the board attachment portion 41, the deformation portion 839 is likely to be arranged so as to overlap with an extended reflection portion 820a of the reflection sheet 820 in a plan view. The deformation portion 839 has a distance from an opposite plate surface 819c of a light guide plate 819 relatively longer than a distance between the opposite plate surface 819c of the light guide plate 819 and a light guide plate support portion 831, and thus the deformation portion 839 and the board attachment portion 41 constitute a light guide plate non-support portion 830 which does not support the light guide plate 819. On the other hand, in the present embodiment, a cutout portion 832 of the reflection sheet 820 is formed in a range of the extended reflection portion 820a overlapping with the deformation portion 839 included in the light guide plate non-support portion 830 in a plan view. Thereby, a portion of the extended reflection portion 820a is less likely to be separated from the opposite plate surface 819c of the light guide plate 819 due to the deformation portion 839 included in the light guide plate non-support portion 830, and light from the LEDs 816 is less likely to reflect off the extended reflection portion 820a and less likely to directly enter through the opposite plate surface 819c. Thereby, a bright region is hard to be locally generated in the light exit surface 819a, thus luminance unevenness is hard to be caused.

As described above, according to the present embodiment, the board 42 which is provided so as to be opposite to the light guide plate 819 with respect to the bottom plate portion 814a and is attached to the board attachment portion (recessed portion) 41. This makes it possible to attach the board 42, which is provided so as to be opposite to the light guide plate 819 with respect to the bottom plate portion 814a, by using the board attachment portion 41. In other words, even if the deformation portion 839 may be formed in the bottom plate portion 814a according to the formation of the board attachment portion 41 in the bottom plate portion 814a in order to attach the board 42, the reflection sheet 820 including the cutout portion 832 effectively suppresses luminance unevenness resulting from the deformation portion 839.

<Embodiment 10>

Embodiment 10 of the invention will be described with FIG. 22. Embodiment 10 indicates a double edge type backlight device 912 which is changed from one in Embodiment 1 described above. Note that, overlapping description for structures, actions, and effects similar to those of Embodiment 1 described above will be omitted.

Figure 22:
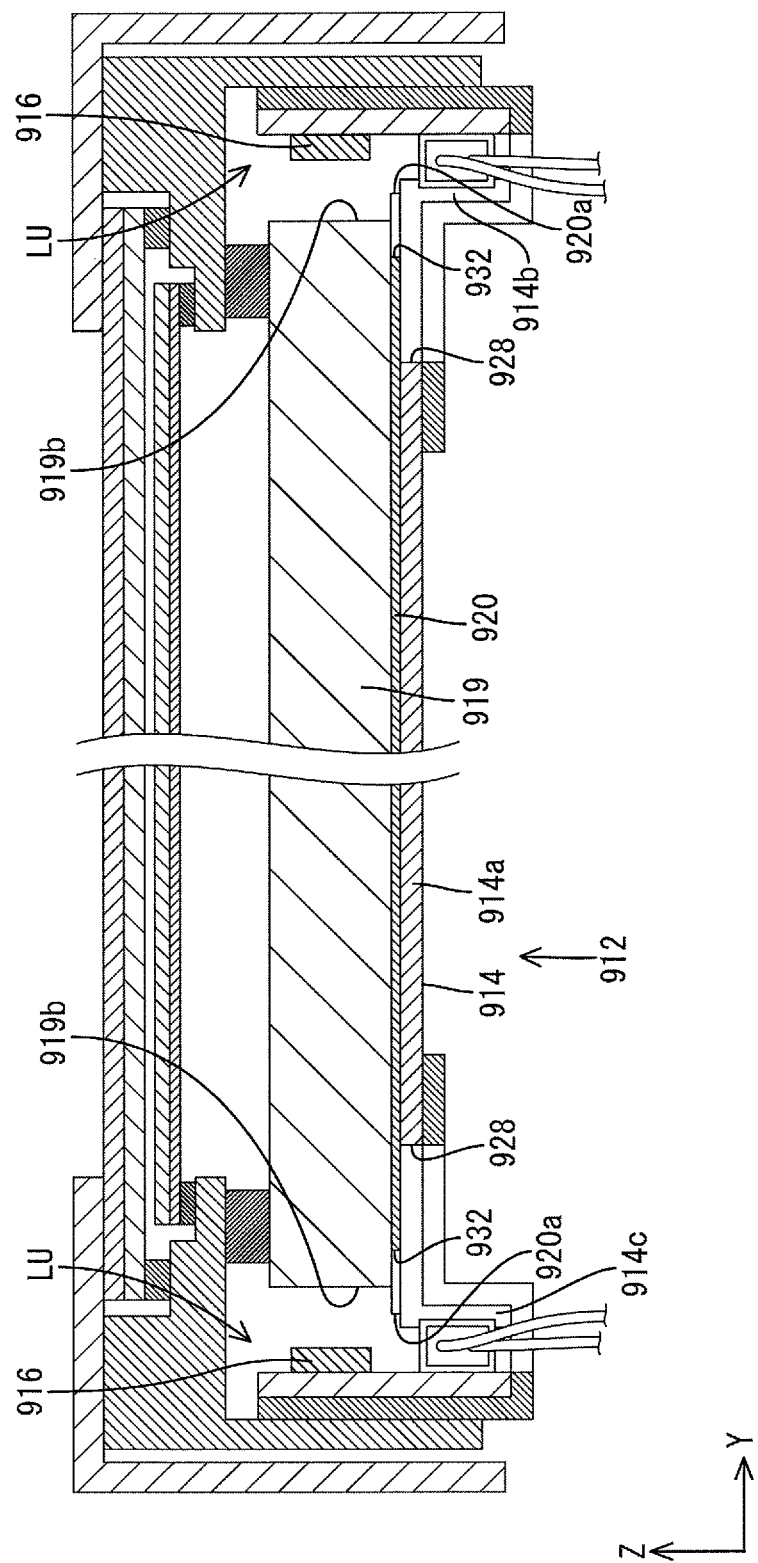
FIG. 22 is a cross-sectional view of a liquid crystal display device according to Embodiment 10 of the invention taken along a short-side direction thereof at a position passing through a cutout portion.

In the backlight device 912 according to the present embodiment, as illustrated in FIG. 22, two sets of LED units LU are arranged so as to hold a light guide plate 919 from both sides in a short-side direction (Y-axis direction), so that both long-side end surfaces of the light guide plate 919 are light entrance surfaces 919b. Accordingly, only both short-side end surfaces of the light guide plate 919 form end surfaces not facing LEDs which do not face LEDs 916. Each of the LED units LU is attached to each of the both long-side ends of a chassis 914, and accordingly, chassis-side openings 928 are formed so that one of them is disposed so as to cross a first side plate portion 914b from one long-side end of the bottom plate portion 914a, and the other of them is disposed so as to cross a second side plate portion 914c from the other long-side end of the bottom plate portion 914a. The second side plate portion 914c is formed so as to protrude toward a rear side from the bottom plate portion 914a similarly to the first side plate portion 914b. In a reflection sheet 920, each of both long-side ends thereof serves as an extended reflection portion 920a, and each cutout portion 932 is formed at a portion overlapping with the chassis-side opening 928 in a plan view (including the extended reflection portion 920a).

<Embodiment 11>

Embodiment 11 of the invention will be described with FIG. 23 or FIG. 24. Embodiment 11 indicates one in which the heat dissipation member 18 is omitted and a chassis 1014 has a different structure, compared to Embodiment 1 described above. Note that, overlapping description for structures, actions, and effects similar to those of Embodiment 1 described above will be omitted.

Figure 23:
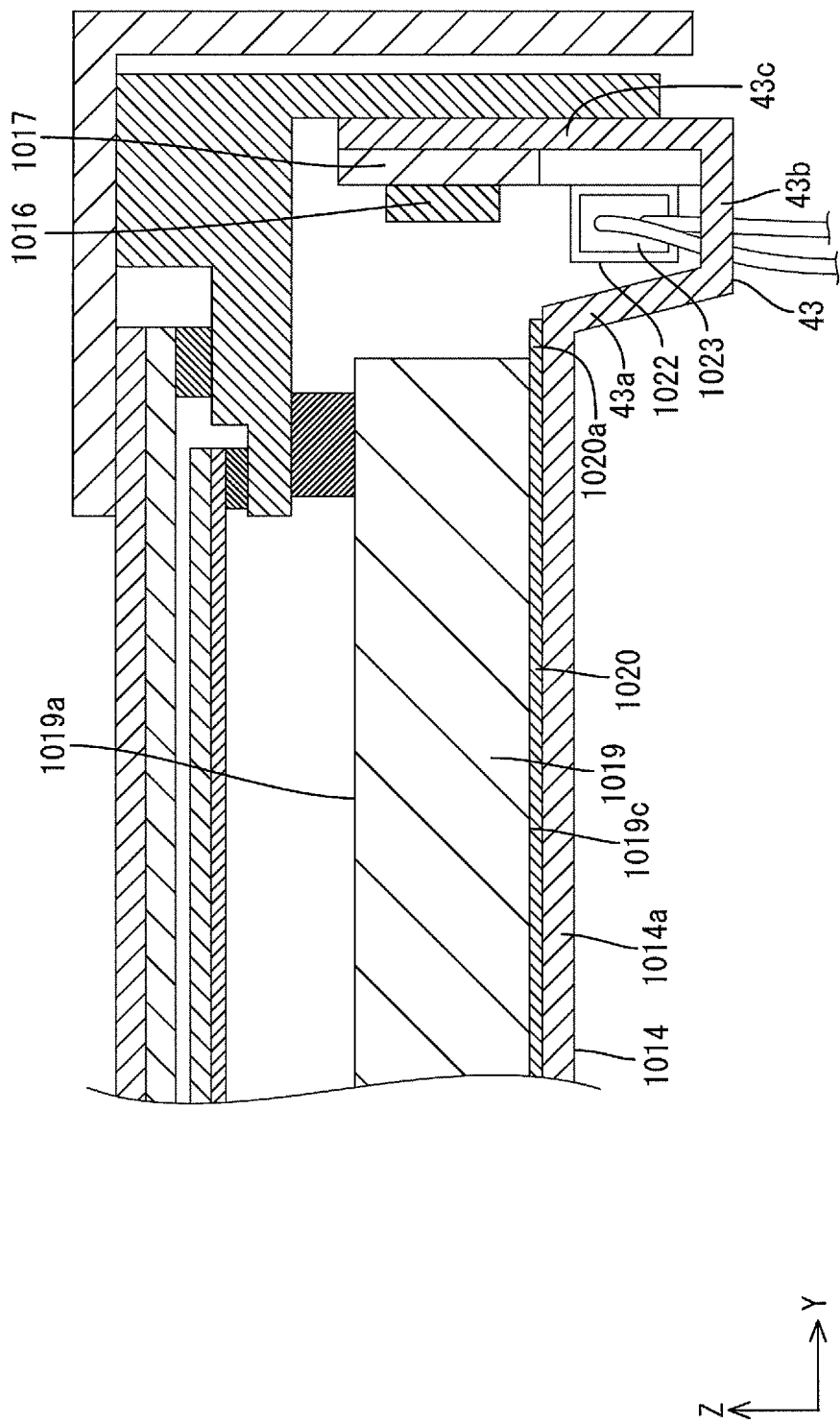
FIG. 23 is a cross-sectional view of a liquid crystal display device according to Embodiment 11 taken along a short-side direction thereof for illustrating a cross-sectional configuration.

As illustrated in FIG. 23, in the chassis 1014 according to the present embodiment, an LED board housing portion 43 in which an LED board 1017 is housed is provided at one long-side end of a bottom plate portion 1014a. The LED board housing portion 43 includes a first side portion 43a that protrudes toward a rear side from the long-side end of the bottom plate portion 1014a, a bottom portion 43b that extends so as to be farther away from the bottom plate portion 1014a with respect to an protruding end of the first side portion 43a along the Y-axis direction, and a second side portion 43c that upstands to the front side from an extending end of the bottom portion 43b. The LED board 1017 on which LEDs 1016 are mounted is housed in an inner space of the LED board housing portion 43. The LED board 1017 is attached so as to be in contact with the second side portion 43c which forms the LED board housing portion 43.

Figure 24:
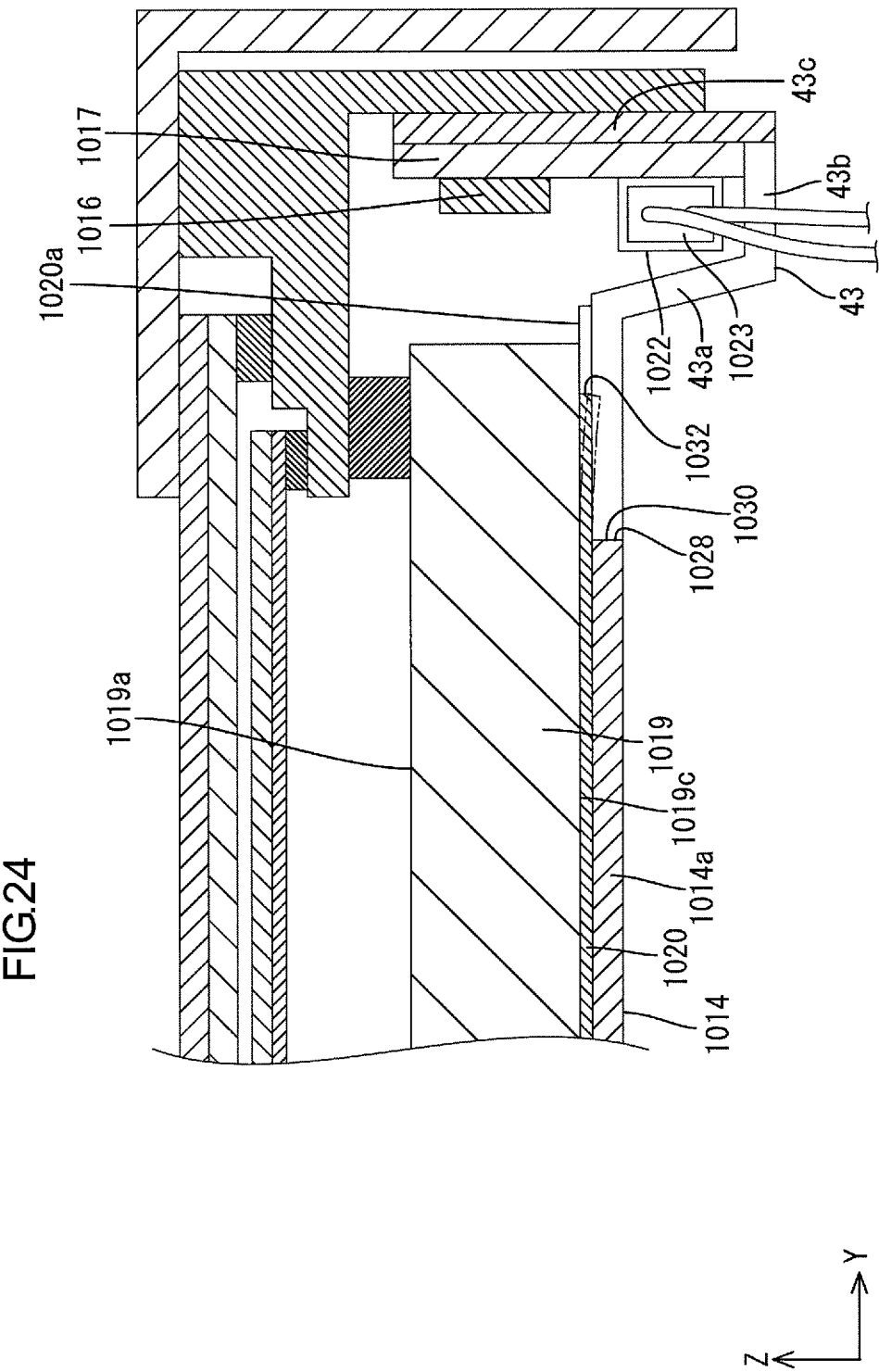
FIG. 24 is a cross-sectional view of the liquid crystal display device taken along the short-side direction thereof at a position passing through a cutout portion.

As illustrated in FIG. 24, the bottom plate portion 1014a and the LED board housing portion 43 include a chassis-side opening 1028 through which a board-side connector 1022 and a wiring-side connector 1023 are exposed to outside on a rear side thereof. The chassis-side opening 1028 is formed in a range over entire areas of the first side portion 43a and the bottom portion 43b of the LED board housing portion 43 in the Y-axis direction and a long-side end of the bottom plate portion 1014a, which is adjacent to the LED board housing portion 43. In such a configuration, the chassis-side opening 1028, which is a light guide plate non-support portion 1030, is arranged to overlap with a part of an extended reflection portion 1020a of a reflection sheet 1020. On the other hand, in the present embodiment, a cutout portion 1032 formed in the reflection sheet 1020 is formed in a range of the extended reflection portion 1020a overlapping with the chassis-side opening 1028 forming the light guide plate non-support portion 1030 in a plan view. Thereby, a portion of the extended reflection portion 1020*a* is less likely to be separated from an opposite plate surface 1019*c* of a light guide plate 1019 due to the chassis-side opening 1028 that forms the light guide plate non-support portion 1030, and light from the LEDs 1016 is less likely to reflect off the extended reflection portion 1020*a* and is less likely to directly enter through the opposite plate surface 1019*c*. Thereby, a bright region is hard to be locally generated in a light exit surface 1019*a*, thus luminance unevenness is hard to be caused.

<Embodiment 12>

Embodiment 12 of the invention will be described with FIG. 25. Embodiment 12 indicates one in which a reinforcement rib 1138 described in Embodiment 8 above is formed in a bottom plate portion 1114*a* described in Embodiment 11 above. Note that, overlapping description for structures, actions, and effects similar to those of Embodiments 8 and 11 described above will be omitted.

Figure 25:
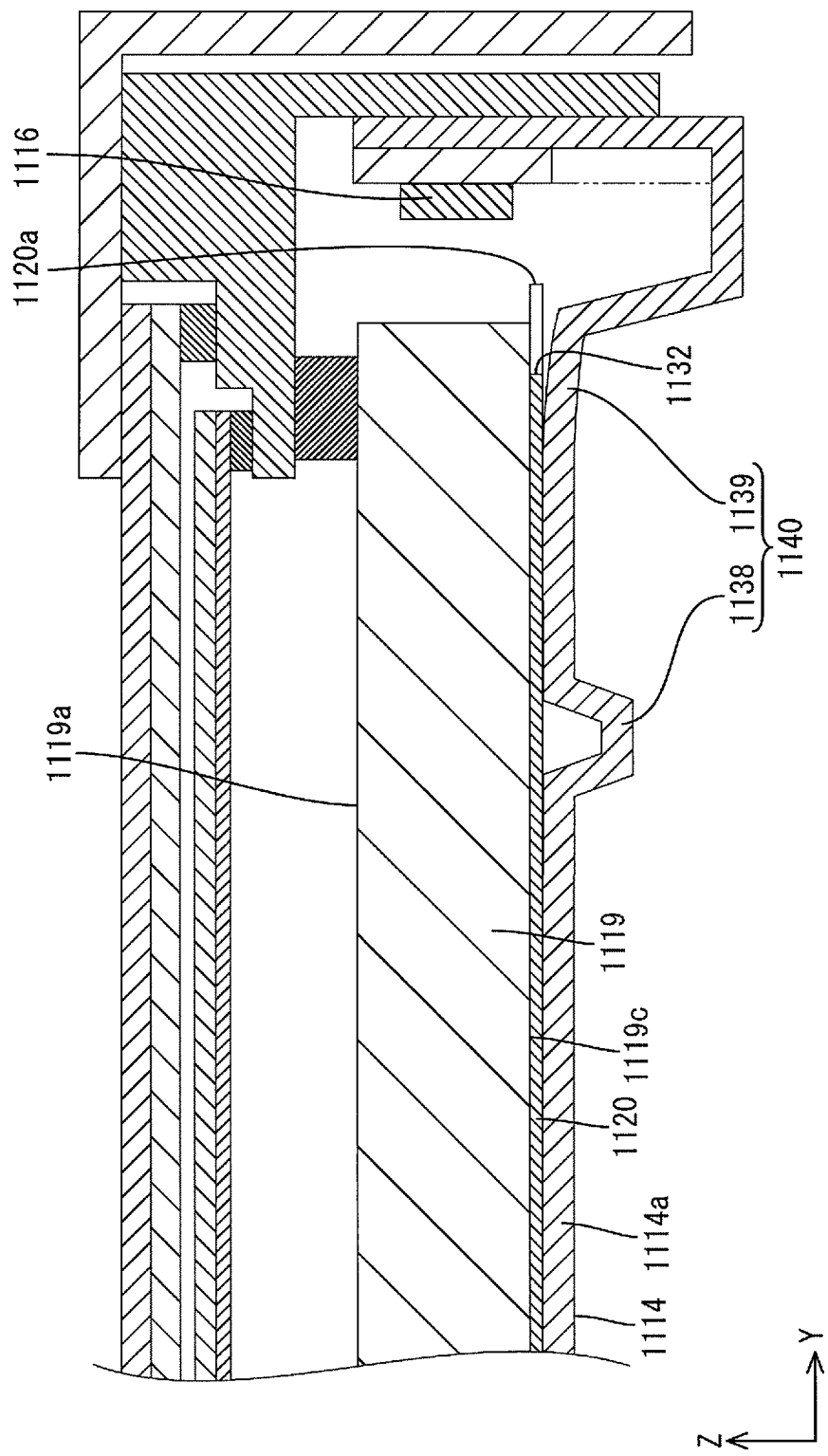
FIG. 25 is a cross-sectional view of a liquid crystal display device according to Embodiment 12 of the invention taken along a short-side direction thereof at a position passing through a cutout portion.

As illustrated in FIG. 25, the bottom plate portion 1114*a* forming a chassis 1114 according to the present embodiment is provided with the reinforcement rib 1138 for reinforcing the bottom plate portion 1114*a*. As the reinforcement rib 1138 is formed, a deformation portion 1138 is formed in the bottom plate portion 1114*a*, and the deformation portion 1139 forms a second light guide plate non-support portion 1140, which does not support a light guide plate 1119, with the reinforcement rib 1138. On the other hand, in the present embodiment, a cutout portion 1132 formed in a reflection sheet 1120 is formed in a range of an extended reflection portion 1120*a* overlapping with the deformation portion 1139 included in the second light guide plate non-support portion 1140 in a plan view. Thereby, a portion of the extended reflection portion 1120*a* is less likely to be separated from an opposite plate surface 1119*c* of a light guide plate 1119 due to the deformation portion 1139 included in the second light guide plate non-support portion 1140, and light from LEDs 1116 is less likely to reflect off the extended reflection portion 1120*a* and is less likely to directly enter through the opposite plate surface 1119*c*. Thereby, a bright region is hard to be locally generated in a light exit surface 1119*a*, thus luminance unevenness is hard to be caused.

<Embodiment 13>

Embodiment 13 of the invention will be described with FIG. 26. Embodiment 13 indicates one in which a board attachment portion 1241 described in Embodiment 9 above is formed in a bottom plate portion 1214*a* described in Embodiment 11 above. Note that, overlapping description for structures, actions, and effects similar to those of Embodiments 9 and 11 described above will be omitted.

Figure 26:
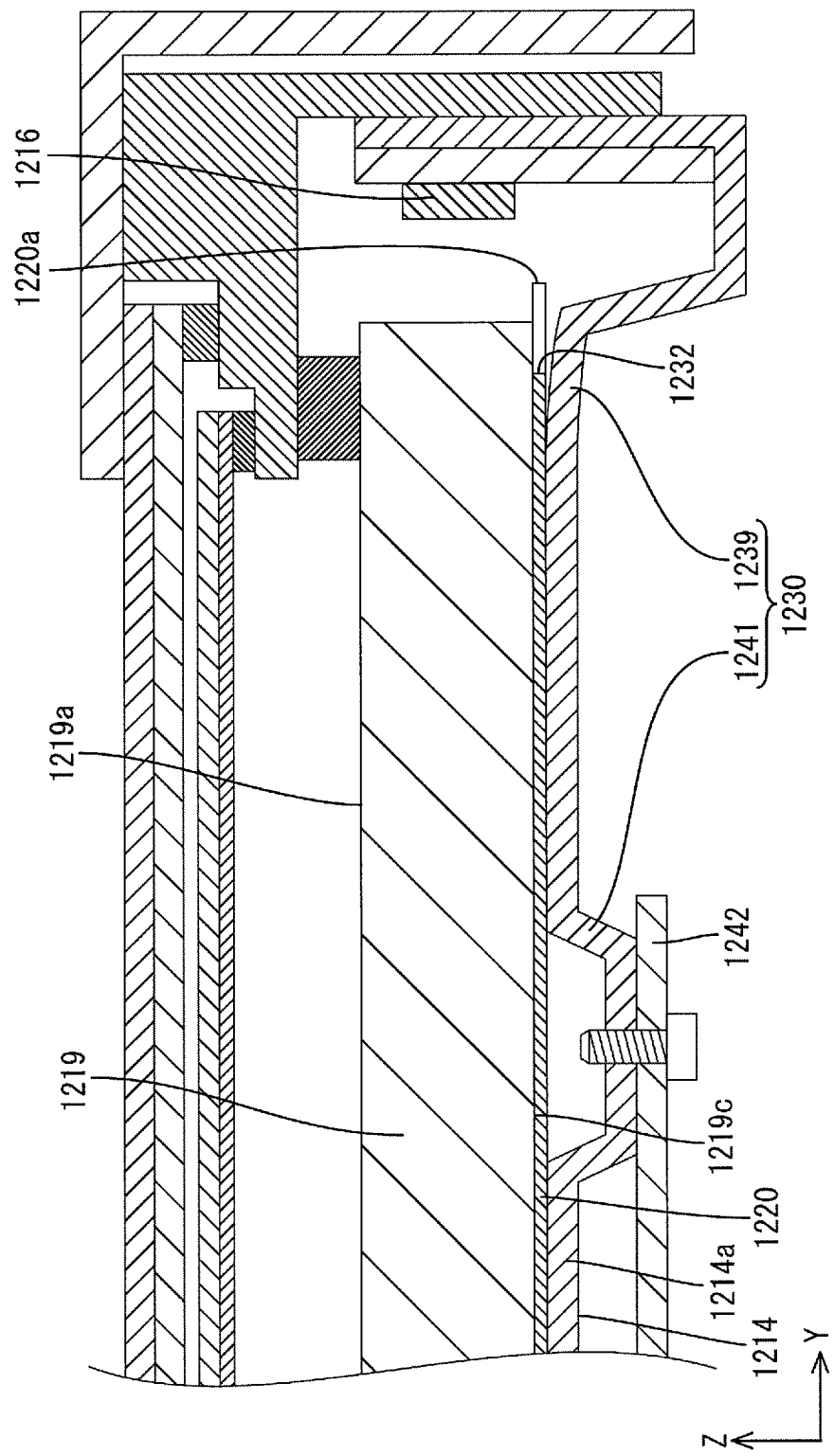
FIG. 26 is a cross-sectional view of a liquid crystal display device according to Embodiment 13 of the invention taken along a short-side direction thereof at a position passing through a cutout portion.

As illustrated in FIG. 26, the board attachment portion 1241 to which a board 1242 disposed behind the bottom plate portion 1214*a* is attached is formed in the bottom plate portion 1214*a* forming a chassis 1214 according to the present embodiment. As the board attachment portion 1241 is formed, a deformation portion 1239 is formed in the bottom plate portion 1214*a*, and the deformation portion 1239 and the board attachment portion 1241 constitute a light guide plate non-support portion 1230 that does not support a light guide plate 1219. On the other hand, in the present embodiment, a cutout portion 1232 formed in a reflection sheet 1220 is formed in a range of an extended reflection portion 1120*a*, which overlaps with the deformation portion 1239 forming the light guide plate non-support portion 1230 in a plan view. Thereby, a portion of an extended reflection portion 1220*a* is less likely to be separated from an opposite plate surface 1219*c* of the light guide plate 1219 due to the deformation portion 1239 included in the light guide plate non-support portion 1230, and light from LEDs 1216 is less likely to reflect off the extended reflection portion 1220*a* and is less likely to directly enter through the opposite plate surface 1219*c*. Thereby, a bright region is hard to be locally generated in a light exit surface 1219*a*, thus luminance unevenness is hard to be caused.

<Embodiment 14>

Embodiment 14 of the invention will be described with FIG. 27. Embodiment 14 indicates one in which a chassis 1314 has a structure which is further changed compared to one in Embodiment 11 described above. Note that, overlapping description for structures, actions, and effects similar to those of Embodiment 11 described above will be omitted.

Figure 27:
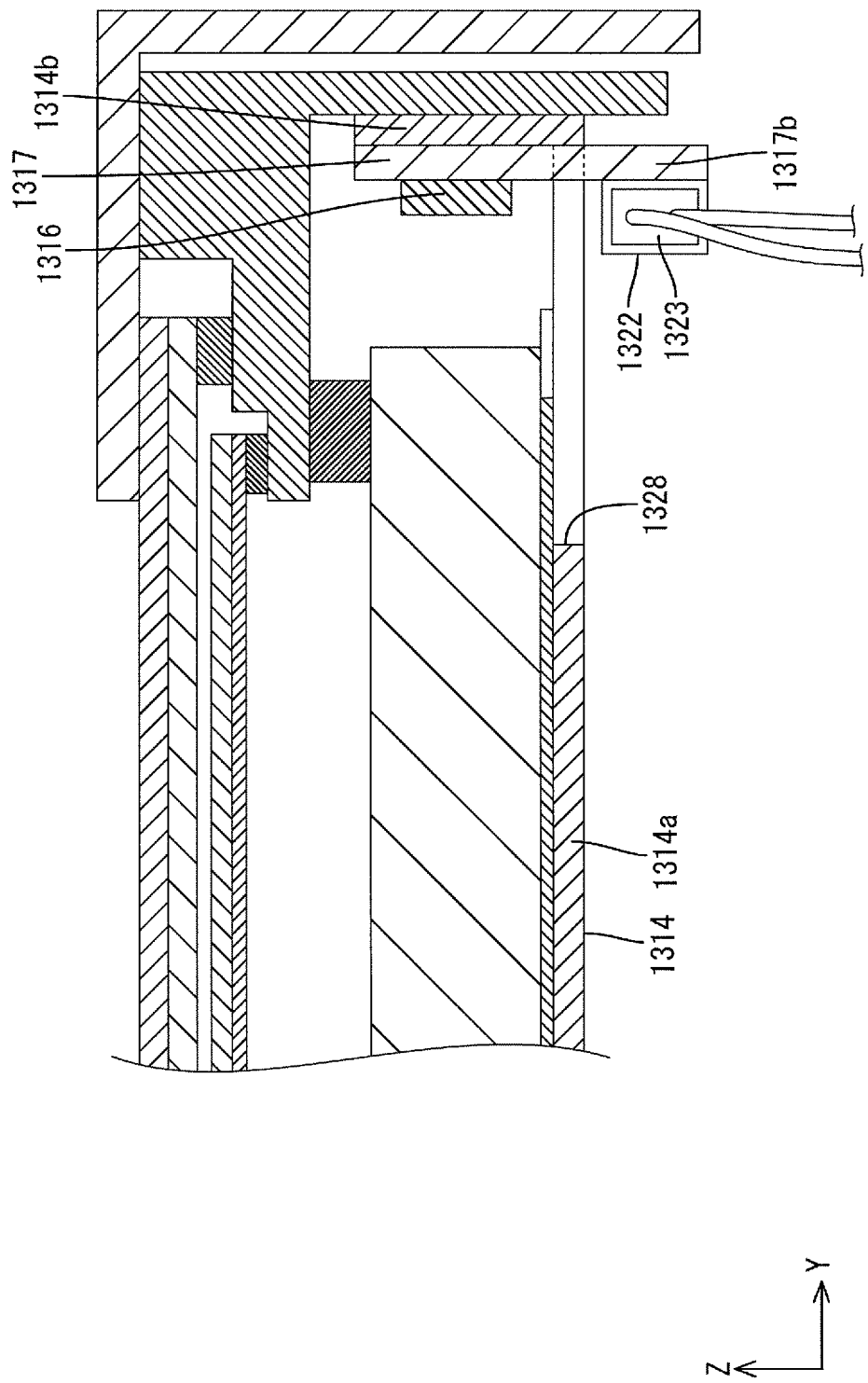
FIG. 27 is a cross-sectional view of a liquid crystal display device according to Embodiment 14 of the invention taken along a short-side direction thereof at a position passing through a cutout portion.

In the chassis 1314 according to the present embodiment, as illustrated in FIG. 27, a first side plate portion 1314*b* is formed so as to upstand toward a front side from an end of a bottom plate portion 1314*a* on an LED board 1317 side, and the LED board 1317 is attached so as to be in contact with the first side plate portion 1314*b*. A chassis-side opening 1328 which is formed in the bottom plate portion 1314*a* has an outer opening edge formed so as to be flush with a surface of the first side plate portion 1314*b* to which the LED board 1317 is attached, and is thus allowed to pass a protrusion for power feeding 1317*b* of the LED board 1317 and a board-side connector 1322 therethrough. The protrusion for power feeding 1317*b* and board-side connector 1322 are disposed so as to protrude to outside on a rear side of the bottom plate portion 1314*a* through the chassis-side opening 1328, and a wiring-side connector 1323 is allowed to be connected to the board-side connector 1322 by fitting with each other.

<Other Embodiments>

The invention is not limited to the embodiments explained in the aforementioned description and drawings, and the following embodiments are included in a technical scope of the invention, for example.

Figure 28:
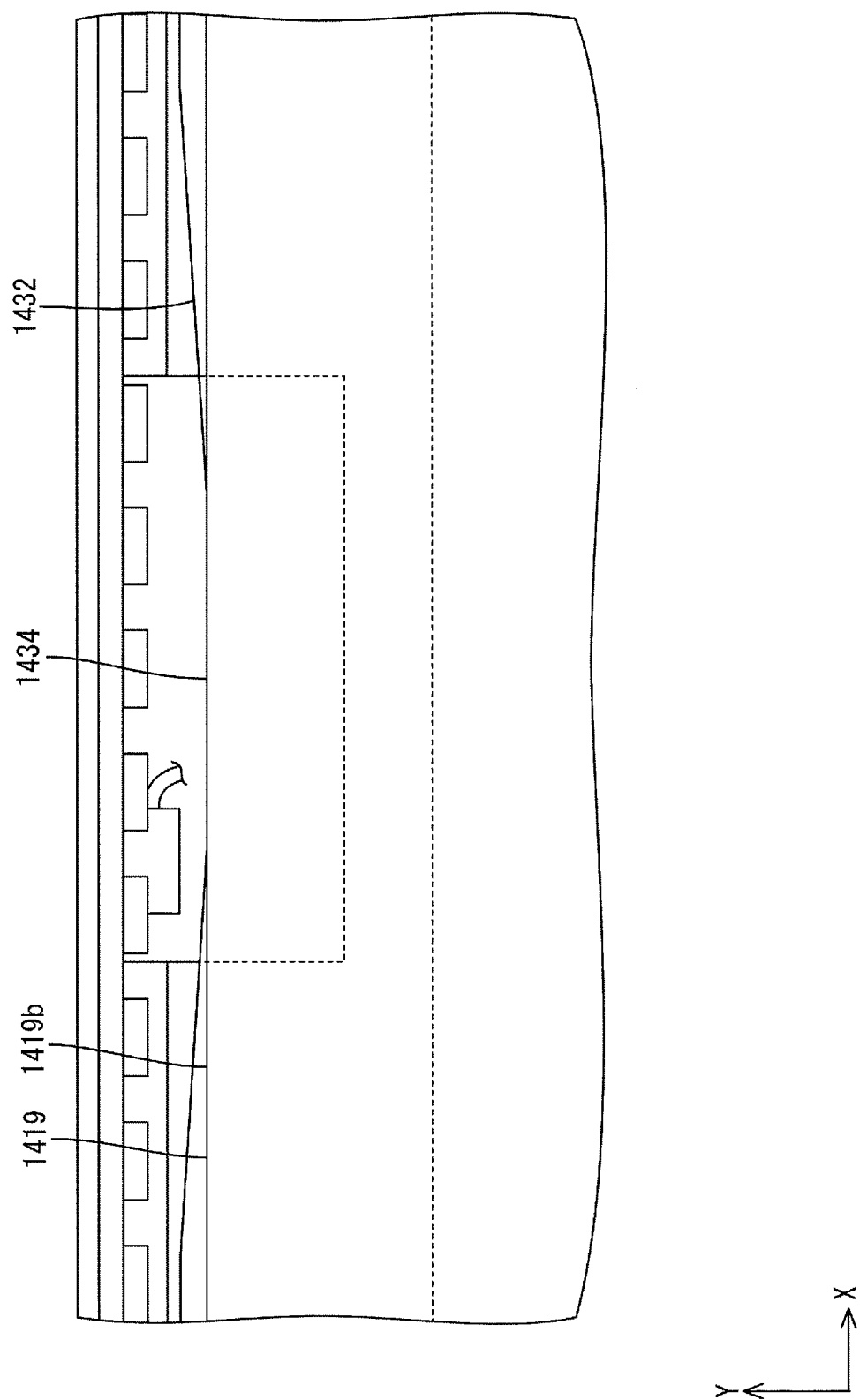
FIG. 28 is an enlarged plan view of a main part of a backlight device according to another embodiment (1) of the invention.

(1) As a modified example of Embodiment 3 described above, as illustrated in FIG. 28, it may be configured so that a straight portion 1434 which forms a cutout edge of a cutout portion 1432 is flush with a light entrance surface 1419*a* of a light guide plate 1419.

Figure 29:
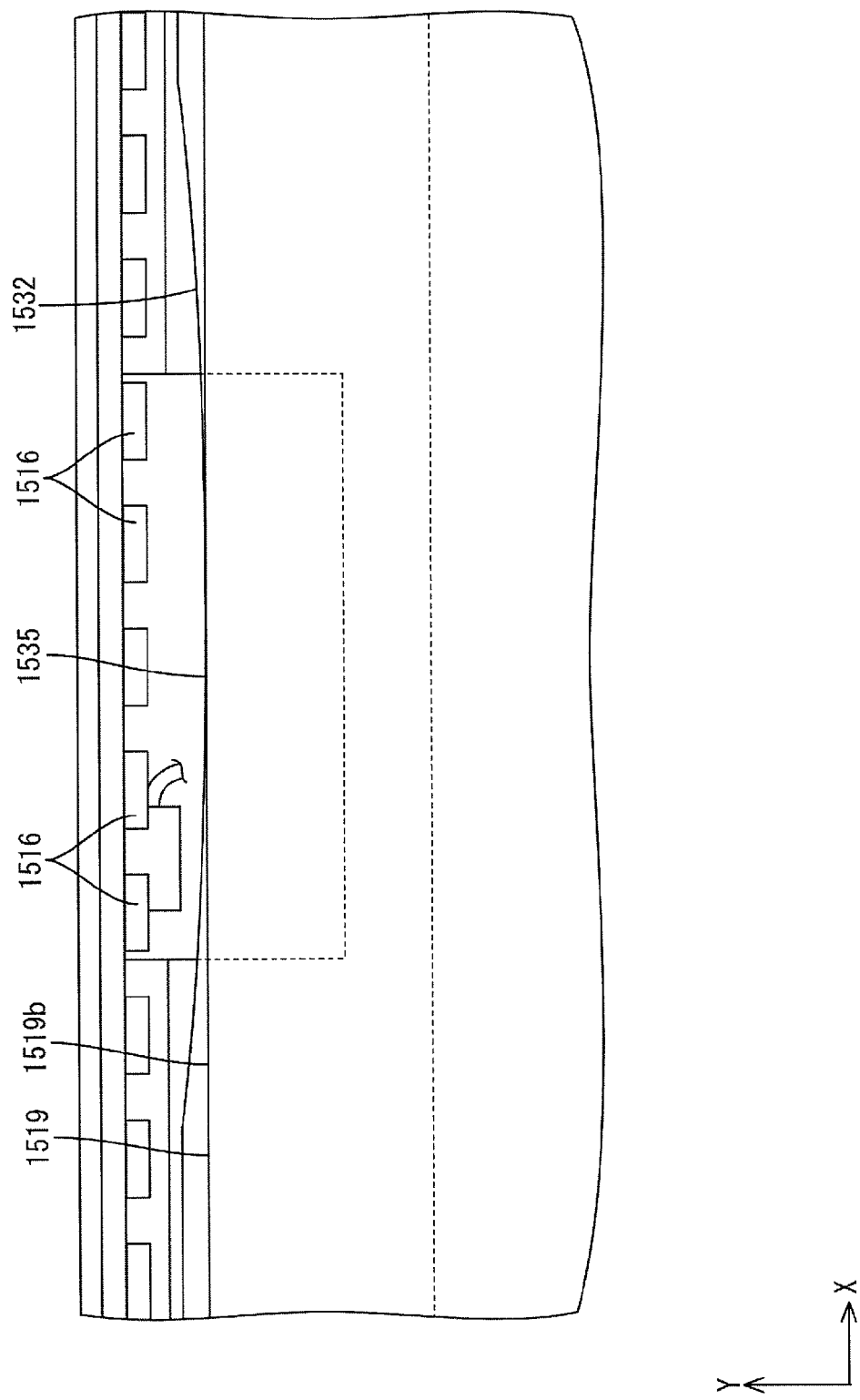
FIG. 29 is an enlarged plan view of a main part of a backlight device according to another embodiment (2) of the invention.

(2) As a modified example of Embodiment 4 described above, as illustrated in FIG. 29, it may be configured so that a portion of a circular arc portion 1535 forming a cutout edge of a cutout portion 1532, which has a longest distance from LEDs 1516 in the Y-axis direction, is flush with a light entrance surface 1519*b* of a light guide plate 1519.

(3) Configurations described in Embodiments 2 and 7 above may be, of course, combined appropriately with ones described in Embodiments 5, 6 and 8 to 14 above.

(4) A configuration described in Embodiment 7 above may be, of course, combined appropriately with ones described in Embodiments 3 and 4 above.

(5) Though Embodiment 8 above indicates a case where the deformation portion is formed in the end of the bottom plate portion as the reinforcement rib is formed, even when such a reinforcement rib is not formed, the deformation portion is formed in some cases due to generation of warpage or bending at the end of the bottom plate portion, and also when such a deformation portion is formed, by forming a cutout portion of a reflection sheet, it is possible to suppress luminance unevenness resulting from the deformation portion.

(6) In addition to each embodiment described above, plan shapes of the cutout portion and the cutout edge thereof may be changed appropriately. Specifically, the plan shape of the cutout portion may be aright angled triangle, a right angled triangle, an inequilateral triangle, an uneven-leg trapezoid, an ellipse or the like.

(7) In addition to each embodiment described above, arrangement in the X-axis direction, the installation number of cutout portions in the reflection sheet, and the like may be changed appropriately. A formation range in the X-axis direction and a formation range in the Y-axis direction in the cutout portion may be changed appropriately. Specifically, for example, it may be configured so that the cutout edge in the cutout portion, which has a longest distance from the LEDs, is flush with an end of the light guide plate non-support portion. Further, a formation range in which the cutout portion overlaps with an entire area of the light guide plate non-support portion may be provided. When it is configured so that the cutout edge of the cutout portion intersects with the light entrance surface of the light guide plate in a plan view, the intersection part may be arranged so as to be disposed in and overlap with the light guide plate non-support portion, and further, the intersection part may be arranged so as to intersect with an edge of the light guide plate non-support portion.

(8) Embodiments 8 and 12 above indicate a case where the reinforcement rib is provided in the chassis in which the chassis-side opening is formed, the invention may be applied also to a configuration in which the reinforcement rib is provided in a chassis in which a chassis-side opening is not formed as Embodiments 9 and 13 above.

(9) Though Embodiments 8, 9, 12 and 13 above indicate a case where the reinforcement rib or the board attachment portion which is a recessed portion is arranged so as not to overlap with the extended reflection portion of the reflection sheet in a plan view, arranging the reinforcement rib or the board attachment portion which is the recessed portion so as to overlap with the extended reflection portion of the reflection sheet in a plan view is also included in the invention.

(10) Though each embodiment above indicates a case where the wiring-side connector is fitted with the board-side connector along the X-axis direction, a direction in which the wiring-side connector is fitted with the board-side connector may be matched with the Z-axis direction or matched with the Y-axis direction.

(11) Though each embodiment above exemplifies a configuration in which the board-side connector is provided in the LED board, it may be configured so that when the board side connector is omitted, for example, a terminal portion for power feeding is provided in the protrusion for power feeding of the LED board and the wiring-side connector is attached to the protrusion for power feeding, the wiring-side connector is electrically connected to the terminal portion for power feeding.

(12) Though each embodiment above indicates a case where LED groups belonging to each group are connected in parallel by each wiring pattern formed in the LED board, it may be configured so that the LED groups belonging to each group are connected in series by each wiring pattern.

(13) Though each embodiment above indicates a case where two lines of wiring patterns are formed in the LED board, three or more lines of wiring patterns or only one line of wiring pattern may be formed in the LED board.

(14) Though each embodiment above indicates a configuration in which the protrusion for power feeding is connected to the center position in the length direction of the LED mounting portion, a position at which the protrusion for power feeding is connected to the LED mounting portion may be changed appropriately, so that it may be configured so that the protrusion for power feeding is connected to, for example, an end of the LED mounting portion in the length direction. In this case, as arrangement of the protrusion for power feeding is changed, arrangement of the chassis-side opening, the heat dissipation member-side opening, and the cutout portion of the reflection sheet may be changed.

(15) Though each embodiment above indicates a configuration in which only one protrusion for power feeding is connected to the LED mounting portion, it may be configured so that a plurality of protrusions for power feeding are connected to the LED mounting portion. In this case, as the installation number of protrusions for power feeding is changed, the installation number of chassis-side openings, heat dissipation member-side openings, and cutout portions of the reflection sheet may be changed.

(16) Though each embodiment above indicates a case where the chassis-side opening and the heat dissipation member-side opening are formed in a range of overlapping with entire areas of the board-side connector and the wiring-side connector in a plan view, forming the chassis-side opening and the heat dissipation member-side opening in a range of overlapping with only a part of the board-side connector and the wiring-side connector in a plan view is also included in the invention. Further, forming the chassis-side opening and the heat dissipation member-side opening in a range of not overlapping with the board-side connector or the wiring-side connector in a plan view is also included in the invention.

(17) Though each embodiment above exemplifies the liquid crystal display device including a single edge type or double edge type backlight device in which the LED board (LED, LED unit) is disposed facing a long-side end of the light guide pate, the invention may be applied also to a liquid crystal display device including a single edge type or double edge type backlight device in which the LED board is disposed facing a short-side end of the light guide plate. Additionally, the invention may be applied also to one disposing the LED board facing any three facing surfaces of the light guide plate or one disposing the LED board facing all end surfaces of the light guide plate.

(18) Though each embodiment above indicates a case where the first frame is made of metal, the first frame may be made of synthetic resin. Similarly, the second frame may be made of metal.

(19) Though each embodiment above exemplifies a case where two LED boards (LED units) are arranged so as to face one end surface of the light guide plate, one LED board or three or more LED boards may be arranged so as to face one end surface of the light guide plate.

(20) Though each embodiment above indicates a case where the LED is used as the light source, other light sources such as organic EL, a cold-cathode tube and a hot-cathode tube may be used.

(21) Though each embodiment above exemplifies a case where the liquid crystal panel has color sections of a color filter in three colors i.e., R, G and B, color sections of four or more colors may be used.

(22) Though TFT is used as a switching component of the liquid crystal display device in each embodiment above, the invention may be applied also to a liquid crystal display device using a switching component other than the TFT (for example, Thin Film Diode (TFD)), and may be applied also to a liquid crystal display device which performs monochrome display in addition to a liquid crystal display device which performs color display.

(23) Though each embodiment above exemplifies the liquid crystal display device using the liquid crystal panel as a display panel, the invention may be applied also to a display device using a display panel of other type.

(24) Though each embodiment above exemplifies the television device including a tuner, the invention may be also applied to a display device not including a tuner. Specifically, the invention may be applied also to a liquid crystal display device used as an electronic signboard (digital signage) or an electronic blackboard.

REFERENCE SIGNS LIST 10 liquid crystal display device (display device)
11 liquid crystal panel (display panel)
12, 912 backlight device (lighting device)
14, 714, 814, 914, 1014, 1114, 1214, 1314 chassis
14a, 714a, 814a, 914a, 1014a, 1114a, 1214a, 1314a bottom plate portion
16, 116, 216, 316, 416, 516, 616, 716, 816, 916, 1016, 1116, 1216, 1316, 1516 LED (light source)
17, 1017, 1317 LED board (light source board)
17a LED mounting portion (light source mounting portion)
17b, 1317b protrusion for power feeding
19, 119, 219, 619, 719, 819, 919, 1019, 1119, 1219, 1419, 1519 light guide plate
19a, 719a, 819a, 1019a, 1119a, 1219a light exit surface
19b, 119b, 219b, 619b, 919b, 1419b, 1519b light entrance surface
19c, 119c, 619c, 719c, 819c, 1019c, 1119c, 1219c opposite plate surface
20, 120, 220, 320, 420, 520, 620, 720, 820, 920, 1020, 1120, 1220 reflection sheet (reflection member)
20a, 120a, 220a, 620a, 720a, 820a, 920a, 1020a, 1120a, 1220a extended reflection portion
22, 1022, 1322 board-side connector (power feed portion)
23, 1023, 1323 wiring-side connector (power feed portion)
28, 128, 228, 628, 928, 1028, 1328 chassis-side opening (opening)
30, 130, 230, 630, 730, 830, 1030 light guide plate non-support portion
31, 731, 831 light guide plate support portion
32, 132, 232, 332, 432, 532, 632, 732, 832, 1032, 1132, 1232, 1432, 1532 cutout portion
38, 1138 reinforcement rib (recessed portion)
39, 839, 1139, 1239 deformation portion
40, 1140 second light guide plate non-support portion (light guide plate non-support portion)
41, 1241 board attachment portion (recessed portion)
42, 1242 board TV television device

The invention claimed is:
1. A lighting device, comprising:
a light source;
a light guide plate having a plate shape and including at least one edge surface as a light entrance surface through which light from the light source enters, one plate surface as a light exit surface through which the light exits the light guide plate, and another plate surface as an opposite plate surface being opposite to the light exit surface;
a chassis having a bottom plate portion that includes a light guide plate support portion supporting the light guide plate from a side of the opposite plate surface and a light guide plate non-support portion not supporting the light guide plate from the side of the opposite plate surface; and a reflection member that is disposed between the opposite plate surface of the light guide plate and the bottom plate portion of the chassis and reflects the light travelling through the light guide plate toward the light exit surface, the reflection member having an extended reflection portion that extends closer to the light source than the light entrance surface of the light guide plate and having a cutout portion that is formed by cutting out at least a part of a portion of the extended reflection portion overlapping with the light guide plate non-support portion.

2. The lighting device according to claim 1, wherein the reflection member includes the cutout portion having a cutout edge that is a flush with the light entrance surface or opposite to the light source with respect to the light entrance surface.

3. The lighting device according to claim 2, wherein the cutout edge of the cutout portion is opposite to the light source with respect to the light entrance surface.

4. The lighting device according to claim 2, wherein
the light guide plate non-support portion has an edge that is opposite to the light source with respect to the light entrance surface, and
the cutout edge of the cutout portion of the reflection member is closer to the light entrance surface than the edge of the light guide plate non-support portion.

5. The lighting device according to claim 1, wherein the cutout portion of the reflection member has an opening size in a direction along the light entrance surface continuously decreasing as is farther away from the light source.

6. The lighting device according to claim 5, wherein the cutout portion of the reflection member has a formation range in the direction along the light entrance surface greater than a formation range of the light guide plate non-support portion in the direction along the light entrance surface.

7. The lighting device according to claim 1, wherein the cutout portion of the reflection member has a formation range in the direction along the light entrance surface greater than a formation range of the cutout portion extending in a direction from the light source to the light entrance surface.

8. The lighting device according to claim 1, wherein the light guide plate non-support portion includes an opening that is in the bottom plate portion.

9. The lighting device according to claim 8, further comprising:
a light source board on which the light source is mounted; and
a power feed portion feeding power to the light source on the light source board, wherein
the power feed portion is exposed to outside through the opening of the bottom plate portion.

10. The lighting device according to claim 9, wherein
the light source board has a light source mounting portion on which the light source is mounted, and a protrusion for power feeding protruding from the light source mounting portion in a direction from the light exit surface to the opposite plate surface, the protrusion for power feeding having the power feed portion thereon, and
the power feed portion and the protrusion for power feeding are exposed to outside through the opening of the bottom plate portion.

11. The lighting device according to claim 10, wherein the opening of the bottom plate portion has an opening edge that is opposite to the light source with respect to the light entrance surface.

12. The lighting device according to claim 1, wherein the light guide plate non-support portion includes a recessed portion that is recessed in the bottom plate portion so as to be farther away from the light guide plate, and a deformation portion that is adjacent to the recessed portion in the bottom plate portion, the deformation portion being away from the opposite plate surface of the light guide plate by a distance that is relatively greater than a distance between the opposite plate surface of the light guide plate support portion and the light guide plate support portion.

13. The lighting device according to claim 12, further comprising a board that is opposite to the light guide plate with respect to the bottom plate portion and is attached to the recessed portion.

14. A display device comprising:
   the lighting device according to claim 1; and
   a display panel which displays an image by using light from the lighting device.

15. A television device comprising the display device according to claim 14.

* * * * *